US011553516B2

(12) United States Patent
Choi et al.

(10) Patent No.: US 11,553,516 B2
(45) Date of Patent: Jan. 10, 2023

(54) METHOD, DEVICE, AND SYSTEM FOR CANCELLING UPLINK TRANSMISSION IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 17/715,037

(22) Filed: Apr. 7, 2022

(65) Prior Publication Data
US 2022/0312469 A1    Sep. 29, 2022

Related U.S. Application Data

(63) Continuation of application No. PCT/KR2020/013692, filed on Oct. 7, 2020.

(30) Foreign Application Priority Data

Oct. 7, 2019  (KR) .......................... 10-2019-0124215
Nov. 8, 2019  (KR) .......................... 10-2019-0142301
(Continued)

(51) Int. Cl.
*H04W 72/12* (2009.01)
*H04L 27/26* (2006.01)
*H04W 72/04* (2009.01)

(52) U.S. Cl.
CPC ..... *H04W 72/1289* (2013.01); *H04L 27/2605* (2013.01); *H04L 27/26025* (2021.01);
(Continued)

(58) Field of Classification Search
CPC ......... H04L 27/2605; H04L 27/26025; H04W 72/1268; H04W 72/0453; H04W 72/0446; H04W 72/1289
(Continued)

(56) References Cited

U.S. PATENT DOCUMENTS

| 10,827,541 B2 | 11/2020 | Park et al. |
| 10,951,383 B2 * | 3/2021 | Lu .......................... H04L 5/0094 |
| 10,979,976 B1 | 4/2021 | Babaei |
| 10,986,695 B1 | 4/2021 | Babaei |

(Continued)

FOREIGN PATENT DOCUMENTS

| EP | 3860033 A1 * | 8/2021 | ........... H04L 1/1671 |
| KR | 10-2019-0086618 | 7/2019 | |

(Continued)

OTHER PUBLICATIONS

International Search Report for PCT/KR2020/013692 dated Jan. 20, 2021 and its English translation from WIPO (now published as WO 2021/071260).

(Continued)

*Primary Examiner* — Peter G Solinsky
(74) *Attorney, Agent, or Firm* — Ladas & Parry, LLP

(57) ABSTRACT

Disclosed is a method in which a user equipment receives downlink control information in a wireless communication system. The user equipment may receive configuration information for reception of a physical downlink control channel (PDCCH) from a base station, and may receive a PDCCH including downlink control information (DCI) on the basis of the configuration information.

28 Claims, 43 Drawing Sheets

(30) Foreign Application Priority Data

Feb. 12, 2020 (KR) ........................ 10-2020-0017253
Feb. 24, 2020 (KR) ........................ 10-2020-0022315

(52) U.S. Cl.
CPC ... *H04W 72/0446* (2013.01); *H04W 72/0453* (2013.01); *H04W 72/1268* (2013.01)

(58) Field of Classification Search
USPC ........................................................ 370/329
See application file for complete search history.

(56) References Cited

U.S. PATENT DOCUMENTS

| | | |
|---|---|---|
| 2013/0195048 A1 | 8/2013 | Ekpenyong et al. |
| 2014/0369324 A1 | 12/2014 | Lin et al. |
| 2016/0233986 A1 | 8/2016 | Lee et al. |
| 2016/0262182 A1 | 9/2016 | Yang et al. |
| 2018/0192434 A1 | 7/2018 | Lee et al. |
| 2018/0367263 A1 | 12/2018 | Ying et al. |
| 2018/0368110 A1 | 12/2018 | Ying et al. |
| 2019/0044681 A1 | 2/2019 | Zhang |
| 2019/0082431 A1 | 3/2019 | Yi et al. |
| 2020/0008216 A1 | 1/2020 | Iyer et al. |
| 2020/0077470 A1 | 3/2020 | Xiong et al. |
| 2020/0119895 A1 | 4/2020 | Choi et al. |
| 2020/0305183 A1 | 9/2020 | Papasakellariou |
| 2020/0351897 A1 | 11/2020 | Fakoorian et al. |
| 2020/0389876 A1 | 12/2020 | Islam et al. |
| 2021/0022134 A1 | 1/2021 | Chen et al. |
| 2021/0100012 A1 | 4/2021 | Miao |
| 2021/0168848 A1 | 6/2021 | Chatterjee et al. |

FOREIGN PATENT DOCUMENTS

| | | |
|---|---|---|
| WO | 2019/139446 | 7/2018 |
| WO | 2019/158077 | 8/2018 |
| WO | 2019/160332 | 8/2019 |
| WO | 2019/184688 | 10/2019 |
| WO | 2019/184691 | 10/2019 |
| WO | 2019/191977 | 10/2019 |
| WO | 2020/033660 | 2/2020 |
| WO | 2020/201388 | 10/2020 |
| WO | 2020/223448 | 11/2020 |
| WO | 2021/014576 | 1/2021 |
| WO | 2021/066596 | 4/2021 |
| WO | 2021/071260 | 4/2021 |
| WO | 2021/088969 | 5/2021 |
| WO | 2021/093124 | 5/2021 |
| WO | 2021/093125 | 5/2021 |
| WO | 2021/097590 | 5/2021 |
| WO | 2021/109463 | 6/2021 |

OTHER PUBLICATIONS

Written Opinion of the International Searching Authority for PCT/KR2020/013692 dated Jan. 20, 2021 and its English translation from WIPO (now published as WO 2021/071260).
Nokia, Nokia Shanghai Bell: "Proposed corrections for the slot configuration in 38.123", 3GPP TSG WG1 Meeting #93, R1-1806656, Busan, Republic of Korea, May 21-25, 2018, pp. 1-12.
WILUS Inc.: "On UL cancellation scheme for NR URLLC", 3GPP TSG RAN WG1 #98, R1-1909369, Prague, CA, Aug. 26-30, 2019, pp. 1-5.
LG Electronics: "Remaining issues on pre-emption indication", 3GPP TSG RAN WG1 Meeting AH 1801, R1-1800393, Vancouver, Canada, Jan. 22-26, 2018, pp. 1-6.
International Search Report for PCT/KR2019/000562 dated May 13, 2019 and its English translation from WIPO (now published as WO 2019/139446).
Written Opinion of the International Searching Authority for PCT/KR2019/000562 dated May 13, 2019 and its English translation from WIPO (now published as WO 2019/139446).
Motorola Mobility, Lenovo: "Multiplexing of uplink channels with different transmission durations", 3GPP TSG RAN WG1 #91, R1-1720927, Reno, USA, Nov. 27-Dec. 1, 2017, pp. 1-3.
Huawei, HiSilison: "On UCI multiplexing", 3GPP TSG RAN WG1 Meeting #91, R1-1719397, Reno, USA, Nov. 27-Dec. 1, 2017, pp. 1-9.
Extended European Search Report dated Aug. 18, 2021 for European Patent Application No. 19738296.3.
Sharp: "Simultaneous PUCCH and PUSCH transmission and collision handling", 3GPP TSG RAN WG1 NR#90bis Meeting, R1-1718418, Prague, Czech Republic, Oct. 9-13, 2017, pp. 1-2.
Office Action dated Sep. 10, 2021 for Indian Patent Application No. 202027027830.
Office Action dated Dec. 21, 2021 for U.S. Appl. No. 16/924,060.
Office Action dated Aug. 12, 2022 for Korean Patent Application No. 10-2020-7021102 and its English translation provided by the Applicant's foreign counsel.
Vivo: "Remaining issued on multiplexing data with different transmission durations", 3GPP TSG RAN WG1 Meeting 91, R1-1719798, Reno, USA, Nov. 27-Dec. 1 ,2017, pp. 1-11.
Vivo: "Summary of multiplexing data with different transmission durations", 3GPP TSG RAN WG1 Meeting 91, R1-1721491, Reno, USA, Nov. 27-Dec. 1, 2017, pp. 1-8.
Extended European Search Report dated Aug. 16, 2022 for European Patent Application No. 22177959.8.
Fujitsu: "On eMMB and URLL Multiplexing", 3GPP TSG RAN WG1 Meeting #91, R1-1719616, Reno, USA, Nov. 27-Dec. 1, 2017, pp. 1-7.
Office Action dated Aug. 22, 2022 for Japanese Patent Application No. 2020-538543 and its English translation provided by the Applicant's foreign counsel.
Office Action dated Sep. 7, 2022 for Indian Patent Application No. 202227024342.
Corrected Notice of Allowance dated Sep. 23, 2022 for U.S. Appl. No. 16/924,060.
Extended European Search Report dated Oct. 5, 2022 for European Patent Application No. 22191562.2.
Extended European Search Report dated Oct. 5, 2022 for European Patent Application No. 22191571.3.
Extended European Search Report dated Nov. 7, 2022 for European Patent Application No. 20874863.2.

* cited by examiner

UL Preemption Indication = [0 0 0 0 1 0 0 0 1 0 0 0 0 0]

(a)

(b)

(a)

(b)

(c)

(a)

(b)

(c)

(a)

(b)

METHOD, DEVICE, AND SYSTEM FOR CANCELLING UPLINK TRANSMISSION IN WIRELESS COMMUNICATION SYSTEM

CROSS-REFERENCE TO RELATED APPLICATIONS

This application is a continuation of International Patent Application No. PCT/KR2020/013692 filed on Oct. 7, 2020, which claims the priority to Korean Patent Application No. 10-2019-0124215 filed in the Korean Intellectual Property Office on Oct. 7, 2019, Korean Patent Application No. 10-2019-0142301 filed in the Korean Intellectual Property Office on Nov. 8, 2019, Korean Patent Application No. 10-2020-0017253 filed in the Korean Intellectual Property Office on Feb. 12, 2020, and Korean Patent Application No. 10-2020-0022315 filed in the Korean Intellectual Property Office on Feb. 24, 2020, the entire contents of which are incorporated herein by reference.

TECHNICAL FIELD

The present disclosure relates to a wireless communication system. Specifically, the present disclosure relates to a method for cancelling uplink transmission in a wireless communication system, and an apparatus using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DETAILED DESCRIPTION OF THE INVENTION

Technical Problem

An objective of an embodiment of the present disclosure is to provide a method for cancelling uplink transmission in some or all of resources allocated for uplink transmission through control information, and an apparatus using the same.

Technical Solution

A user equipment that transmits a physical uplink shared channel (PUSCH) to a base station in a wireless communication system includes: a communication module; and a processor configured to control the communication module, wherein the processor is configured to receive configuration information for reception of a physical downlink control channel (PDCCH) and receive a PDCCH including downlink control information (DCI) on the basis of the configuration information, wherein the DCI includes an indication indicating some or all of a time-frequency resource for cancellation of UL transmission, and wherein the subcarrier spacing of at least one symbol in which cancellation of UL transmission is indicated by the indication is determined to be the subcarrier spacing of a downlink bandwidth part (DL BWP) of a cell in which the DCI is received.

In addition, in the present disclosure, the time frequency resources for cancellation of UL transmission is a resource excluding a specific resource from a reference resource region, and a number of symbols in the reference resource region is determined on the basis of monitoring periodicity for monitoring the PDCCH or a predetermined value.

In addition, in the present disclosure, the specific resource includes at least one of a symbol for a physical broadcast channel (PBCH)/synchronization signal (SS) and/or a downlink symbol.

In addition, in the present disclosure, the downlink symbol is configured cell-commonly.

In addition, in the present disclosure, the symbol for the physical broadcast channel (PBCH)/synchronization signal (SS) is a symbol configured cell-commonly.

In addition, in the present disclosure, a starting symbol in the reference resource region is a symbol positioned after "X" symbols from the symbol after the symbol in which the PDCCH is received.

In addition, in the present disclosure, the value "X" is determined on the basis of at least one of a first subcarrier spacing and/or a second subcarrier spacing, and the first subcarrier spacing is the smallest of a subcarrier spacing for the PDCCH and a subcarrier spacing for the UL transmission, and the second subcarrier spacing is a value determined on the basis of the subcarrier spacing for the UL transmission.

In addition, in the present disclosure, the time-frequency resource for the cancellation of UL transmission includes a plurality of regions of which the cancellation or non-cancellation is indicated by respective bits of the indication.

In addition, in the present disclosure, the time-frequency resource for the cancellation of UL transmission includes a plurality of regions divided into N groups including one or more symbols on a time axis and at least one physical resource block (PRB) on a frequency axis.

In addition, in the present disclosure, the number of the one or more symbols included in at least one of the N groups is a value obtained by dividing the number of symbols included in the time-frequency resource by N and rounding up the quotient thereof, and the number of the one or more symbols included in each of the remaining groups, excluding the at least one of the N groups, is a value obtained by dividing the number of symbols included in the time-frequency resource by N and rounding down the quotient thereof.

In addition, in the present disclosure, the configuration information includes a starting PRB index of the reference resource region and a resource indication value indicating the number of consecutive RBs, and the BWP including at least one PRB indicated by an RIV includes 275 RBs.

In addition, in the present disclosure, a value of the starting PRB index of the at least one PRB is obtained by adding an offset value to a value of the starting PRB index of the reference resource region.

In addition, in the present disclosure, the offset value and a subcarrier spacing of the offset value are transmitted through higher layer signaling.

In addition, in the present disclosure, a resource cancelled by the indication is a resource for transmitting a physical uplink shared channel (PUSCH) and/or a sounding reference signal (SRS).

In addition, in the present disclosure, a cyclic prefix (CP) of the at least one symbol indicated by the indication is determined to be a CP of a downlink bandwidth part (DL BWP) of a cell in which the DCI is transmitted.

In addition, in the present disclosure, a resource for UL transmission is allocated before the PDCCH including the indication is received, and the UL transmission is cancelled in a resource region overlapping at least one symbol of the resource.

In addition, the present disclosure provides a method including: receiving configuration information for reception of a physical downlink control channel (PDCCH); and receiving a PDCCH including downlink control information (DCI) on the basis of the configuration information, wherein the DCI includes an indication indicating some or all of a time-frequency resource for cancellation of UL transmission, and wherein the subcarrier spacing of at least one symbol in which cancellation of UL transmission is indicated by the indication is determined to be the subcarrier spacing of a downlink bandwidth part (DL BWP) of a cell in which the DCI is received.

Advantageous Effects

According to an embodiment of the present disclosure, the user equipment is able to receive an indication for cancelling uplink transmission, and is able to cancel uplink transmission according to the indication. Accordingly, the user equipment does not perform unnecessary uplink transmission, thereby consuming energy of the user equipment and preventing interference with other user equipments and the base station.

The effects obtainable in the present disclosure are not limited to the above-mentioned effects, and other effects not mentioned will be clearly understood by those of ordinary skill in the art from the following description.

MODE FOR CARRYING OUT THE INVENTION

Figure 1:
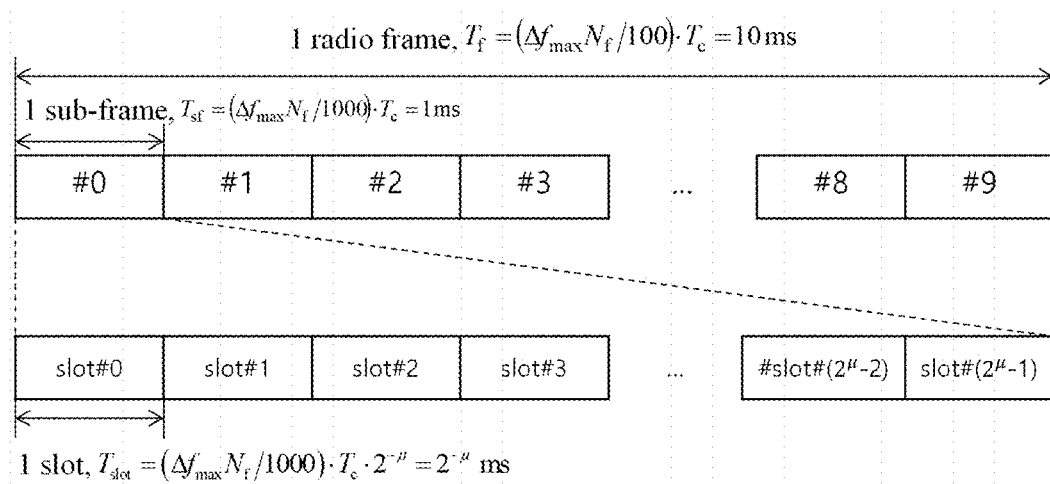
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu$=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
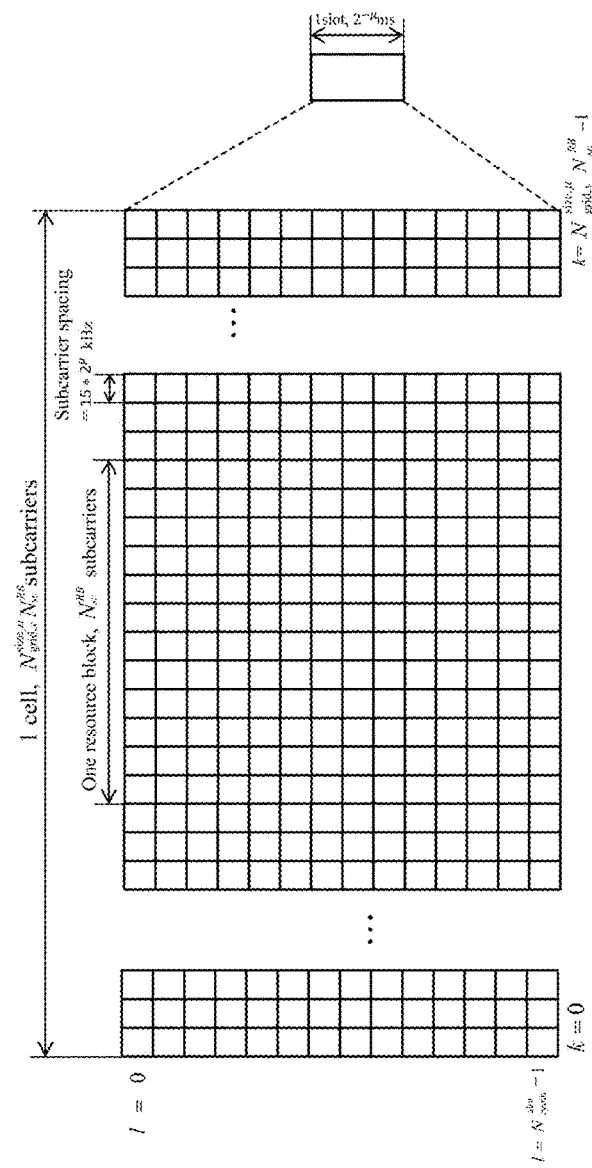
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0  | D | D | D | D | D | D | D | D | D | D | D | D | D | D |
| 1  | U | U | U | U | U | U | U | U | U | U | U | U | U | U |
| 2  | X | X | X | X | X | X | X | X | X | X | X | X | X | X |
| 3  | D | D | D | D | D | D | D | D | D | D | D | D | D | X |
| 4  | D | D | D | D | D | D | D | D | D | D | D | D | X | X |
| 5  | D | D | D | D | D | D | D | D | D | D | D | X | X | X |
| 6  | D | D | D | D | D | D | D | D | D | D | X | X | X | X |
| 7  | D | D | D | D | D | D | D | D | D | X | X | X | X | X |
| 8  | X | X | X | X | X | X | X | X | X | X | X | X | X | U |
| 9  | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | U | U | U |
| 45 | D | D | D | D | D | D | X | U | U | U | U | U | U | U |
| 46 | D | D | D | D | X | U | D | D | D | D | D | X | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | D | D | D | D | D | D | D | D |
| 55 | D | D | X | X | X | U | U | U | D | D | D | D | D | D |
| 56~255 | | | | | | | Reserved | | | | | | | |

In Table 1, D denotes a DL symbol, U denotes a UL symbol, and X denotes a flexible symbol. As shown in Table 1, up to two DL/UL switching in one slot may be allowed.

Figure 3:
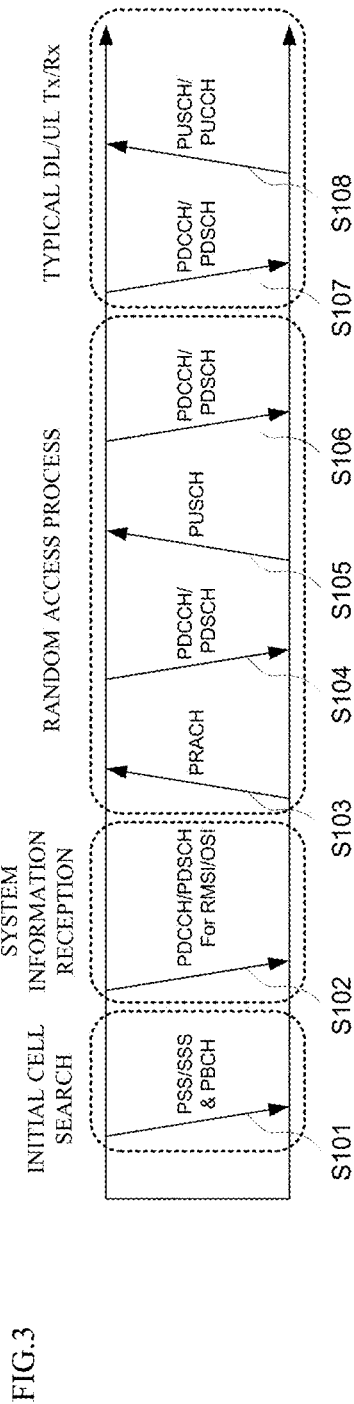
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID.

Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
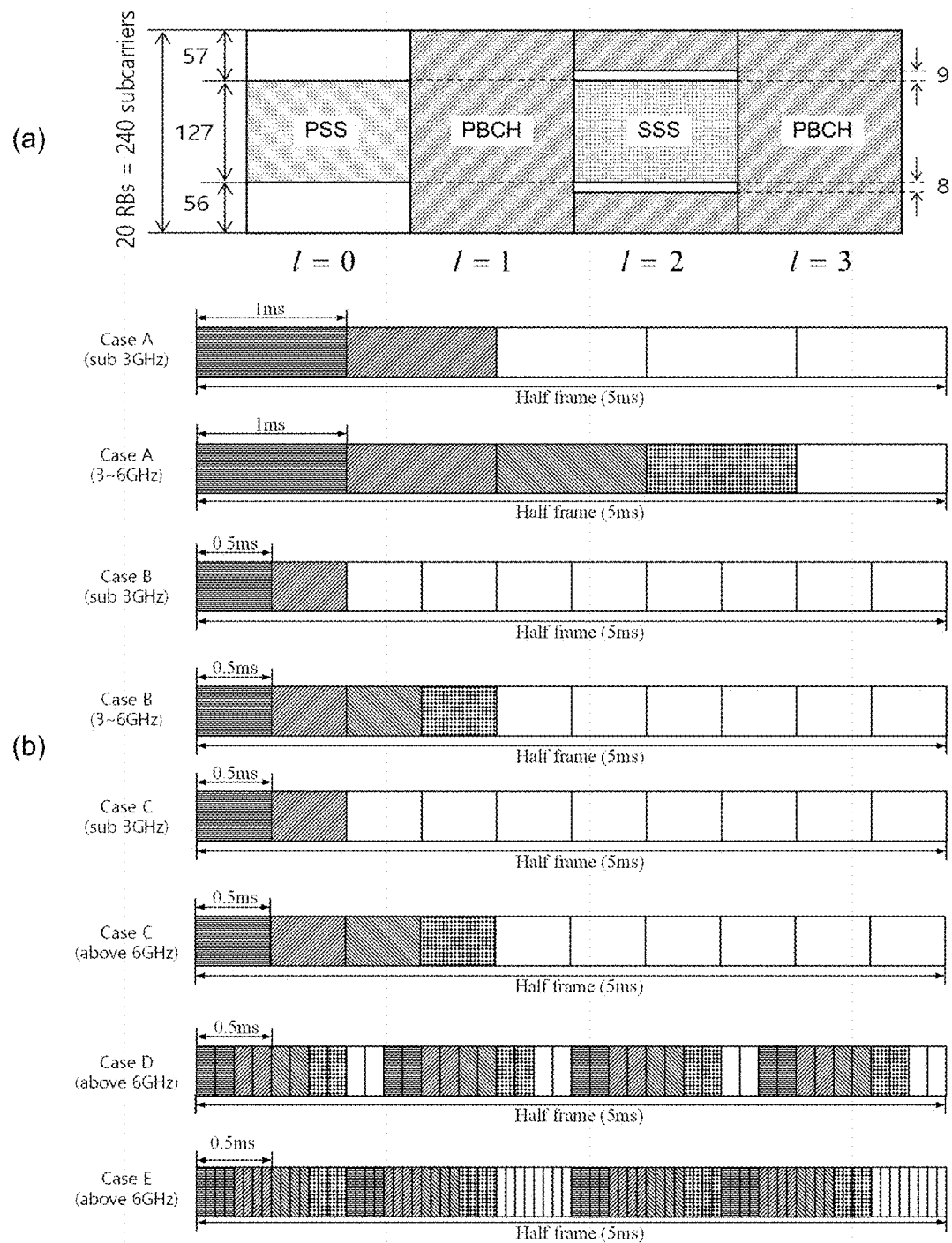
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set | 0 | 0, 1, . . . , 55, 183, 184, . . . , 239 |
| to 0 | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + ν, 4 + ν, 8 + ν, . . . , 236 + ν |
|  | 2 | 0 + ν, 4 + ν, 8 + ν, . . . , 44 + ν 192 + ν, 196 + ν, . . . , 236 + ν |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(2)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS(n)}=1-2x(m)$$ [99]

m=(n+43$N_{ID}^{(2)}$)mod 127

0≤n<127

Here, x(i+7)=(x(i+4)+x(i))mod 2 and is given as

[x(6)x(5)x(4)x(3)x(2)x(1)x(0)]=[1 1 1 0 1 1 0]

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

$x_0(i+7)=(x_0(i+4)+x_0(i))$mod 2

Here, $x_1(i+7)=(x_1(i+1)+x_1(i))$mod 2 and is given as

[$x_0$(6)$x_0$(5)$x_0$(4)$x_0$(3)$x_0$(2)$x_0$(1)$x_0$(0)]=[0 0 0 0 0 0 1]

[$x_1$(6)$x_1$(5)$x_1$(4)$x_1$(3)$x_1$(2)$x_1$(1)$x_1$(0)]=[0 0 0 0 0 0 1]

A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
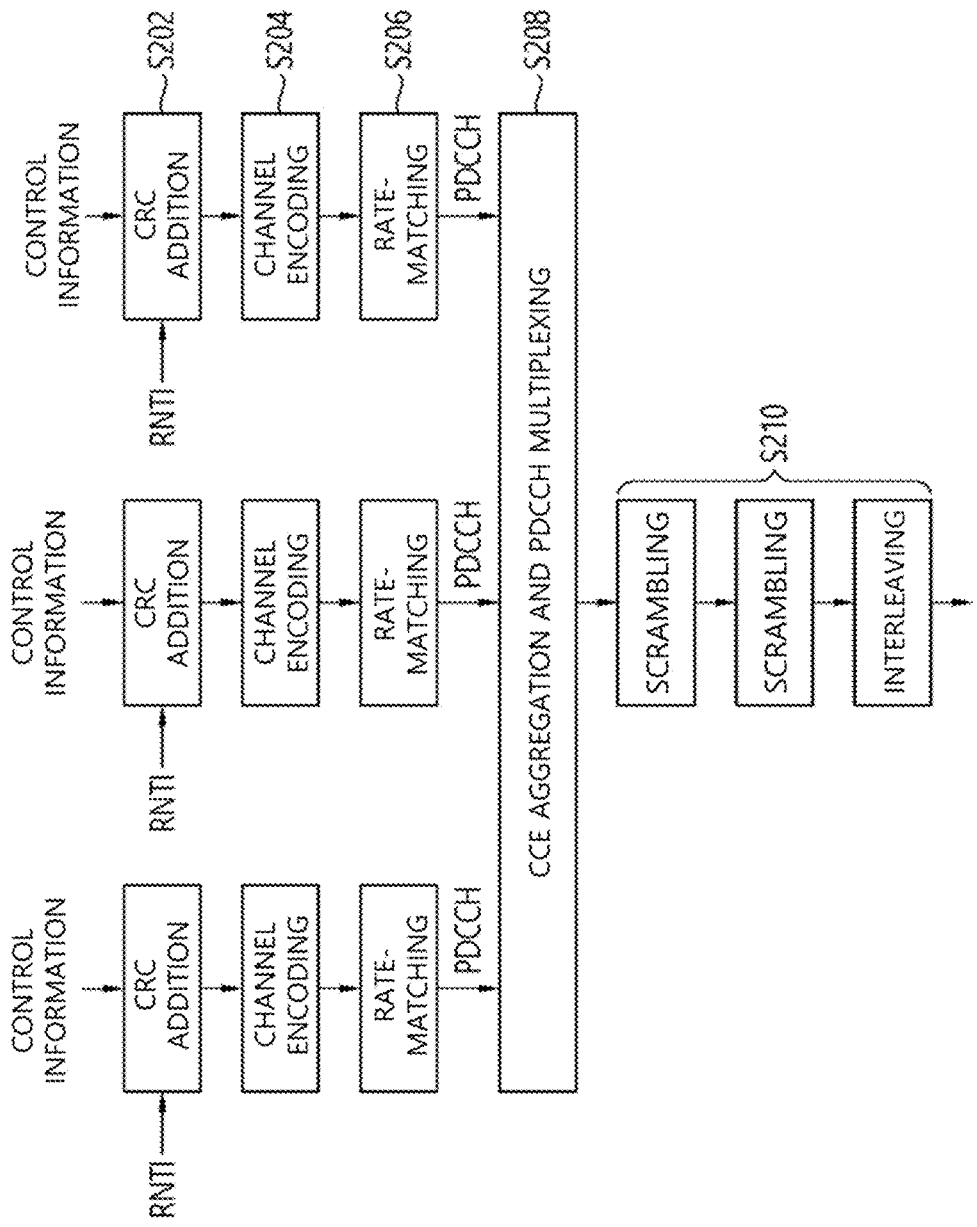
FIGS. 5A and 5B illustrates a procedure for transmitting control information and a control channel in a 3GPP NR system.
Figure 5B:
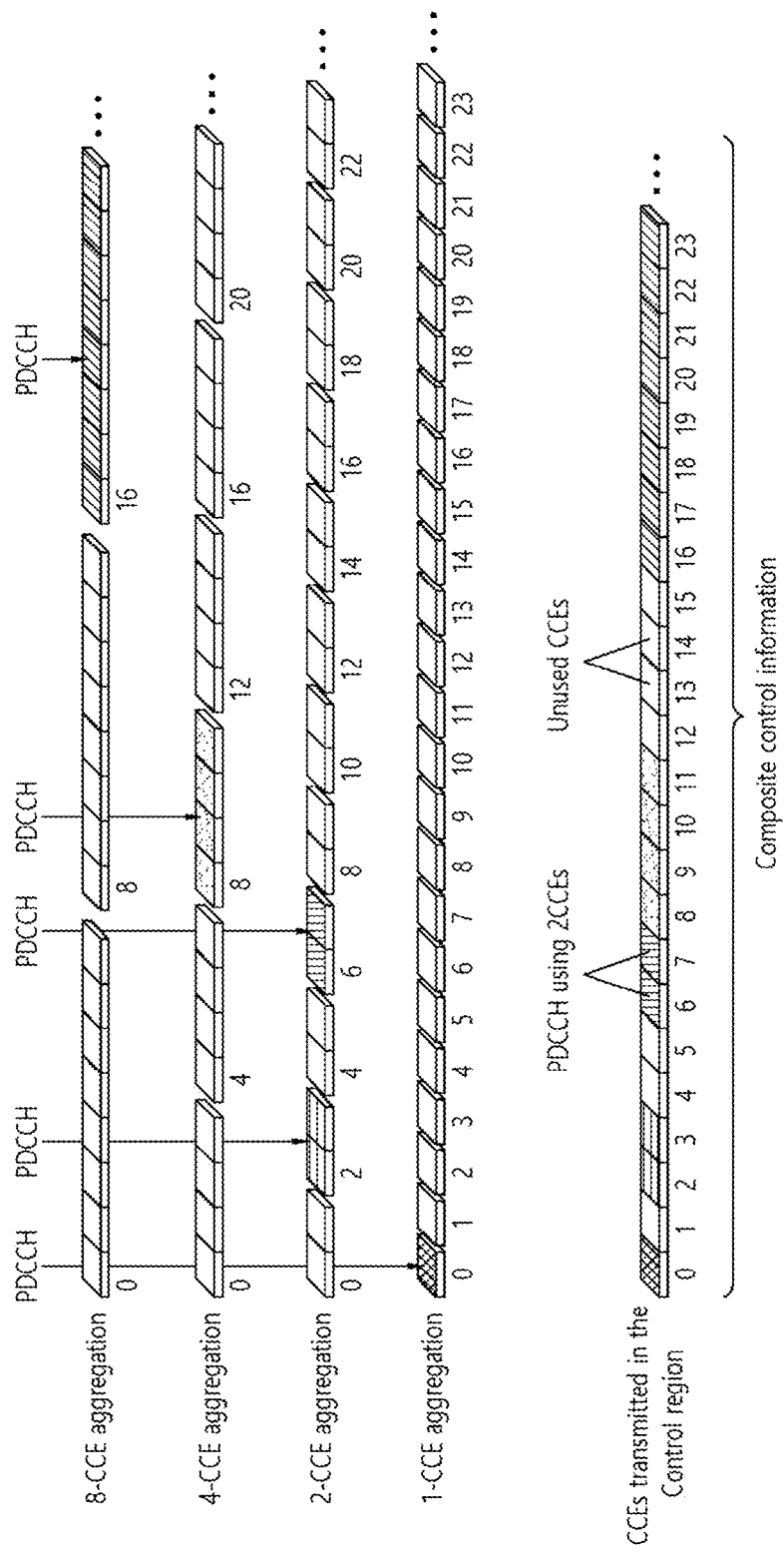

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
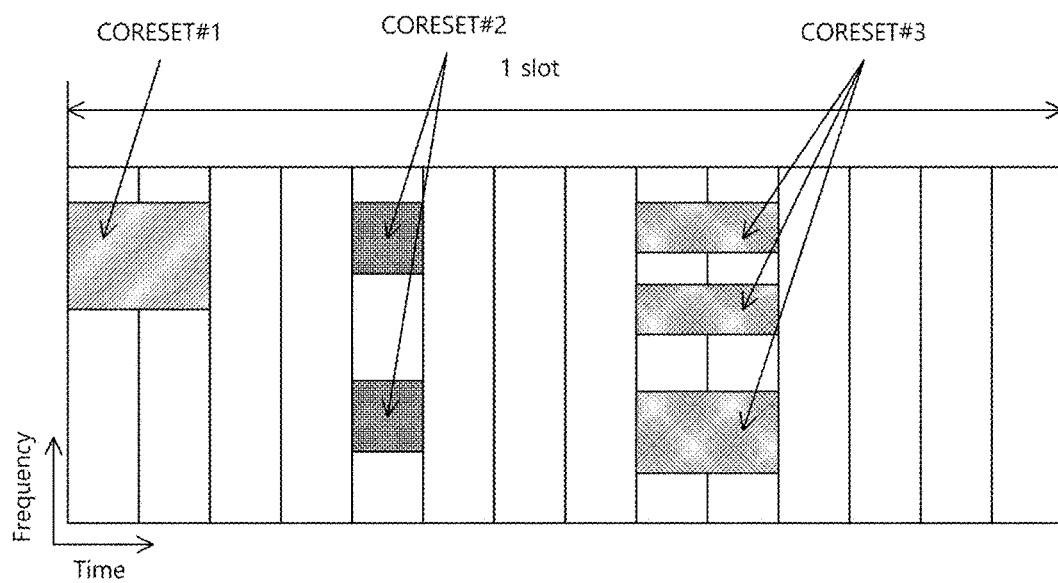
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
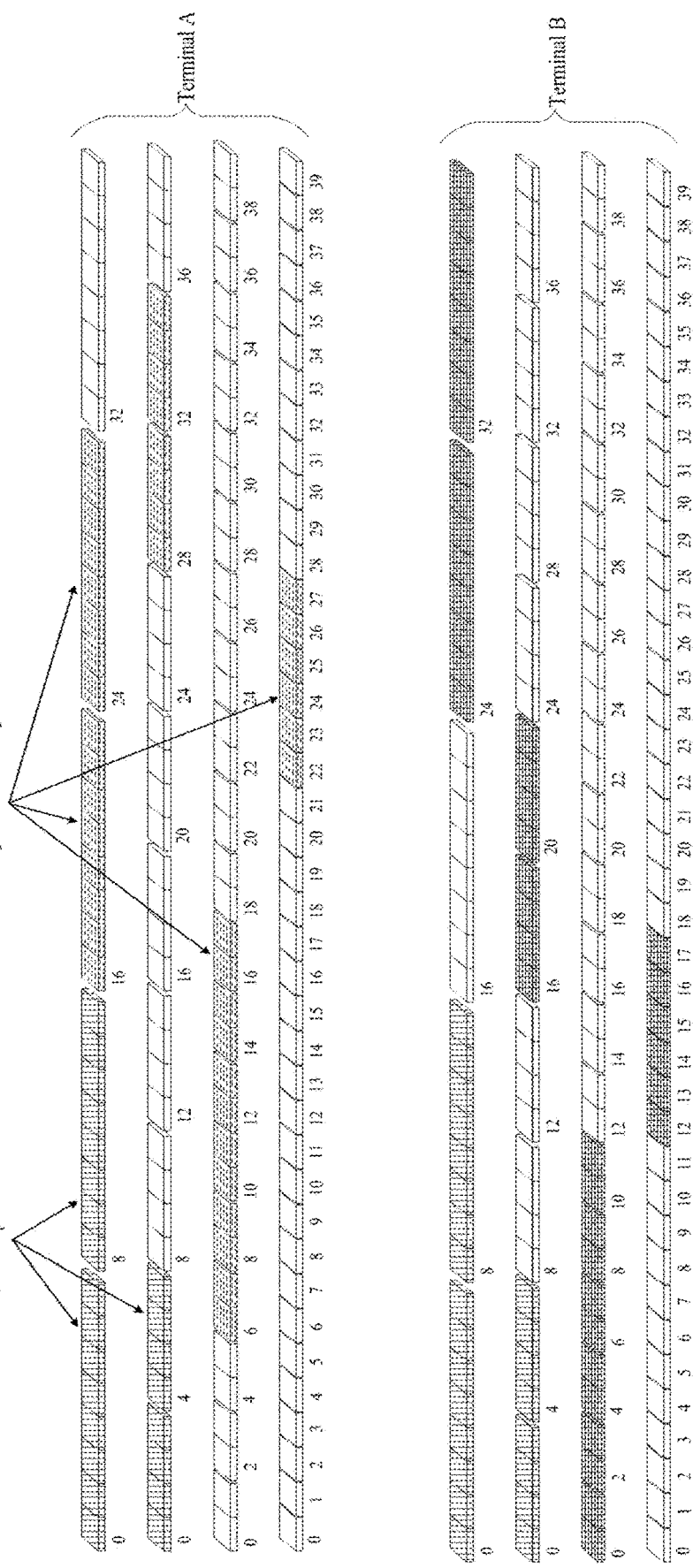
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
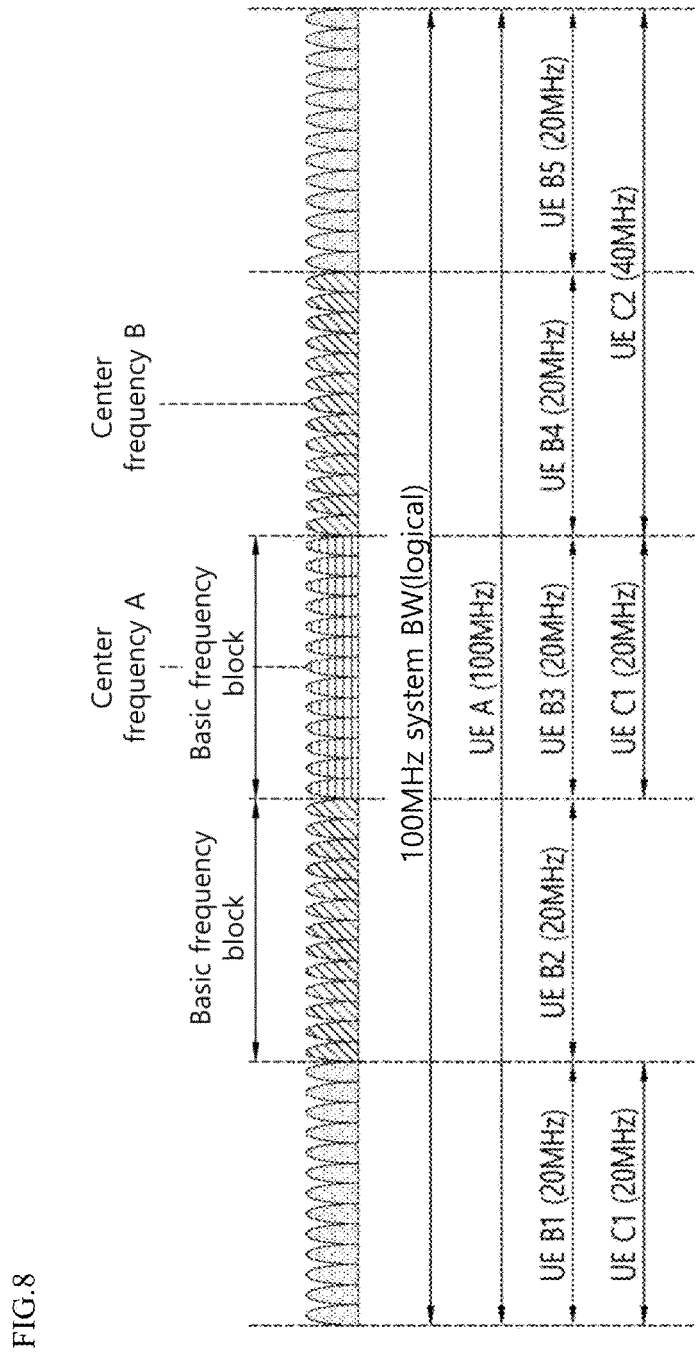
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
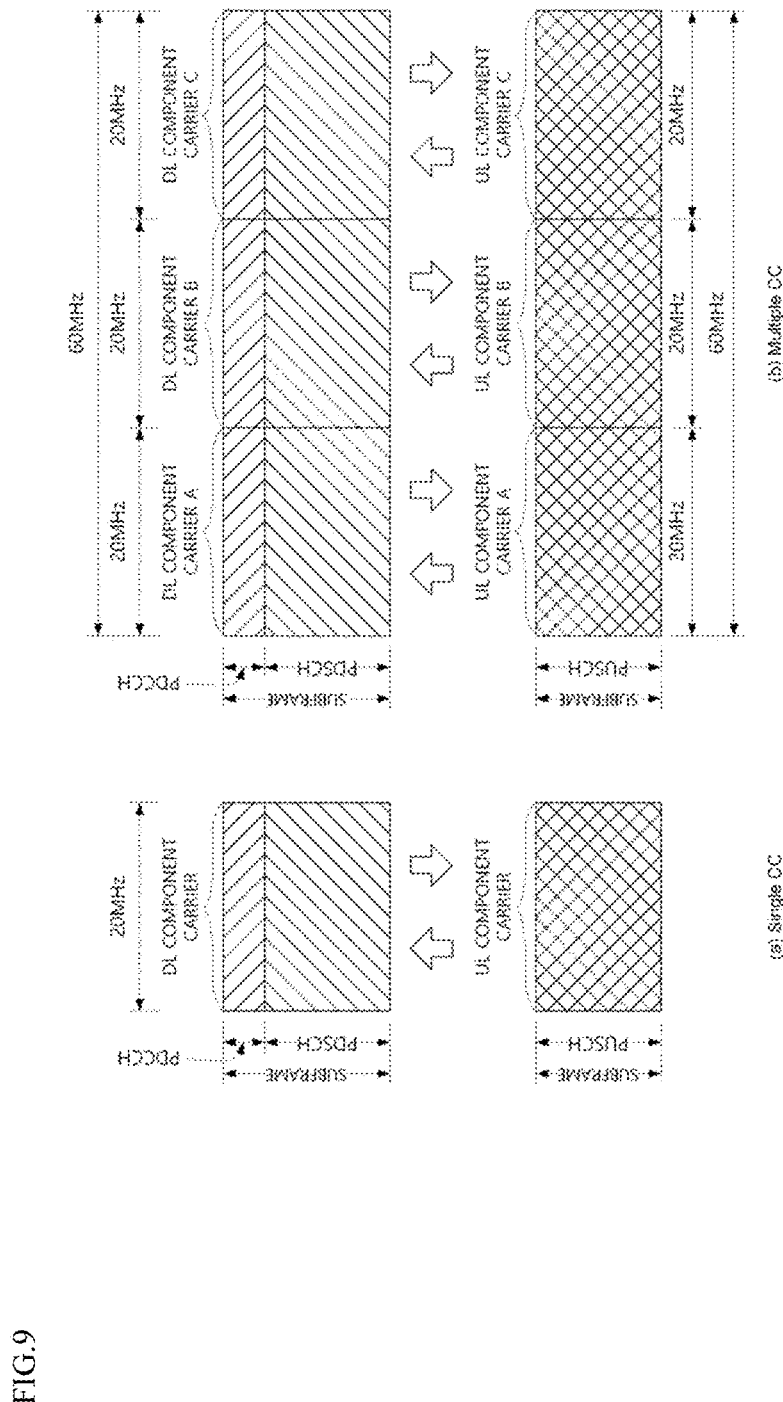
FIG. 9 is a diagram for explaining single carrier communication and multiple carrier communication.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency region. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
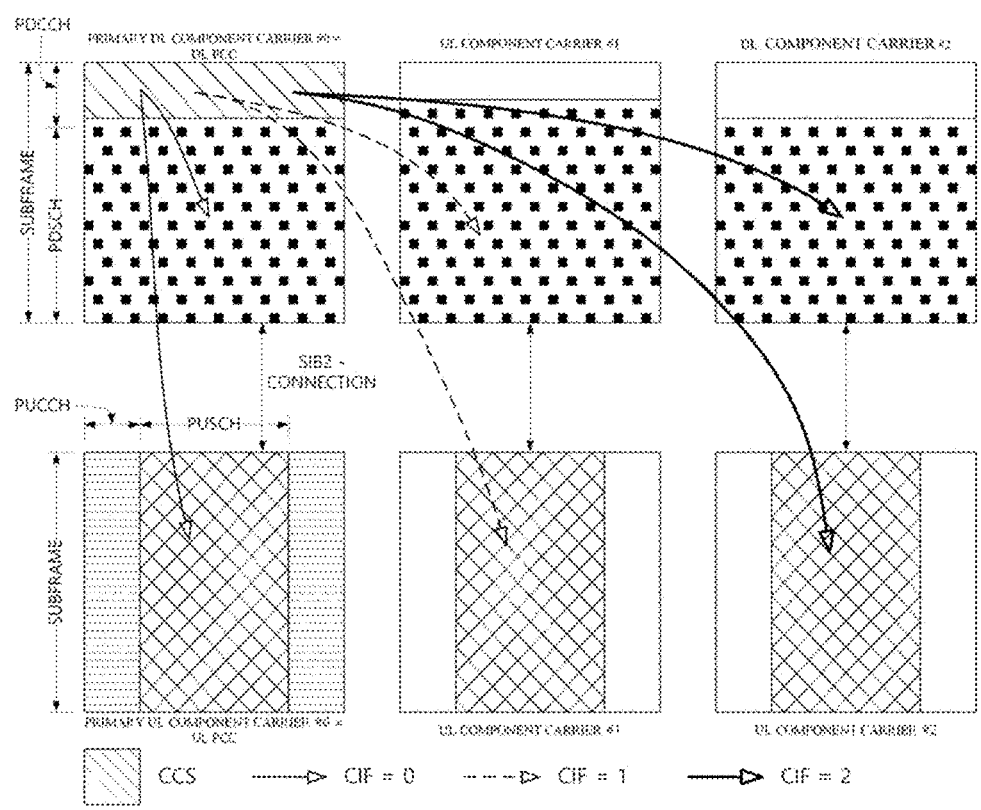
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
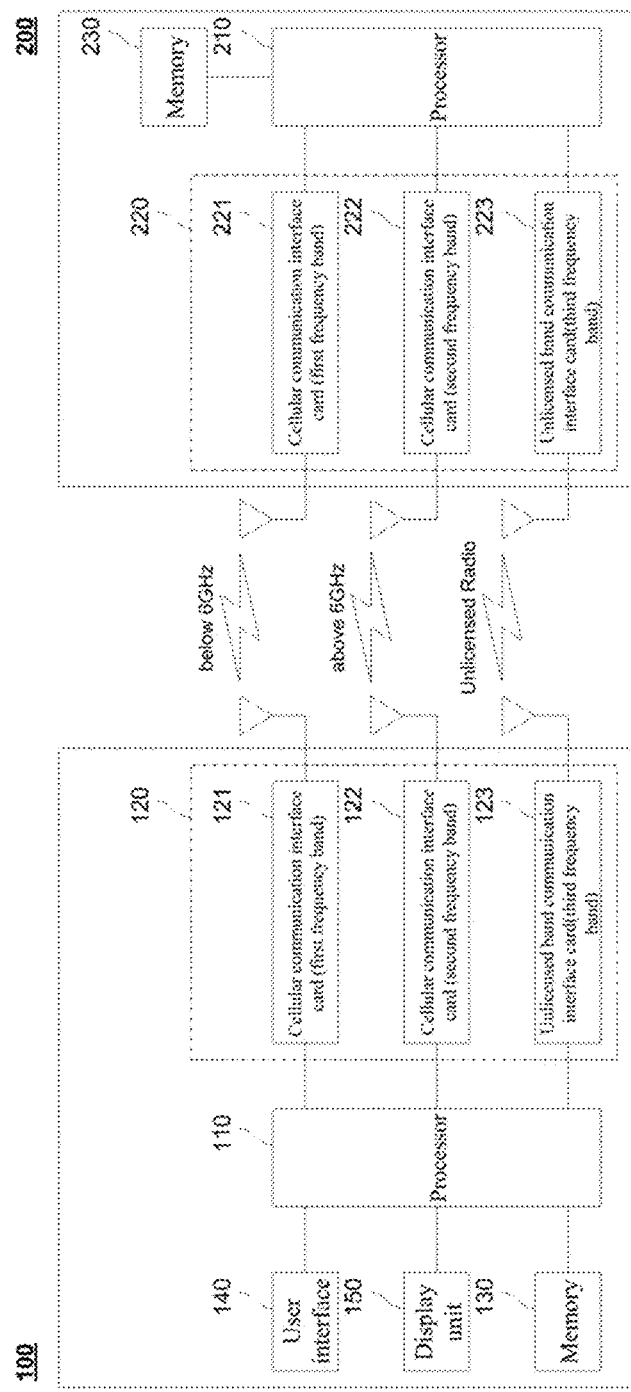
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

UL Preemption Indication

The base station may schedule a time-frequency resource scheduled for transmission of a physical uplink data channel of a UE to another physical uplink channel or a physical uplink channel transmission of another UE. In addition, the base station may schedule a time-frequency resource scheduled for physical uplink transmission of any one UE to other types of physical uplink transmission to be transmitted to the corresponding UE. Scheduling the time-frequency resource, which is scheduled for a specific purpose, for other purpose in such a way is called a preemption. When a time-frequency resource scheduled for physical uplink transmission of one UE is preempted for physical uplink transmission of another UE, the base station may transmit an uplink (UL) preemption indicator indicating the preempted time-frequency resource among the time-frequency resources scheduled for uplink transmission of the UE to the UE. Here, the physical uplink channel may include a physical uplink data channel or a physical uplink control channel.

At this time, "UL preemption indication" is the name used for convenience of description, and may be referred to as different names such as a cancellation indication.

Figure 12:
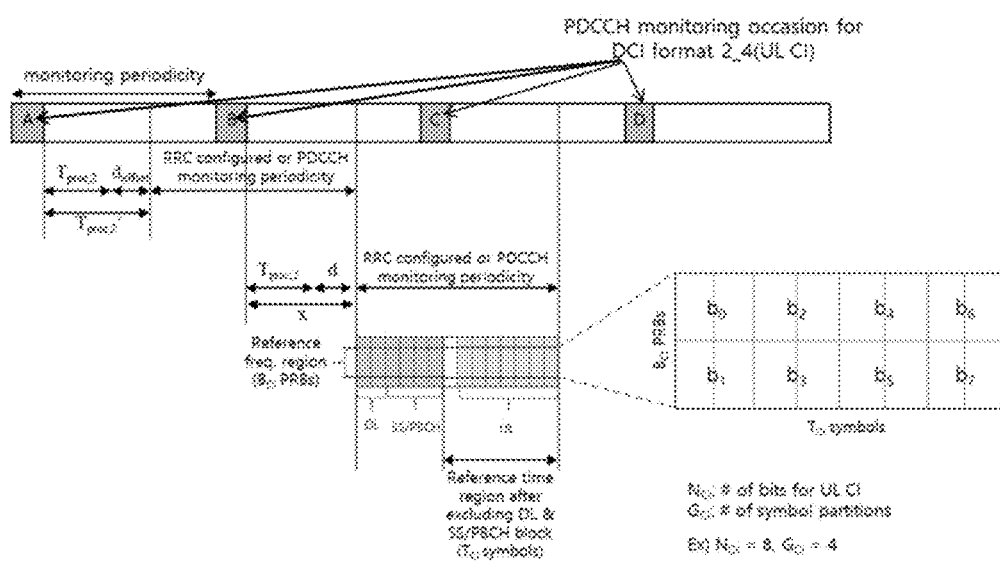
FIG. 12 illustrates an example of a method of receiving an indication for cancelling resources allocated for uplink transmission according to an embodiment of the present disclosure.

FIG. 12 illustrates an example of a method of receiving an indication for cancelling resources allocated for UL transmission according to an embodiment of the present disclosure Referring to FIG. 12, the UE may detect a PDCCH in the monitoring occasion of monitoring periodicity, and may cancel the resource scheduled for UL transmission on the basis of a UL preemption indication included in the detected PDCCH.

Specifically, as shown in FIG. 12, the UE may detect PDCCHs in monitoring occasions A, B, C, and D for each monitoring periodicity. At this time, the monitoring periodicity may be configured by a higher layer (e.g., RRC configuration information).

If DCI of a detected PDCCH is a specific format of DCI (e.g., DCI format 2_4) that includes a UL preemption indication for cancellation of the resources scheduled for UL transmission, the UE may cancel some or all of the resources scheduled for UL transmission on the basis of the UL preemption indication included in the DCI.

At this time, the time-frequency resource region that may be cancelled by the UL preemption indication may be referred to as a "reference resource region", and the reference resource region may include 'Y' symbols on the time axis and at least one physical resource block (PRB) on the frequency axis.

The number of symbols 'Y' in the reference resource region may be preconfigured by higher layer signaling (e.g., RRC configuration information), or may be determined on the basis of the monitoring periodicity of a PDCCH. At this time, in the reference resource region, some resource regions may be excluded from the preconfigured number of symbols or the monitoring periodicity.

Specifically, the resource region that may be cancelled by the UL preemption indication may include $T_{CI}$ symbols on the time axis and $B_{CI}$ PRBs on the frequency axis, and the $T_{CI}$ symbols may be obtained by excluding a specific resource region from the preconfigured number of symbols or the monitoring periodicity. At this time, the specific resource region may include one or more symbols among the symbols for a physical broadcast channel (PBCH)/synchronization signal (SS) and/or downlink symbols.

The reference resource region or the $T_{CI}$ symbols may be positioned after 'X' ($T_{proc,2'}$) symbols from the symbol in which a PDCCH, including a specific format of DCI including a UL preemption indication, is detected, and the value 'X' may be determined on the basis of a processing time $T_{proc,2}$ and an offset value $d_{offset}$ of the DCI. That is, the UE may determine the index of a first symbol of the reference resource region on the basis of a processing time and an offset value of DCI after the last symbol in which a PDCCH is detected.

$B_{CI}$, which is the number of PRBs on the frequency axis in the reference resource region, may be determined by a resource indication value (RIV) included in RRC configuration information. The RIV may indicate a starting PRB index and the number of consecutive RBs in the reference resource region on the frequency axis, and the UE may recognize the number of PRBs in the reference resource region on the frequency axis on the basis of the RIV value.

The UL preemption indication may indicate the resource region that is to be cancelled through a bitmap scheme. That is, the reference resource region may be divided into a plurality of resource groups according to the number of bits of the UL preemption indication, and each resource group may correspond to each bit of the UL preemption indication. Each resource group may be indicated to be or not to be cancelled according to a corresponding bit value.

For example, as shown in FIG. 12, in the case where $N_{CI}$, which is the number of bits of a UL preemption indication, is '8', the reference resource region may be divided into 8 groups $b_0$ to $b_7$ (four groups $G_{CI}$ on the time axis and two groups on the frequency axis), and the eight bits corresponding to $b_0$ to $b_7$, respectively, may indicate whether or not to cancel UL transmission.

The UE may interpret the numerology of the symbol indicated by the UL preemption indication as the numerology of a downlink cell in which the PDCCH of the UL preemption indication is detected, and may apply the same.

That is, even if the symbol indicated by the UL preemption indication is a symbol for UL transmission, the UE may apply the numerology of the corresponding symbol to the numerology of a downlink cell in which a PDCCH is detected.

Figure 13:
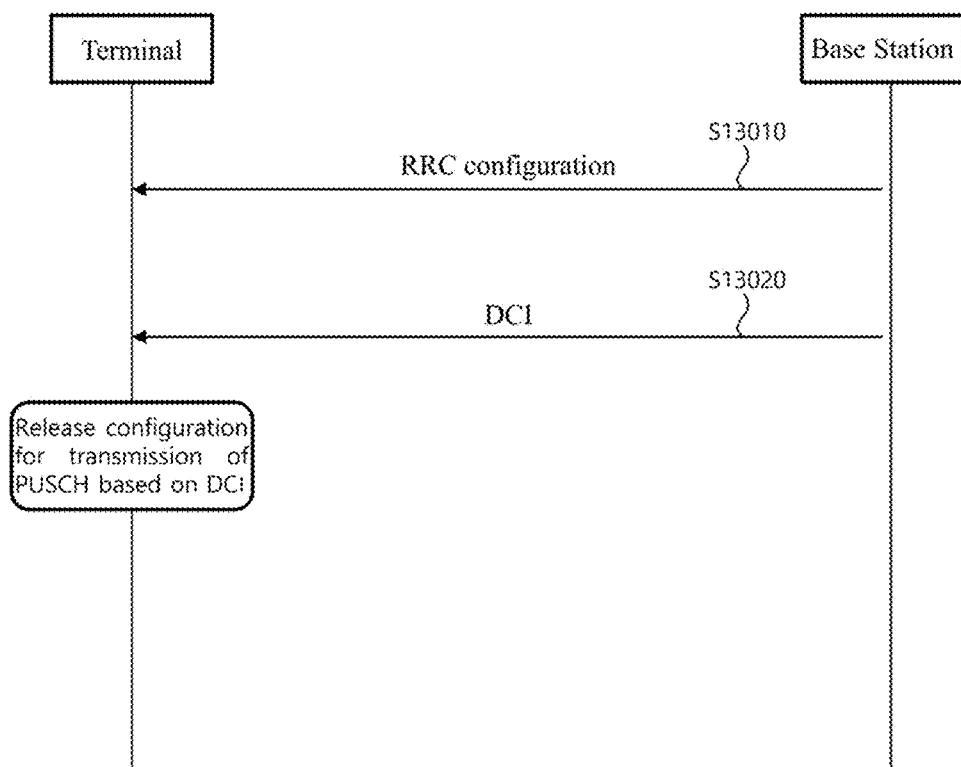
FIG. 13 is a flowchart illustrating an example of a method for cancelling resources allocated for uplink transmission according to an embodiment of the present disclosure.

FIG. 13 is a flowchart illustrating an example of a method for cancelling resources allocated for UL transmission according to an embodiment of the present disclosure.

Referring to FIG. 13, the UE may cancel the resource for scheduled UL transmission on the basis of an indication of DCI transmitted through a PDCCH.

Specifically, the UE receives RRC configuration information including information for receiving downlink control information (DCI) from the base station (S13010).

For example, RRC configuration information may include information related to a control resource set (CORESET) and a search space in order for the UE to detect a PDCCH including downlink control information (e.g., monitoring periodicity for detecting a PDCCH and the like). At this time, the information related to the control resource set may include at least one of an identifier (ID) of the control resource set that enables the UE to detect a PDCCH including DCI, control channel element (CCE) configuration information and duration of the control resource set, or frequency resource information. At this time, the information related to the search space may include at least one of an identifier (ID) of the search space that enables the UE to detect a PDCCH including DCI, the format of DCI that may be detected in each search space, detection duration, or resource information.

In addition, the RRC configuration information may further include an offset value for determining a starting symbol of the reference resource region described with reference to FIG. 12.

Thereafter, the UE may receive DCI by detecting a PDCCH in the monitoring occasion within the monitoring periodicity on the basis of the RRC configuration information (S13020).

In this case, the DCI may include a UL preemption indication or a cancellation indication, which indicates cancellation of some or all of the resources scheduled for the UE for UL transmission.

The DCI including a UL preemption indication may have a specific format (e.g., DCI format 2_4), and may be transmitted through a group-common PDCCH scrambled using a specific RNTI configured by a higher layer in order to indicate the DCI for cancellation of the resource.

If DCI including a UL preemption indication is received, the UE may cancel UL transmission of the resource indicated by the UL preemption indication. At this time, the resource to be cancelled may be the resource scheduled by another PDCCH before the PDCCH transmitting a specific format DCI is detected.

With regard to the resource to be cancelled by the UL preemption indication, UL transmission of the resource may be cancelled according to corresponding bit values as described in FIG. 12.

Figure 14:
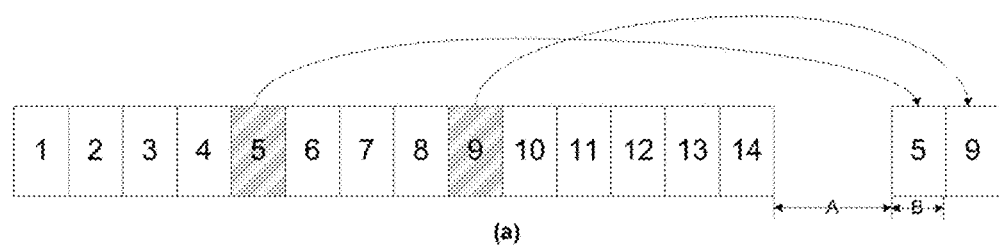
FIG. 14 illustrates a preemption indication used in a wireless communication system according to an embodiment of the present disclosure.
Figure 14:
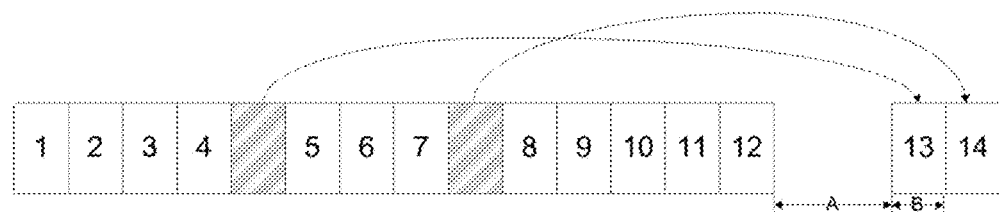

FIG. 14 illustrates a preemption indication used in a wireless communication system according to an embodiment of the present disclosure.

The base station may configure the UE so as to receive a UL preemption indication using an RRC signal. The base station may transmit a UL preemption indication to the UE through a PDCCH. If the UE is configured to receive a UL preemption indication through an RRC signal, the UE may receive the UL preemption indication through a PDCCH. The UE may obtain at least one of a search space for UL preemption indications, monitoring periodicity of UL preemption indications, the value of an RNTI, and the length of an RNTI through an RRC signal. The UE may monitor a UL preemption indication according to the obtained monitoring periodicity for UL preemption indications. In addition, the UE may monitor a UL preemption indication in the obtained search space for UL preemption indications. In addition, the UE may blind-decode DCI scrambled according to the obtained value of an RNTI and length of an RNTI. If the UE discovers DCI scrambled by the obtained value of an RNTI, the UE may determine the corresponding DCI to be the UL preemption indication. The base station may configure the same configuration of the UL preemption indication for a plurality of UEs using RRC signals. At this time, a PDCCH transmitting a UL preemption indication is a group-common PDCCH. The base station may configure UL preemption indications for any one UE using an RRC signal. At this time, the PDCCH transmitting a UL preemption indication may be a UE-specific PDCCH.

The time-frequency resources indicated to be or not to be preempted by the UL preemption indications may include all PRBs in the UL BWP. For the convenience of description, the time-frequency resources indicated to be or not to be preempted by the UL preemption indications will be referred to as a "reference resource region". If the monitoring periodicity of UL preemption indications is $T_{INT}$, the reference resource region may be expressed as the following equation.

$$\{mT_{INT}+1+\Delta_{offset}, mT_{INT}+2+\Delta_{offset}, \ldots, (m+1)T_{INT}+\Delta_{offset}\}$$

At this time, $\Delta_{offset}$ represents an offset of the time-frequency resource. Specifically, the offset of the time-frequency resource may be configured through an RRC signal. In another specific embodiment, the offset of the time-frequency resource may have a fixed value. In addition, the offset of the time-frequency resource may be a multiple of the number of symbols included in a slot. In addition, the offset of the time-frequency resource may be determined according to the PUSCH processing time of the UE. The minimum time required for the UE to receive a physical downlink control channel for scheduling the transmission of a physical uplink data channel and to generate a physical uplink data channel will be referred to as "Tproc". The offset of the time-frequency resource may be determined to be a larger number as Tproc increases. The offset of the time-frequency resource may be the value that increases in proportion to the value of Tproc. For example, the offset of the time-frequency resource may be determined to be ceil (Tproc/Symbol_duration). At this time, the Symbol_duration is the duration of an OFDM symbol. In addition, ceil(X) represents the smallest integer among the numbers equal to or greater than X. In addition, the UE may determine the offset of the time-frequency resource on the basis of TA (timing advance). Specifically, the UE may determine the offset of the time-frequency resource depending on the difference in time between a DL frame boundary and a UL frame boundary according to TA.

The base station may perform semi-static DL/UL assignment using a cell-specific RRC signal. A symbol may be configured as one of a UL symbol, a DL symbol, and a flexible symbol according to the semi-static DL/UL assignment. At this time, the UL symbol is capable of UL transmission, and the DL symbol is capable of DL transmission. The flexible symbol is capable of UL transmission or DL transmission according to a signal. The reference resource region may not include a DL symbol configured according to the semi-static DL/UL assignment. That is, the reference resource region may include a UL symbol and a flexible symbol configured according to the semi-static DL/UL assignment. In addition, the reference resource region may not include the flexible symbol positioned immediately after the DL symbol. At this time, the number of flexible symbols positioned immediately after the DL symbol, which are not included in the reference resource region, may be one. In another specific embodiment, the number of flexible symbols positioned immediately after the DL symbol, which are not included in the reference resource region, may be configured by an RRC signal.

The base station may configure the reception of a DL signal using a cell-specific RRC signal. The DL signal may include a SS/PBCH block. The reference resource region may not include the symbol that is configured to receive the DL signal. In addition, the reference resource region may not include the symbol positioned immediately after the symbol that is configured to receive the DL signal. At this time, the number of symbols positioned immediately after the symbol that is configured to receive the DL signal, which are not included in the reference resource region, may be one. In another specific embodiment, the number of symbols positioned immediately after the symbol that is configured to receive the DL signal, which are not included in the reference resource region, may be configured by an RRC signal.

The UL preemption indication may divide the reference resource region into N parts, and may indicate whether or not each of the N parts is preempted. At this time, N is a natural number. Specifically, the UL preemption indication may be a bitmap including N bits, and each of the N bits may indicate whether or not each of the N parts of the reference resource region is preempted. At this time, N is a natural number. Specifically, the UL preemption indication may be a bitmap having a length of 14 bits. At this time, the UL preemption indication may divide the reference resource region into 14 parts, and may indicate whether or not each of the 14 parts is preempted. The 14 parts of the reference resource region may be separated into 14 parts on the time axis. In another specific embodiment, the 14 parts of the reference resource region may be separated into 7 parts on the time axis and 2 parts on the frequency axis. A method of determining the number of symbols included in the part of the reference resource region will be described.

The reference resource region may be divided into N parts such that the difference in the number of symbols between the parts of the reference resource region is up to one. Specifically, in the case where the reference resource region includes a total of S symbols, mod(S, N) parts may include ceil(S/N) symbols, and (N−mod(S, N)) parts may include floor(S/N) symbols. mod(X, Y) indicates the remainder when X is divided by Y. ceil(X) indicates the smallest integer among the numbers equal to or greater than X. floor(X) indicates the largest integer among the numbers equal to or smaller than X. It may be given as mod(S, N)=S−floor(S/N)*N. At this time, mod(S, N) parts, which are positioned earlier in time, may include ceil(S/N) symbols. In addition, S and N are natural numbers, respectively, in the embodiments described above.

The UE may not transmit a physical uplink channel in the symbol indicated to be preempted by a UL preemption indication, and may transmit a physical uplink channel in the symbol indicated to not be preempted by a UL preemption indication. In another specific embodiment, the UE may sequentially transmit the physical uplink channels in the symbols capable of transmitting a physical uplink data channel, and may discard the remaining physical uplink channels. In an embodiment shown in FIG. 12, the UE is scheduled to transmit physical uplink data channels in 14 symbols by the base station. At this time, the UL preemption indication indicates that a $5^{th}$ symbol and a $9^{th}$ symbol are preempted. As shown in (a) of FIG. 12, the UE may not transmit REs of the physical uplink data channel corresponding to the $5^{th}$ symbol and the $9^{th}$ symbol. In this case, the UE may transmit the REs of the physical uplink data channel corresponding to the $5^{th}$ symbol and the $9^{th}$ symbol in the time-frequency resources that are further allocated. In addition, the UE may sequentially transmit the REs of the physical uplink data channels corresponding to 12 symbols as shown in (b) of FIG. 12. At this time, the UE may transmit the REs of the physical uplink data channel corresponding to a $13^{th}$ symbol and a $14^{th}$ symbol in the time-frequency resources that are further allocated.

The UE may transmit the physical uplink channel, which failed to be transmitted due to preemption, in the time-frequency resource that is different from the preempted time-frequency resource. At this time, the different time-frequency resource may be the resource different from the resource for transmission of the prescheduled physical uplink channel. For convenience of description, the different time-frequency resource will be referred to as an "additional time-frequency resource". The additional time-frequency resource may be the time-frequency resource for UL transmission, which is positioned in time after the resource for transmission of the prescheduled physical uplink channel. The physical uplink channel scheduled in the preempted time-frequency resource and the additional time-frequency resource may have the same frequency resource. The additional time-frequency resource may be the closest symbol among the symbols designated as UL symbols according to semi-static DL/UL assignment after the time-frequency resource in which the physical uplink data channel scheduled to the preempted time-frequency resource is scheduled. In another specific embodiment, the additional time-frequency resource may be a UL symbol or a flexible symbol according to semi-static assignment after the time-frequency resource in which the physical uplink channel scheduled to the preempted time-frequency resource is scheduled. In addition, the additional time-frequency resource may be the symbol positioned after N symbols from the physical uplink channel scheduled in the preempted time-frequency resource. At this time, N is a natural number. N may be configured through an RRC signal. In another specific embodiment, N may be a fixed number.

In the specific embodiment, the UL preemption indication may include information on a starting symbol of the additional time-frequency resources. The UE may transmit the physical uplink channel that failed to be transmitted due to preemption in the starting symbol of the additional resource indicated by the UL preemption indication and subsequent symbols thereof. In an embodiment shown in FIG. 12, the UL preemption indication indicates A for a starting symbol of the additional time-frequency resources. As shown in (a) of FIG. 14, the UE may transmit the REs of PUSCHs corresponding to the $5^{th}$ symbol and the $9^{th}$ symbol, which failed to be transmitted due to preemption, in the symbol after A from the symbol in which the PUSCH, scheduled in the preempted time-frequency resource, is scheduled. B in (a) of FIG. 14 is the length of the RE of the PUSCH corresponding to the $5^{th}$ symbol. In addition, as shown in (b) of FIG. 14, the UE may transmit the REs of the PUSCHs corresponding to the $13^{th}$ symbol and the $14^{th}$ symbol in the symbol after A from the symbol in which the PUSCH, scheduled in the preempted time-frequency resource, is scheduled. B in (b) of FIG. 14 is the length of the RE of the PUSCH corresponding to the $13^{th}$ symbol.

The UL preemption indication may indicate whether or not to transmit the physical uplink channel that failed to be transmitted due to preemption. The UE may determine whether or not to transmit the physical uplink channel, which failed to be transmitted due to preemption, on the basis of the UL preemption indication. Specifically, the UL preemption indication may indicate whether or not to transmit the physical uplink channel, which failed to be transmitted due to preemption, using a 1-bit field. For example, if the value of the 1-bit field is 1, the UE may transmit the physical uplink channel, which failed to be transmitted due to preemption, in the additional time-frequency resource. In addition, if the value of the 1-bit field is 0, the UE may not transmit the physical uplink channel that failed to be transmitted due to preemption.

Figure 15:
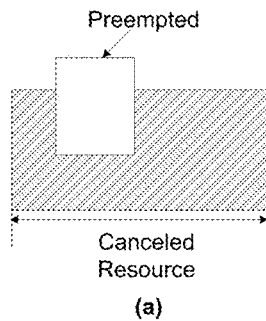
FIG. 15 illustrates a range of a physical uplink data channel that a wireless communication user equipment failed to transmit due to preemption according to an embodiment of the present disclosure.
Figure 15:
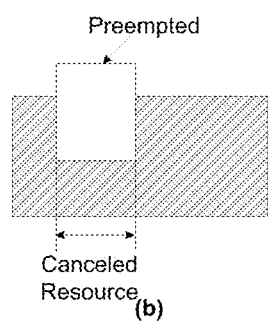
Figure 15:
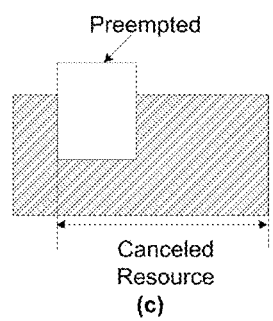

FIG. 15 illustrates a range of a physical uplink channel that a wireless communication UE failed to transmit due to preemption according to an embodiment of the present disclosure.

If the time-frequency region indicated to be preempted by a UL preemption indication and the time-frequency resource in which a physical uplink channel of the UE is scheduled to be transmitted overlap at least in part, the UE may not transmit the entirety of the corresponding physical uplink channel. In (a) of FIG. 15, the time-frequency region indicated to be preempted by a UL preemption indication and the time-frequency resource in which a physical uplink channel of the UE is scheduled to be transmitted overlap in part. At this time, the UE does not transmit the entirety of the physical uplink channel.

If the time-frequency region indicated to be preempted by a UL preemption indication and the time-frequency resource in which a physical uplink channel of the UE is scheduled to be transmitted overlap at least in part, the UE may not transmit the corresponding physical uplink channel only in the symbol that overlaps the time-frequency region indicated to be preempted by the UL preemption indication. In (b) of FIG. 15, the time-frequency region indicated to be preempted by a UL preemption indication and the time-frequency resource in which a physical uplink channel of the UE is scheduled to be transmitted overlap in part. At this time, the UE does not transmit the corresponding physical uplink channel in the symbol that overlaps the time-frequency region indicated to be preempted by the UL preemption indication.

If the time-frequency region indicated to be preempted by a UL preemption indication and the time-frequency resource in which a physical uplink channel of the UE is scheduled to be transmitted overlap at least in part, the UE may not transmit the corresponding physical uplink channel in the time-frequency resource, in which the corresponding physical uplink channel is scheduled to be transmitted, in or after the symbol corresponding to the time-frequency region indicated to be preempted by the UL preemption indication. In (c) of FIG. 15, the time-frequency region indicated to be preempted by a UL preemption indication and the time-frequency resource, in which a physical uplink channel of the UE is scheduled to be transmitted, overlap in part. At this time, the UE does not transmit the corresponding physical uplink channel in or after the symbol of the time-frequency region indicated to be preempted by the UL preemption indication.

The physical uplink channel may include a DMRS for channel estimation. If a DMRS is not transmitted due to preemption, the base station may fail to receive the physical uplink channel transmitted by the UE. The UE needs to transmit the physical uplink channel that failed to be transmitted due to preemption in consideration of whether or not to transmit a DMRS. This will be described with reference to FIG. 16.

Figure 16:
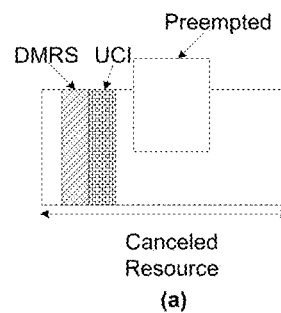
FIG. 16 illustrates an operation in which a user equipment transmits a PUSCH that the user equipment failed to transmit due to preemption according to an embodiment of the present disclosure.
Figure 16:
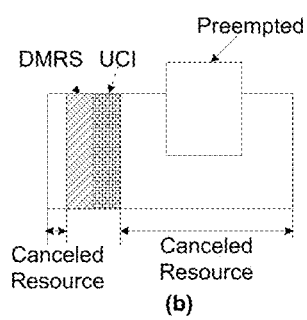
Figure 16:
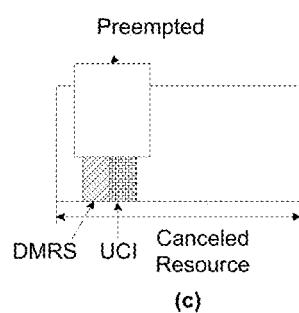

FIG. 16 illustrates an operation in which a UE transmits a physical uplink channel that failed to be transmitted due to preemption according to an embodiment of the present disclosure.

As described above, the UL preemption indication may include information on an additional time-frequency resource. The UE may transmit a physical uplink channel in the additional time-frequency resource on the basis of information on the additional time-frequency resource. At this time, the UE may transmit the physical uplink channel that failed to be transmitted due to preemption. In another specific embodiment, the UE may transmit the entirety of the physical uplink channel of which at least a portion failed to be transmitted due to preemption.

At this time, the information on the additional time-frequency resource may be expressed as the number of symbols or the number of slots. Specifically, the information on the additional time-frequency resource may indicate that the additional time-frequency resource is positioned after several symbols from the last symbol of the time-frequency resource on which preemption is performed or the last symbol of the reference resource region. Alternatively, the information on the additional time-frequency resource may indicate that the additional time-frequency resource is positioned after several slots from the last symbol of the time-frequency resource on which preemption is performed or the last symbol of the reference resource region. The symbol in which the additional time-frequency resource is positioned may be the earliest symbol after the time-frequency resource on which preemption is performed, among the symbols designated as UL symbols according to semi-static DL/UL assignment. In addition, the symbol in which the additional time-frequency resource is positioned may be the symbol indicated by DCI for scheduling transmission of a physical uplink channel.

The UE may determine the type of the physical uplink channel to be transmitted in an additional time-frequency resource according to whether the DMRS of the physical uplink channel is not able to be transmitted due to preemption. Specifically, if the UE fails to transmit a DMRS due to preemption, the UE may retransmit the entirety of the physical uplink channel of which at least a portion failed to be transmitted due to the preemption in the additional time-frequency resource. In addition, if the UE transmits a DMRS even though preemption occurs, the UE may transmit a portion of the physical uplink channel that failed to be transmitted due to preemption in the additional time-frequency resource. If the physical uplink channel that failed to be transmitted due to preemption does not include a DMRS, the UE may transmit both a portion of the physical uplink channel, which failed to be transmitted due to preemption, and the DMRS in the additional time-frequency resource.

In the embodiment in FIG. 16, the UE determines the time-frequency resource in which preemption occurs on the basis of a UL preemption indication. The UE is unable to transmit a physical uplink channel due to preemption. In (a) of FIG. 16, the UE is unable to transmit even the DMRS of the physical uplink channel due to preemption. Therefore, the UE transmits the entirety of the physical uplink channel in the additional time-frequency resource indicated by a UL preemption indication. In (b) of FIG. 16, the UE is unable to transmit a portion of the physical uplink channel due to preemption, but transmits the DMRS of the physical uplink channel. Therefore, the UE may transmit a portion of the physical uplink channel, which failed to be transmitted due to preemption, in the additional time-frequency resource. At this time, the UE transmits both the portion of the physical uplink channel and the DMRS.

Figure 17:
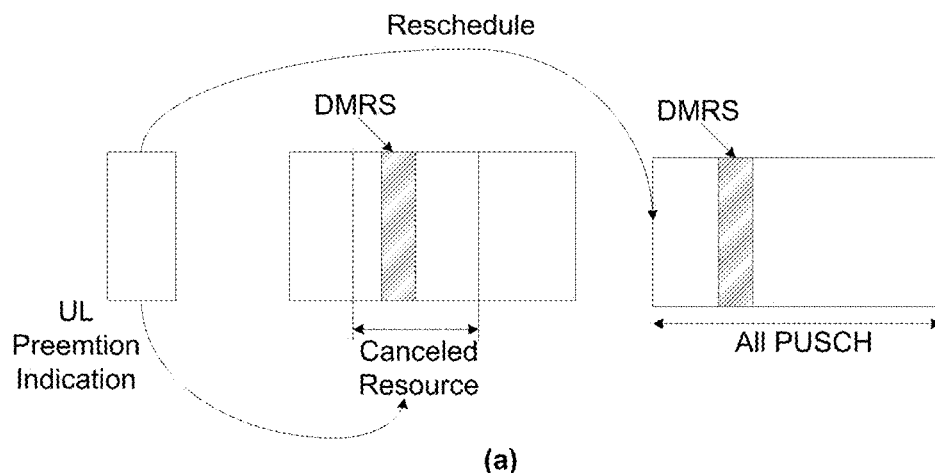
FIG. 17 illustrates a range of a physical uplink data channel that a wireless communication user equipment failed to transmit due to preemption according to another embodiment of the present disclosure.
Figure 17:
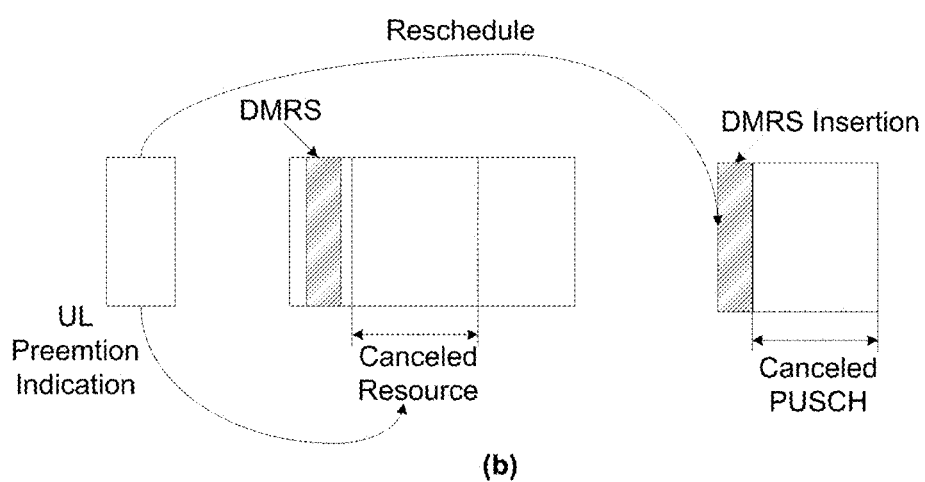

FIG. 17 illustrates a range of the physical uplink channel that a wireless communication UE failed to transmit due to preemption according to another embodiment of the present disclosure.

The physical uplink data channel may include a DMRS for channel estimation. In addition, the physical uplink data channel may include uplink control information (UCI). At this time, the UCI may be transmitted in REs around the DMRS symbol. In the case where the preemption does not affect the transmission of a DMRS and UCI, the UE may transmit a physical uplink data channel in the symbol in which the DMRS and the UCI are transmitted. At this time, the UE may not transmit a physical uplink data channel at the time and frequency indicated to be preempted by the UL preemption indication as shown in (a) of FIG. 17. In another specific embodiment, the UE may not transmit a physical uplink data channel in the remaining symbols, excluding the symbol in which the DMRS and the UCI are transmitted, as shown in (b) of FIG. 17. In the case where the preemption affects the transmission of the DMRS and the UCI, the UE may not transmit the entirety of the physical uplink data channel as shown in (c) of FIG. 17. The case where the preemption affects the transmission of the DMRS and the UCI may be the case where the time-frequency region indicated to be preempted by a UL preemption indication and the physical uplink channel, in which transmission of a DMRS or transmission of UCI is scheduled, overlap.

Figure 18:
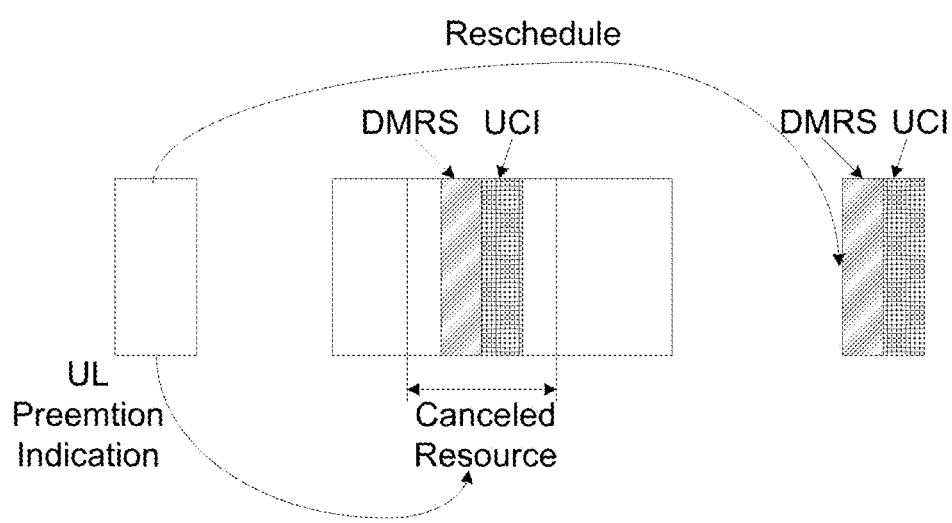
FIG. 18 illustrates an operation in which a user equipment transmits a DMRS and UCI that failed to be transmitted due to preemption according to an embodiment of the present disclosure.

FIG. 18 illustrates an operation in which a UE transmits a DMRS and UCI that failed to be transmitted due to preemption according to an embodiment of the present disclosure.

The UE may determine the type of a physical uplink data channel to be transmitted in an additional time-frequency resource according to the information included in the physical uplink data channel. Specifically, the UE may determine the type of a physical uplink data channel to be transmitted in the additional time-frequency resource depending on whether or not the preemption affects the transmission of uplink control information (UCI) included in the physical uplink data channel. The case where the preemption affects the transmission of UCI included in the physical uplink data channel may be the case in which at least some of the REs, in which the transmission of the UCI is scheduled, fail to be transmitted due to preemption. In the case where the preemption does not affect the transmission of the UCI included in the physical uplink data channel, the UE may not transmit only the physical uplink data channel scheduled in the time-frequency resource indicated by the UL preemption indication. At this time, the UE may not transmit a physical uplink data channel that failed to be transmitted due to preemption in the additional time-frequency resource. In the case where the preemption affects the transmission of the UCI included in the physical uplink data channel, the UE may not transmit the entirety of the physical uplink data channel, or may not transmit the physical uplink data channel indicated by the UL preemption indication. At this time, the UE may transmit the entirety of the physical uplink data channel or the physical uplink data channel indicated by the UL preemption indication in the additional time-frequency resource. At this time, the UE may transmit a physical uplink data channel including only the UCI in the additional time-frequency resource. Specifically, the UE may transmit a physical uplink data channel, excluding the symbol mapped only to a UL-shared channel (UL-SCH) from the physical uplink data channel. In another specific embodiment, the UE may transmit a physical uplink data channel, excluding the RE to which a UL-shared channel (UL-SCH) is mapped from the physical uplink data channel. In another specific embodiment, the UE may transmit a physical uplink data channel including both the UL-SCH and the UCI in the additional time-frequency resource. In this embodiment, the UCI may be limited to HARQ-ACK information. Alternatively, the UCI may include HARQ-ACK information and CSI. In the embodiment in FIG. 18, the UL preemption indication indicates that the RE, in which transmission of a DMRS and UCI is scheduled, is preempted. Therefore, the UE does not transmit the entirety of the physical uplink data channel or the physical uplink data channel indicated by the UL preemption indication. The UE transmits the physical uplink data channel including only the DMRS and the UCI in the additional time-frequency resource indicated by the UL preemption indication.

Specifically, the UE may determine the type of the physical uplink data channel to be transmitted in the additional time-frequency resource depending on whether or not the preemption affects the transmission of at least one of the UCI and the DMRS included in the physical uplink data channel. The case where the transmission of the UCI or the transmission of the DMRS included in the physical uplink data channel is affected may be the case where at least some of the REs, in which the transmission of the UCI is scheduled, and the REs, in which the transmission of the DMRS is scheduled, fail to be transmitted due to preemption. In the case where the preemption does not affect the transmission of the UCI or the transmission of the DMRS, which is included in the physical uplink data channel, the UE may not transmit the physical uplink data channel scheduled in the time-frequency resource indicated by the UL preemption indication. In this case, the UE may not transmit the physical uplink data channel that failed to be transmitted due to preemption in the additional time-frequency resource. In the case where the preemption affects the transmission of the UCI or the transmission of the DMRS, which is included in the physical uplink data channel, the UE may not transmit the entirety of the physical uplink data channel. At this time, the UE may transmit the entirety of the physical uplink data channel in the additional time-frequency resource. At this time, the UE may transmit a physical uplink data channel including only the UCI in the additional time-frequency resource. In another specific embodiment, the UE may transmit a physical uplink data channel including both a UL-SCH and UCI in the additional time-frequency resource. In this embodiment, the UCI may be limited to HARQ-ACK information. Alternatively, the UCI may include HARQ-ACK information and CSI.

When the UE of which the physical uplink channel is preempted by the UL preemption indication transmits the preempted physical uplink channel through the additional time-frequency resource, the UE may receive another UL preemption indication. In the case where preemption occurs in an additional time-frequency resource as described above, the UE may not transmit a physical uplink channel in the additional time-frequency resource. At this time, the UE may transmit the physical uplink channel that failed to be transmitted due to preemption in a new additional time-frequency resource on the basis of the UL preemption indication indicating the preemption in the additional time-frequency resource. Specifically, if the UL preemption indication indicating the preemption in the additional time-frequency resource indicates a new additional time-frequency resource, the UE may transmit the physical uplink channel that failed to be transmitted due to the preemption in the new additional time-frequency resource. In another specific embodiment, even if the UL preemption indication indicating the preemption in the additional time-frequency resource indicates a new additional time-frequency resource, the UE may not transmit the physical uplink channel that failed to be transmitted due to the preemption in the new additional time-frequency resource.

If a physical uplink control channel is preempted, the UE may determine whether or not to transmit the physical uplink control channel in the additional time-frequency resource depending on the information included in the physical uplink control channel. Specifically, if the physical uplink control channel includes HARQ-ACK, and if the preemption affects transmission of the physical uplink control channel, the UE may not perform transmission in the time-frequency resource in which the corresponding physical uplink control channel transmission is scheduled. At this time, the UE may transmit a physical uplink control channel that failed to be transmitted due to preemption in the additional time-frequency resource.

Hereinafter, a resource region in which a resource scheduled for UL transmission may be cancelled by a UL preemption indication will be described.

Reference Resource Region for UL Preemption Indication

In the present disclosure, the resource region in which UL transmission is cancelled by a UL preemption indication will be referred to as a "reference resource region". However, this is only for the convenience of the description, and the disclosure is not limited thereto.

The UE may detect a PDCCH of DCI including a UL preemption indication that indicates cancellation of the resource prescheduled for UL transmission through blind detection in the search space of a CORESET. At this time, the PDCCH of DCI including a UL preemption indication may be a group-common PDCCH scrambled by a specific RNTI (e.g., UL-INT-RNTI or the like).

For example, the UE may receive scheduling of the resources for UL transmission from the base station through the DCI of a PDCCH. Thereafter, the base station may transmit a PDCCH of DCI including a UL preemption indication for cancelling the resources scheduled for UL transmission to the UE, and the PDCCH of DCI including a UL preemption indication may be scrambled by a UL-INT-RNTI configured by a higher layer in order to indicate the DCI for cancellation of the scheduled resource.

If the UL preemption indication is successfully received (i.e., if a group-common DCI scrambled by a specific RNTI is detected), the UE may identify the reference resource region indicated by the UL preemption indication. In addition, the UE may identify the time-frequency resource in which UL transmission is cancelled in the reference resource region on the basis of information indicated by the UL preemption indication, and may cancel the UL transmission in the identified time-frequency resource. In the present disclosure, the frequency region of the reference resource region may include all physical resource blocks (PRBs) of an active bandwidth part (BWP).

FIGS. 19 to 24 illustrate an example of the reference resource region that may be indicated by a UL preemption indication according to an embodiment of the present disclosure.

Figure 19:
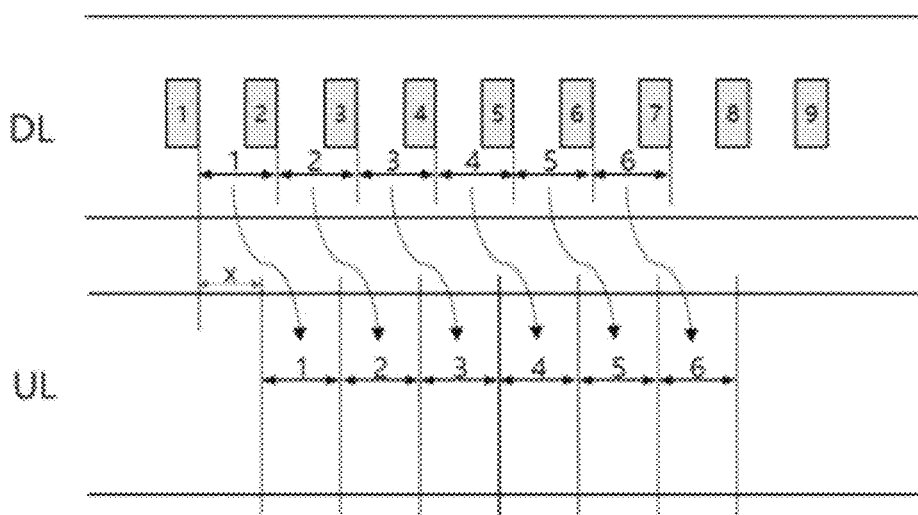
FIG. 19 illustrates an example of a resource indicated by a preemption according to an embodiment of the present disclosure.

As a first embodiment of the present disclosure, FIG. 19 illustrates an example of the resource indicated by a preemption according to an embodiment of the present disclosure.

Referring to FIG. 19, the reference resource region capable of being indicated by a UL preemption indication may be indicated to an extent equal to the interval between the symbols in which the UL preemption indication is received, and the indication may be made in or after the symbol after specific symbols from the last symbol in which the UL preemption indication is received.

Specifically, as shown in FIG. 19, if there are monitoring occasions for detecting a PDCCH of DCI including 9 UL preemption indications in a downlink cell, the reference resource regions capable of being indicated by the respective ones of the 9 preemption indications included in the DCI that may be detected in the respective monitoring occasions may be determined such that there is no overlapping resource region therebetween.

That is, the reference resource region, to which the UL preemption indication may be applied, may be the resource region indicated through a higher layer or a region from which specific symbols are excluded from the periodicity for monitoring a PDCCH.

In this case, since the reference resource regions indicated by the respective UL preemption indications are determined to not overlap, it is possible to most finely indicate the reference resource region using the same bits. However, in the embodiment described with reference to FIG. 19, if the UE fails to detect and receive at least one of a plurality of UL preemption indications (if the reception fails), it is impossible to cancel UL transmission in the resource region indicated by the UL preemption indication that failed to be received. In addition, in the case of a pause-without-resume scheme in which if at least one symbol is cancelled among the UL channels, the remaining symbols are cancelled, if the UE fails to receive at least one of a plurality of UL preemption indications, it is impossible to cancel UL transmission in the reference resource indicated by the UL preemption indication that failed to be received and UL transmissions subsequent thereto.

In other words, in the present embodiment, $T_{CI}$, which is the number of symbols of the reference resource region that may be cancelled by the UL preemption indication, may be the symbols obtained by excluding the symbols for reception of SS/PBCH blocks and/or the symbols indicated as downlink symbols by RRC configuration information from a plurality of symbols.

At this time, the plurality of symbols may be indicated by a higher layer (e.g., an MIB or a SIB) if the monitoring periodicity of a PDCCH for a search space set for a specific format of DCI is one slot, and if there are one or more monitoring occasions for monitoring a PDCCH in one slot. Otherwise, the plurality of symbols may be the same as the monitoring periodicity for monitoring a PDCCH.

If a plurality of symbols is configured by a higher layer, the plurality of symbols may be configured as one value among 2, 4, 7, or 14.

Figure 20:
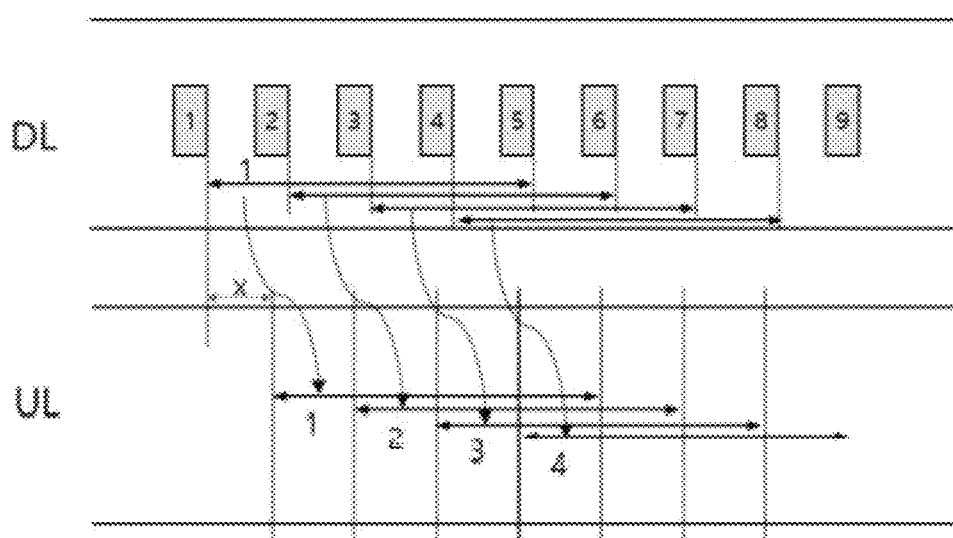
FIG. 20 illustrates another example of a resource indicated by a preemption according to an embodiment of the present disclosure.

As a second embodiment of the present disclosure, FIG. 20 illustrates another example of the resource indicated by a preemption according to an embodiment of the present disclosure.

Referring to FIG. 20, the reference resource region capable of being indicated by a UL preemption indication may be determined to be a plurality of symbols from the symbol after specific symbols from the last symbol in which the UL preemption indication is received.

Specifically, as shown in FIG. 20, the reference resource region capable of being indicated by the UL preemption indication may be determined to be 'Y' symbols after 'X' symbols from the symbol after the last symbol in which a PDCCH of DCI including a UL preemption indication is received. Here, the value 'X' will be described later.

At this time, 'Y' may be a predetermined value. For example, the value 'Y' may preferably be the number of symbols included in one slot (i.e., 14 symbols in the case of a normal CP, and 12 symbols in the case of an extended CP). Alternatively, the value 'Y' may be determined to be the larger value of a predetermined value or the monitoring periodicity for monitoring a PDCCH.

For example, if the predetermined value is 14, and if the periodicity for monitoring a PDCCH is 2 symbols, the number of symbols constituting the reference resource region capable of being indicated by the UL preemption indication may be determined to be 14. Alternatively, if the predetermined value is 14, and if the periodicity for monitoring a PDCCH is 28 symbols (2 slots), the number of symbols constituting the reference resource region capable of being indicated by the UL preemption indication may be determined to be 28.

FIG. 20 illustrates the case in which there are 9 monitoring occasions for monitoring a PDCCH of DCI including a UL preemption indication in downlink cell. In the case shown in FIG. 20, the reference resource region capable of being indicated by a UL preemption indication in each of a plurality of monitoring occasions may be determined such that a portion or the entirety of the reference resource region overlaps a portion or the entirety of preceding and/or subsequent reference resource region. Accordingly, even if the UE receives one UL preemption indication, the UE may obtain information for cancellation of UL transmission over the wide time region.

In addition, even if the UE fails to receive some of a plurality of UL preemption indications, the UE may obtain information for cancellation of UL transmission on the basis of the UL preemption indication received in another monitoring occasion.

Figure 40:
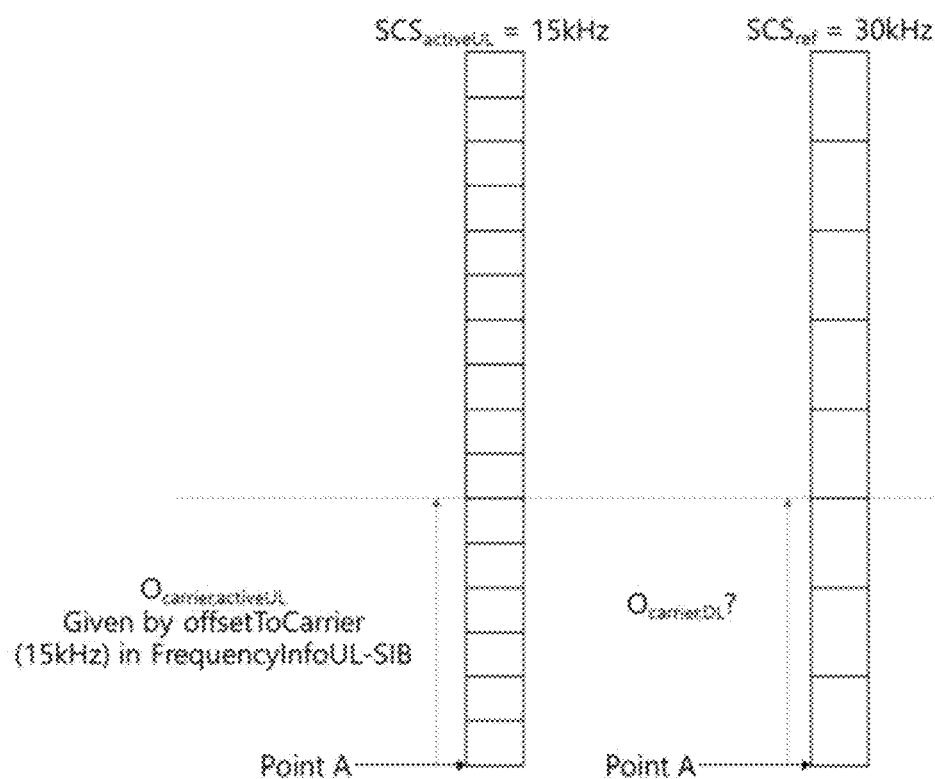
FIG. 40 illustrates an example of a method for determining an offset value according to a subcarrier spacing supported by an uplink according to an embodiment of the present disclosure.

For example, as shown in FIG. 40, there may be 9 monitoring occasions for receiving a PDCCH of DCI including UL preemption indications for cancellation of the resources scheduled for UL transmission, and the reference resource regions indicated by the UL preemption indications may overlap each other. That is, the reference resource region indicated by the second UL preemption indication may overlap the resource regions indicated by the first, third, and fourth UL preemption indications, and the reference resource region indicated by the third UL preemption indication may overlap the resource regions indicated by the second and fourth UL preemption indications.

In this case, even if the UE fails to detect a PDCCH of DCI including the second UL preemption indication, if a PDCCH of DCI including the first, third, and fourth UL preemption indications is successful detected, the UE may cancel the UL transmission for the reference resource region indicated by the second UL preemption indication even without receiving the second uplink preemption.

Figure 21:
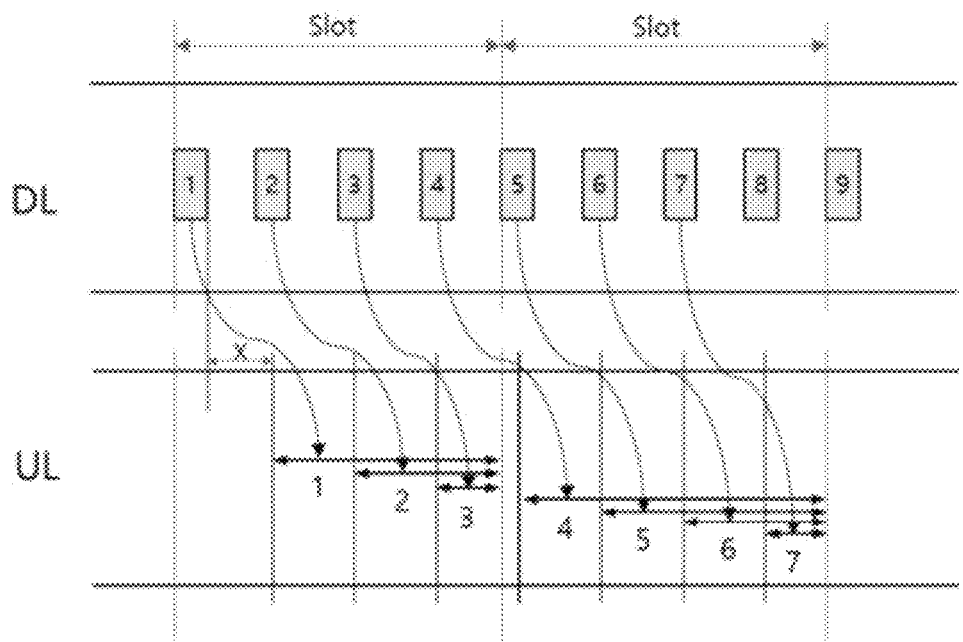
FIG. 21 illustrates another example of a resource indicated by a preemption according to an embodiment of the present disclosure.

As a third embodiment of the present disclosure, FIG. 21 illustrates another example of the resource indicated by a preemption according to an embodiment of the present disclosure.

Referring to FIG. 21, the reference resource region capable of being indicated by a UL preemption indication may be determined to be a plurality of symbols from the symbol after specific symbols from the last symbol in which the UL preemption indication is received. At this time, the plurality of determined symbols may be limited to the symbols included in the slot that includes a first symbol of the reference resource region indicated by the UL preemption indication.

That is, unlike the embodiments in FIG. 19 and FIG. 20, the symbols of the reference resource region capable of being indicated by UL preemption indications in the third embodiment shown in FIG. 21 may be determined to not exceed the boundary of a slot. In other words, the uplink channel of the UE that monitors a PDCCH of DCI including a UL preemption indication is scheduled within one slot. Accordingly, since information for canceling UL transmission in the next slot may not be required, the number of symbols capable of being indicated by UL preemption indications may be limited to one slot. In this case, the number of symbols included in the reference resource region may be reduced, so it is possible to more finely indicate the region in which UL transmission is cancelled.

Figure 22:
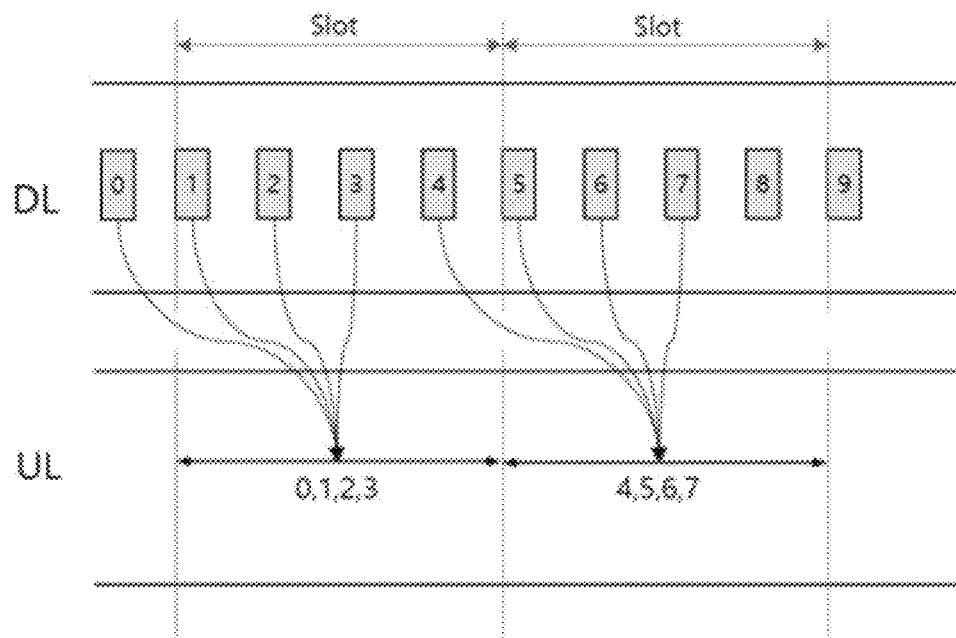
FIG. 22 illustrates another example of a resource indicated by a preemption according to an embodiment of the present disclosure.

As a fourth embodiment of the present disclosure, FIG. 22 illustrates another example of the resource indicated by a preemption according to an embodiment of the present disclosure.

Referring to FIG. 22, the reference resource region capable of being indicated by UL preemption indications may be determined to be a plurality of symbols from the symbol after specific symbols from the last symbol in which the UL preemption indication is received. Although the reference resource regions indicated by UL preemption indications have different starting symbols from each other in FIGS. 19 to 21, the reference resource regions indicated by UL preemption indications have the same starting symbol, which is the first symbol of each slot, in FIG. 22.

The uplink channel of the UE that monitors UL preemption indications may be scheduled within one slot, and if UL transmission of a front symbol is cancelled in the slot, the symbols subsequent thereto may also be cancelled (pause without resume). Accordingly, it is important to indicate whether or not to cancel the symbols positioned at the front of the slot.

As shown in FIG. 22, in the fourth embodiment, even if only one of four UL preemption indications indicating the cancellation of UL transmission of the symbols in the same slot is received, the UE may recognize information on the preemption in the slot.

Figure 23:
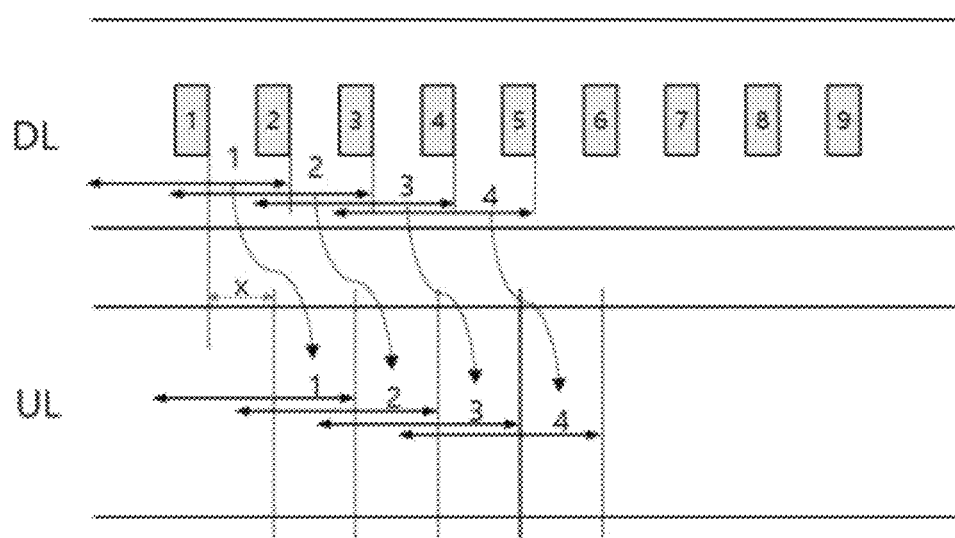
FIG. 23 illustrates another example of a resource indicated by a preemption according to an embodiment of the present disclosure.

As a fifth embodiment of the present disclosure, FIG. 23 illustrates another example of the resource indicated by a preemption according to an embodiment of the present disclosure.

Referring to FIG. 23, the reference resource region capable of being indicated by a UL preemption indication may include 'Y' symbols preceding the symbol after 'X' symbols from the last symbol of the monitoring occasion after the UL preemption indication is received.

For example, as shown in FIG. 23, the reference resource region indicated by a UL preemption indication received in the first monitoring occasion may be determined to be 'Y' symbols preceding the symbol after 'X' symbols from the last symbol of the second monitoring occasion.

At this time, the value 'Y' may be the same as a predetermined value or the monitoring periodicity of a PDCCH. For example, the value 'Y' may preferably be the number of symbols included in one slot (i.e., 14 symbols in the case of a normal CP, and 12 symbols in the case of an extended CP). Alternatively, the value 'Y' may be determined to be the maximum value of a predetermined value or the monitoring periodicity. That is, if the predetermined value is 14, and if the monitoring periodicity is 2 symbols, the value 'Y' may be determined to be 14. Alternatively, if the predetermined value is 14, and if the monitoring periodicity is 28 symbols (2 slots), the value 'Y' may be determined to be 28.

Alternatively, the value 'Y' may be determined to be the sum of Y1 and Y2, where Y1 may be a predetermined value, and Y2 may be the monitoring periodicity of a PDCCH. This is an embodiment in which Y1 or Y2 previous symbols are added to the reference resource region described with reference to FIG. 19. In this case, like the fourth embodiment in FIG. 22, the UE may receive information related to cancellation of the previous UL transmission.

Figure 24:
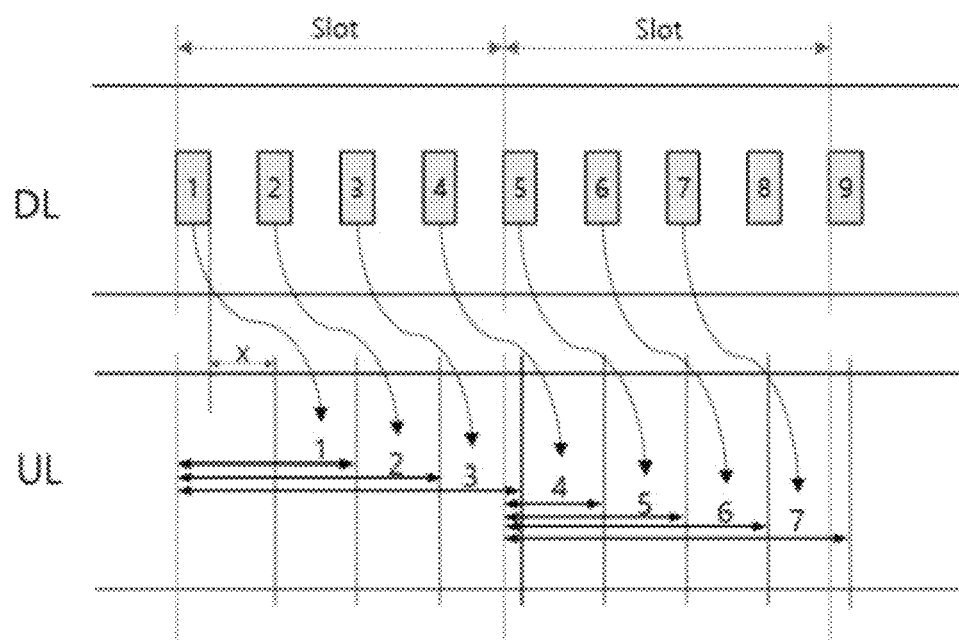
FIG. 24 illustrates another example of a resource indicated by a preemption according to an embodiment of the present disclosure.

As a sixth embodiment of the present disclosure, FIG. 24 illustrates another example of the resource indicated by a preemption according to an embodiment of the present disclosure.

Referring to FIG. 24, the reference resource region capable of being indicated by a UL preemption indication, the reference resource region capable of being indicated by an uplink preamble indication, similarly to the fifth embodiment, includes the symbols from a specific symbol after 'X' symbols from the last symbol of the monitoring occasion following the monitoring occasion, in which the uplink preamble indication is received, to the first symbol of the slot including the specific symbol. In this case, like the fourth and fifth embodiments described with reference to FIGS. 22 and 23, information for cancelling UL transmission previously transmitted may be obtained through the reception of the UL preemption indication. In addition, the present embodiment may reduce the number of symbols included in the reference resource region compared to the fifth embodiment described with reference to FIG. 23.

The value 'X' described in the first embodiment in FIG. 19 to the sixth embodiment in FIG. 24 may be determined to be the minimum number of symbols required to cancel UL transmission. That is, since the UE requires a processing time for decoding the PDCCH detected in the monitoring occasion of the monitoring periodicity, the UE may cancel UL transmission for the symbols positioned after a specific number of symbols from the reception of the UL preemption indication. Accordingly, only if the UL preemption indication is received in the symbol before a specific number of symbols from the symbol in which UL transmission is scheduled to be cancelled, the UE may cancel the UL transmission in the scheduled symbol. Accordingly, the value 'X' may correspond to the minimum number of symbols in consideration of the processing time.

If the UE receives scheduling of UL transmission by a PDCCH transmitted from the base station, the UE may determine the monitoring occasion to perform monitoring on the basis of the reference resource region configured from a higher layer. That is, if the resource scheduled for UL transmission and the reference resource region overlap in at least one symbol thereof, it is required to detect a PDCCH in the monitoring occasion related to the reference resource region and to blind-decode the UL preemption indication included in DCI. That is, since the UE must determine the resource region in which UL transmission is cancelled in the case where the reference resource region indicated through a higher layer overlaps the resource region scheduled for UL transmission, the UE must detect a PDCCH in the monitoring occasion capable of indicating the resource region that is cancelled in the corresponding reference resource region.

On the other hand, if the resource scheduled for UL transmission does not overlap the reference resource region configured through a higher layer, the UL preemption indication for cancelling UL transmission in the reference resource region is not required to be blind-decoded.

At this time, the UL transmission, which is to be cancelled by applying the UL preemption indication with a specific format of DCI, may be PUSCH transmission, SCS transmission, PRACH transmission, or the like.

The UE may receive, from the base station, the value 'X' and the value 'Y' for determining the position of the reference resource region on the time axis. At this time, the value 'X' is intended to determine a starting symbol of the reference resource region, and the value 'Y' is intended to determine the number of symbols constituting the reference resource region. That is, if the UE detects and receives a PDCCH of DCI including a UL preemption indication, the reference resource region may be configured as 'Y' consecutive symbols including a starting symbol that is positioned after X symbols from the last symbol of the PDCCH according to the values 'X' and 'Y' configured by a higher layer. In this case, in order to apply the values 'X' and 'Y' configured by downlink RRC configuration information to the symbols for UL transmission, it is required to determine the subcarrier spacing and CP type of the symbols to which the values 'X' and 'Y' are applied.

That is, since the subcarrier spacing and the CP type of the symbol on the time axis may differ between the downlink and the uplink and/or between each cell for the uplink and the BWP, if a specific number of symbols configured through a downlink are applied to an uplink, the subcarrier spacing and the CP type for a specific number of symbols must be determined.

Hereinafter, a method for determining the numerology (e.g., the subcarrier spacing and the cyclic prefix (CP) type) for defining 'X' symbols and 'Y' symbols for determining a reference resource region will be described.

In a first embodiment, the subcarrier spacing and the CP type, which are the numerology for 'X' symbols and 'Y' symbols, may be configured for the UE together with the values 'X' and 'Y' by the base station. That is, the UE may be configured with the subcarrier spacing and the CP type to be applied to 'X' symbols and 'Y' symbols, as well as the values 'X' and 'Y', through RRC configuration information (RRC signalling) by a higher layer. That is, the base station may include the subcarrier spacing and the CP type to be applied to 'X' symbols and 'Y' symbols, as well as the values 'X' and 'Y', in RRC configuration information, and may transmit the same to the UE.

The UE may determine 'X' symbols and 'Y' symbols according to the subcarrier spacing and the CP type configured through the RRC configuration information. At this time, the subcarrier spacing and the CP type may be configured for each cell. In this case, if the uplink bandwidth parts (UL BWPs) have different subcarrier spacings and CP types, the UE must interpret the subcarrier spacings and CP types for 'X' symbols and 'Y' symbols according thereto. Alternatively, the subcarrier spacing and the CP type may be configured for each UL BWP.

In a second embodiment, if 'X' symbols and 'Y' symbols are configured by RRC configuration information of a higher layer, the UE may make an interpretation by assuming that the subcarrier spacing and the CP type for 'X' symbols and 'Y' symbols are the subcarrier spacing and the CP type of the downlink BWP (DL BWP) of a cell in which a PDCCH of DCI including a UL preemption indication is detected.

That is, the UE may make an interpretation by applying the subcarrier spacing and the CP type of a DL BWP in which a UL preemption indication is received to 'X' symbols and 'Y' symbols for indicating the reference resource region in which UL transmission is cancelled by the corresponding UL preemption indication.

For example, if the subcarrier spacing of the DL BWP in which the uplink preemption indicator is received is 15 kHz and the CP type is normal CP, the UE may interpret the subcarrier spacing to be 15 kHz and the CP type thereof to be a normal CP for 'X' symbols and 'Y' symbols, and may apply the same to the reference resource region even when the subcarrier spacing of the symbol for uplink transmission canceled by the uplink preemption indicator is 30 kHz and the CP type is extended type.

In other words, the UE may determine the symbol interval (subcarrier spacing) for UL transmission to be cancelled to be the symbol interval of the activated downlink BWP for monitoring the PDCCH in a specific format including the UL preemption indication.

In a third embodiment, the subcarrier spacing and the CP type for 'X' symbols and 'Y' symbols may be determined on the basis of the subcarrier spacing and the CP type of a UL BWP that makes a pair with the DL BWP of the cell in which the UL preemption indication is transmitted. At this time, the DL BWP and the UL BWP may have the same BWP ID.

In a fourth embodiment, the subcarrier spacing and the CP type for 'X' symbols and 'Y' symbols may be determined on the basis of the subcarrier spacing and the CP type of an uplink cell having the lowest cell ID.

In a fifth embodiment, the subcarrier spacing and the CP type for 'X' symbols and 'Y' symbols may be determined on the basis of the smallest subcarrier spacing or the largest subcarrier spacing among the subcarrier spacings of the uplink cell, and the CP type therefor.

The subcarrier spacing and the CP type for 'X' symbols and 'Y' symbols configured through a higher-layer signal may be determined using the methods described above.

The reference resource region is a set of uplink resources capable of being cancelled by UL preemption indications. Here, the uplink resources may include at least one PRB on the frequency axis and at least one symbol on the time axis. If the subcarrier spacing of a PDCCH transmitting a UL preemption indication is different from the subcarrier spacing of PUSCH or SRS transmission, which is UL transmission, the symbols included in the reference resource region may be determined through the following method.

First, the UE may receive a configuration of a reception periodicity and an offset of a PDCCH transmitting a UL preemption indication from the base station. The reception periodicity and the offset may be configured in units of slots. That is, it may be configured to receive UL preemption indications every few slots. Additionally, the base station may indicate, to the UE, the symbols for receiving a PDCCH transmitting a UL preemption indication in a slot. For example, the base station may indicate, to the UE, the symbol for receiving a PDCCH, in which UL CI is transmitted, using 14 bits of bitmap. The respective bits of the bitmap correspond to 14 symbols. If the bit value of the bitmap is 1, the PDCCH transmitting a UL preemption indication may be received in the corresponding symbol.

The symbol included in the uplink reference resource corresponding to one UL preemption indication may be determined as follows.

Y symbols from the symbol starting after 'X' (or $T_{proc,2}$) symbols from the symbol in which the PDCCH transmitting a UL preemption indication ends may be determined to be the reference resource region corresponding to the UL preemption indication. $T_{proc,2}$ is a value corresponding to the minimum time for PUSCH transmission. If the subcarrier spacing of the PDCCH transmitting a UL preemption indication is different from the subcarrier spacing of PUSCH or SRS transmission, 'Y', which is the number of symbols included in the reference resource region, may be determined through the following method.

Figure 25:
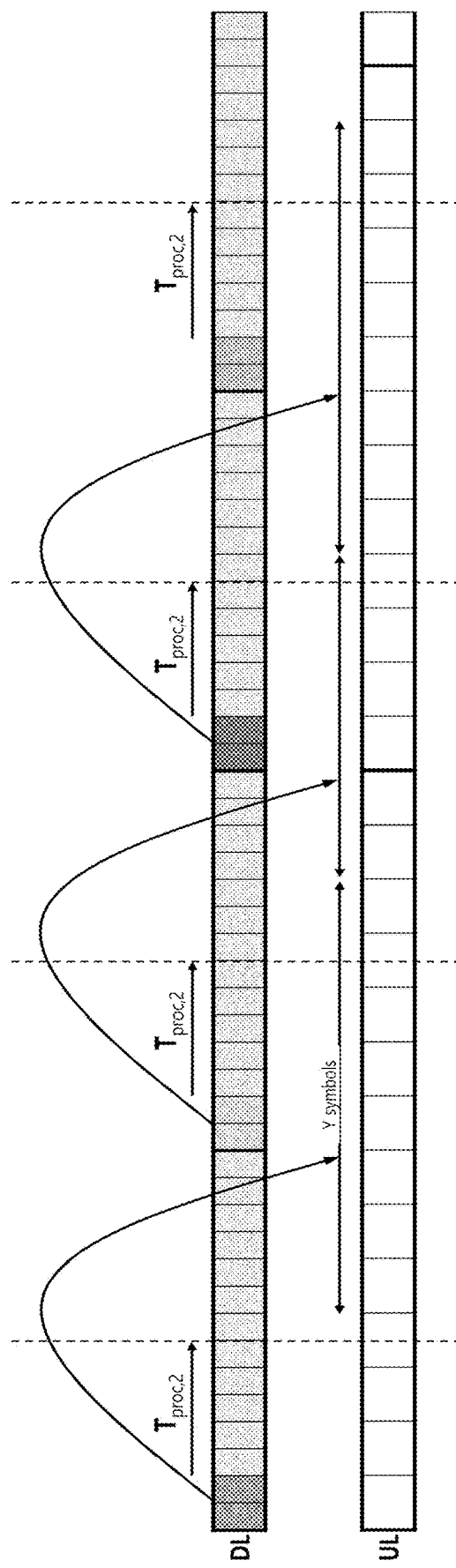
FIG. 25 illustrates an example of a method for determining the number of symbols included in a resource indicated by a preemption according to an embodiment of the present disclosure.

As a first embodiment of the present disclosure, FIG. 25 illustrates an example of a method for determining the number of symbols included in the resource indicated by a preemption according to an embodiment of the present disclosure.

Specifically, if the subcarrier spacing of a downlink BWP in which a PDCCH is received is smaller than the subcarrier spacing for UL transmission, 'Y' may be determined through the following equation (hereinafter, the subcarrier spacing of the downlink BWP in which a PDCCH is received will be referred to as "$\mu^{DL}$" and the subcarrier spacing for UL transmission will be referred to as "$\mu^{UL}$").

$$Y=2^{\char`\^}(\mu^{DL}-\mu^{UL})*S_{CI}$$

In the above equation, $S_{CI}$ is a value configured for the UE by the base station, and may have at least one of values 2, 4, 7, and 14. In addition, $S_{CI}$ may be determined to be the number of uplink symbols included in the periodicity for monitoring a PDCCH in which a UL preemption indication is transmitted. That is, it may be expressed as $S_{CI}=P_{CI}*N_{symb}$. Here, $P_{CI}$ is slot-based reception periodicity of a PDCCH transmitting a UL preemption indication. $N_{symb}$ is the number of symbols included in the slot for PUSCH or SRS transmission, which is UL transmission. For example, the number of symbols included in the slot in which a PUSCH or an SRS is transmitted is 14 in the case of the normal CP and 12 in the case of the extended CP.

In FIG. 25, the subcarrier spacing of a PDCCH transmitting a UL preemption indication is 15 kHz ($\mu^{DL}=0$), and the subcarrier spacing of PUSCH or SRS transmission is 30 kHz ($\mu^{UL}=1$). That is, approximately two uplink symbols may be included in one uplink symbol, and $S_{CI}$ is 14. In FIG. 25, Y is 7. That is, 7 symbols may be included in the reference resource region.

Figure 26:
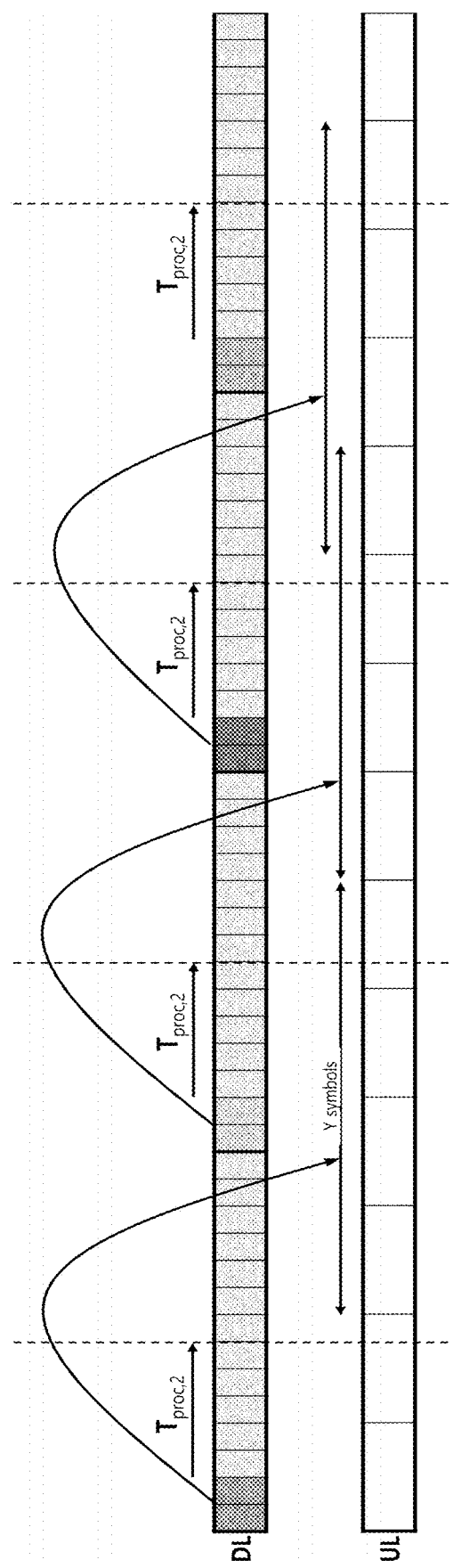
FIG. 26 illustrates another example of a method for determining the number of symbols included in a resource indicated by a preemption according to an embodiment of the present disclosure.

As a second embodiment of the present disclosure, FIG. 26 illustrates an example of a method for determining the number of symbols included in the resource indicated by a preemption according to an embodiment of the present disclosure.

The subcarrier spacing of the PDCCH transmitting a UL preemption indication may be 15 kHz ($\mu^{DL}=0$), and the subcarrier spacing of PUSCH or SRS transmission may be 60 kHz ($\mu^{UL}=2$). That is, approximately four uplink symbols may be included in one uplink symbol. In addition, $S_{CI}$ may be 14. In this case, according to the first embodiment described in FIG. 25, the value Y is 3.5, which is not a natural number. Therefore, a method for determining Y is required.

Specifically, if the subcarrier spacing of the downlink BWP in which a PDCCH is received is smaller than the subcarrier spacing for UL transmission, 'Y' may be determined through the following equation.

$$Y=\text{ceil}(2^{\char`\^}(\mu^{DL}-\mu^{UL})*S_{CI})$$

That is, the symbol that is partially included in the uplink reference resource is counted as one symbol. Therefore, 4 symbols may be included, instead of 3.5 symbols.

In FIG. 26, the subcarrier spacing of the PDCCH transmitting a UL preemption indication is 15 kHz ($\mu^{DL}=0$), and the subcarrier spacing of PUSCH or SRS transmission is 60 kHz ($\mu^{UL}=2$). The uplink reference resources corresponding to the first and second UL preemption indications have no symbols overlapping each other. However, the uplink reference resources corresponding to the second and third UL preemption indications have one symbol overlapping. Additional interpretation for the overlapping symbol is required.

Figure 27:
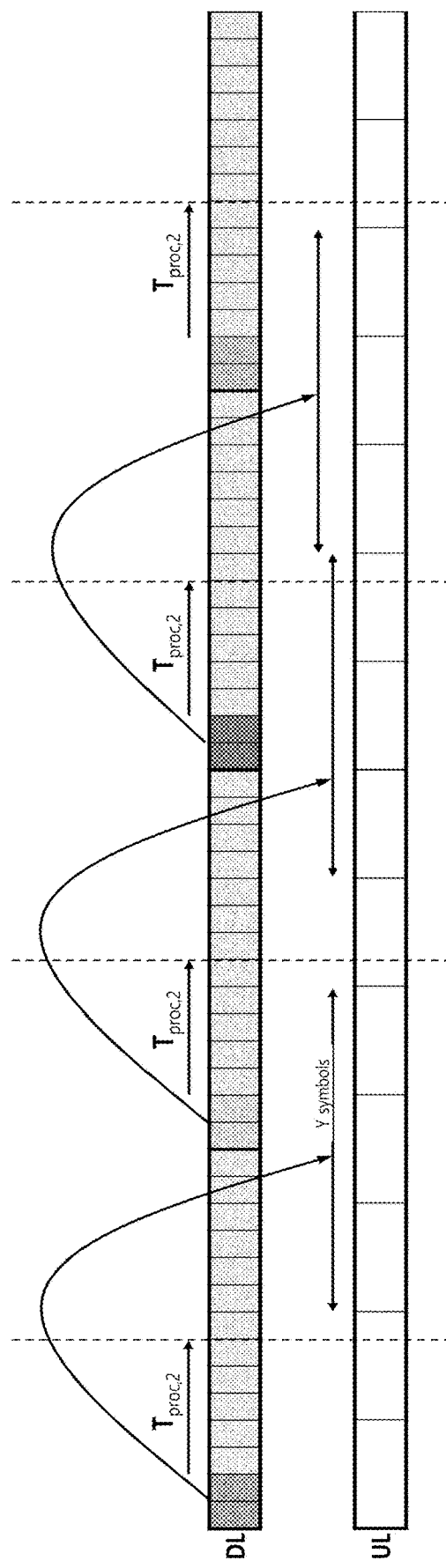
FIG. 27 illustrates another example of a method for determining the number of symbols included in a resource indicated by a preemption according to an embodiment of the present disclosure.

As a third embodiment of the present disclosure, FIG. 27 illustrates another example of a method for determining the number of symbols included in the resource indicated by a preemption according to an embodiment of the present disclosure.

Specifically, if the subcarrier spacing of the downlink BWP in which a PDCCH is received is smaller than the subcarrier spacing for UL transmission, 'Y' may be determined through the following equation.

$$Y = \text{floor}(2^{\wedge}(\mu^{DL} - \mu^{UL}) * S_{CI})$$

According to the above equation, the symbol that is partially included in the uplink reference resource may be excluded. Therefore, 3 symbols may be included in the reference resource region, instead of 3.5 symbols.

In FIG. 27, the subcarrier spacing of the PDCCH transmitting a UL preemption indication is 15 kHz ($\mu^{DL}=0$), and the subcarrier spacing of PUSCH or SRS transmission is 60 kHz ($\mu^{UL}=2$). The uplink reference resources corresponding to all UL preemption indications do not have symbols overlapping each other. However, there is one symbol, which is not able to be included, between the uplink reference resources corresponding to the first and second UL CIs. Accordingly, PUSCH or SRS transmission is not cancelled (or interrupted) in the corresponding symbol.

Figure 28:
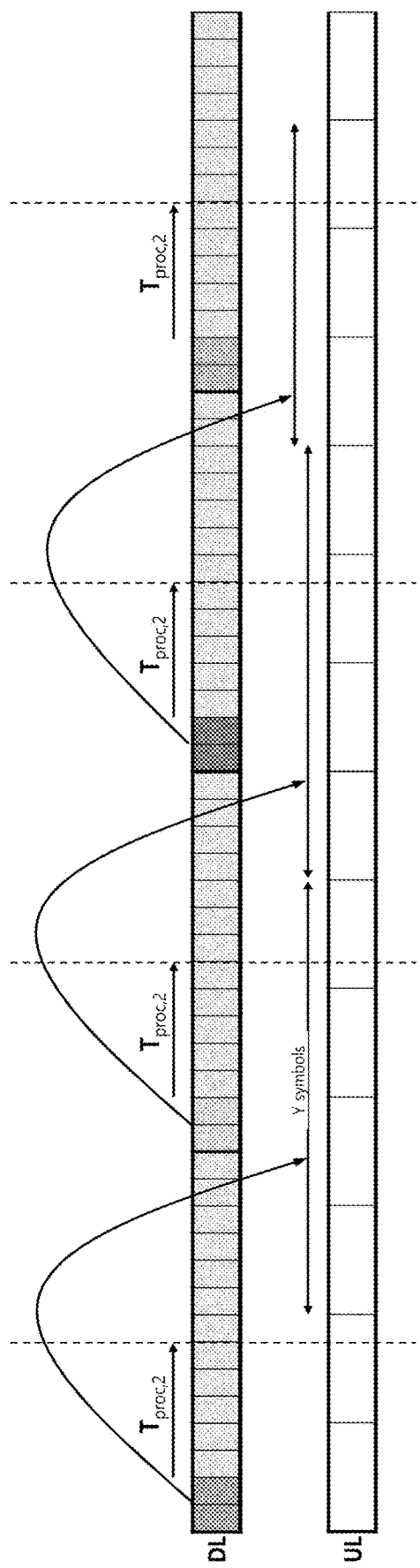
FIG. 28 illustrates another example of a method for determining the number of symbols included in a resource indicated by a preemption according to an embodiment of the present disclosure.

As a fourth embodiment of the present disclosure, FIG. 28 illustrates another example of a method for determining the number of symbols included in the resource indicated by a preemption according to an embodiment of the present disclosure.

Specifically, if the subcarrier spacing of the downlink BWP in which a PDCCH is received is smaller than the subcarrier spacing for UL transmission, 'Y' may be determined in the same manner as the second embodiment in FIG. 26.

However, unlike the second embodiment, the symbol included in the reference resource region of the previous UL preemption indication is not included in the subsequent reference resource region. That is, in the second embodiment, the symbol that is partially included in the reference resource region may be included in any one uplink reference resource. Accordingly, in the case of the fourth embodiment, a reference resource region including 3 symbols, instead of 3.5 symbols, and a reference resource region including 4 symbols may exist.

In FIG. 28, the subcarrier spacing of the PDCCH transmitting a UL preemption indication is 15 kHz ($\mu^{DL}=0$), and the subcarrier spacing of PUSCH or SRS transmission, which is UL transmission, is 60 kHz ($\mu^{UL}=2$). The uplink reference resources corresponding to the second and third UL preemption indications may include different numbers of symbols from each other. One symbol included in the uplink reference resource corresponding to the second UL preemption indication is not included in the uplink reference resource corresponding to the third UL preemption indication. Accordingly, in this case, the uplink reference resources corresponding to all UL preemption indications do not have symbols overlapping each other.

In another embodiment of the present disclosure, the UE may not expect configuration by a higher layer in which $2^{\wedge}(\mu^{DL} - \mu^{UL}) * S_{CI}$ is not a natural number. Here, the configuration by a higher layer may include at least one of the subcarrier spacing ($\mu^{DL}$) of a PDCCH in which a UL preemption indication is transmitted, the subcarrier spacing ($\mu^{UL}$) of PUSCH or SRS transmission, which is UL transmission, the number of symbols per slot ($N_{symb}$) determined according to a normal CP or an extended CP, information on the periodicity and offset of a PDCCH transmitting a UL preemption indication, or the value $S_{CI}$.

Downlink symbols may be excluded from the reference resource region for cancelling UL transmission. At this time, the downlink symbol may be the symbol designated as a downlink symbol by semi-static DL/UL configuration. In addition, symbols for further receiving SS/PBCH blocks may be excluded from the reference resource region.

The symbols according to the semi-static DL/UL configuration and the symbols for receiving SS/PBCH blocks may be limited to the symbols that are cell-commonly configured. That is, dedicated symbols may not be excluded, and only the downlink symbols cell-commonly configured and the symbols for receiving SS/PBCH blocks may be excluded from the reference resource region.

The UE may exclude the symbols corresponding to the SS/PBCH configuration assumed at initial access from the reference resource region. The UE may exclude the symbols corresponding to the SS/PBCH configuration assumed at initial access from the reference resource region only if the SS/PBCH is not separately configured.

The UL preemption indication transmitted in one PDCCH may include information for cancellation of UL transmission in several cells. At this time, a method of determining the reference resource region in several cells is required. Four pieces of information below are required to determine the time region of the reference resource region.

The UL preemption indication transmitted through one PDCCH may include information for cancellation of UL transmission in at least one cell. In this case, the reference resource region for at least one cell is required to be determined. That is, the UL preemption indication may provide the UE with additional information on one or more cells.

At this time, the following information may be required to determine the region on the time axis for the reference resource region.

Index of last symbol of PDCCH: Since different UL cells may have different subcarrier spacings and CP types, the index of the last symbol in which a PDCCH is received may differ between the UL cells. Accordingly, the UL preemption indication may include information related to the index of the last symbol of a PDCCH, which may be obtained together. For example, if there is one uplink symbol overlapping the last symbol in which a PDCCH is received in the UL cell, the corresponding symbol may be determined to be the last symbol in which a PDCCH is received.

If there are two or more uplink symbols overlapping the last symbol in which a PDCCH is received in the UL cell, the earliest (first) symbol may be determined to be the last symbol in which a PDCCH is received, or the latest (last) symbol may be determined to be the last symbol in which a PDCCH is received.

Values 'X' and 'Y' for identifying reference resource region and numerology (subcarrier spacing and CP type) for 'X' symbols and 'Y' symbols: If the UL preemption indication transmitted through one PDCCH includes information for cancellation of UL transmission in a plurality of cells, the UL preemption indication may further provide the UE with information on the value 'X', the value 'Y', and the numerology for 'X' symbols and 'Y' symbols. That is, parameters related to the reference resource region may be further provided by the UL preemption indication.

In the case where a serving cell is configured as a supplementary uplink (SUL) carrier, the number of fields included in a specific format of DCI for each serving cell with respect to the SUL carrier. That is, information related to the configuration of a UL preemption indication for a cross cell.

Payload size of a specific format of DCI

Indication of time-frequency resource by higher-layer signalling.

Among the additional information above, information on the value 'X', the value 'Y', and the numerology for 'X' symbols and 'Y' symbols may be obtained through the following method.

Firstly, the UE may receive a configuration of the value 'X', the value 'Y', and the numerology for 'X' symbols and 'Y' symbols for each cell. The UE may apply the configured value 'X', value 'Y', and numerology for 'X' symbols and 'Y' symbols to each cell. If a plurality of UL BWPs is configured in each cell, the value 'X', the value 'Y', and the numerology for 'X' symbols and 'Y' symbols may be individually interpreted depending on the UL BWP.

Secondly, the UE may receive a configuration of one value 'X', value 'Y', and numerology for 'X' symbols and 'Y' symbols from the base station. In addition, the UE may interpret UL BWPs according to configured one value 'X', value 'Y', and numerology for 'X' symbols and 'Y' symbols, respectively. For example, the UE may determine the symbols included in the reference resource region using the value 'X', the value 'Y', and the numerology for 'X' symbols and 'Y' symbols in a first UL cell, and may determine the symbols of another UL cell, which overlap the reference resource region, to be the reference resource region of another UL cell. If a portion of the symbol, instead of the entirety thereof, overlaps, the symbol may or may not be included in the reference resource region. In order to prevent the symbol from overlapping in part, the subcarrier spacing may be configured as the lowest value.

For example, if the subcarrier spacing is configured as 15 kHz, the case in which only some symbols in 30 kHz and 60 kHz UL cells are included may not occur.

In other words, the values 'X' and 'Y' may be determined on the basis of the smallest value among the subcarrier spacings of the UL cell and the DL cell. For example, the value 'X' may be determined according to the processing time as described above, and the processing time may be determined on the basis of the smallest value of the offset value configured by a higher layer, the smallest value among the subcarrier spacings of the UL cell and the DL cell, and the smallest value among the subcarrier spacings of the UL cell.

At this time, the offset value configured by a higher layer may be used to determine the first symbol of the reference resource region from the last symbol for a PDCCH of DCI in the case where a specific format of DCI is applied in order to cancel UL transmission.

Alternatively, if one value 'X', value 'Y', and numerology for 'X' symbols and 'Y' symbols are configured, although the same value 'X' and value 'Y' may be applied to each of a plurality of UL cells, the subcarrier spacing and the CP type may be interpreted depending on the UL BWP of the applied UL cell. For example, in the first UL cell, the subcarrier spacing and the CP type for 'X' symbols and 'Y' symbols may be determined according to the numerology of the first UL cell, and in the second UL cell, the subcarrier spacing and the CP type for 'X' symbols and 'Y' symbols may be determined according to the numerology of the second UL cell.

In this case, since the subcarrier spacing may differ between the first UL cell and the second UL cell, although the value X' and the value 'Y' may be the same between the first UL cell and the second UL cell, the absolute time may differ therebetween.

Hereinafter, a detailed description will be made with reference to FIGS. 29 to 31.

Figure 29:
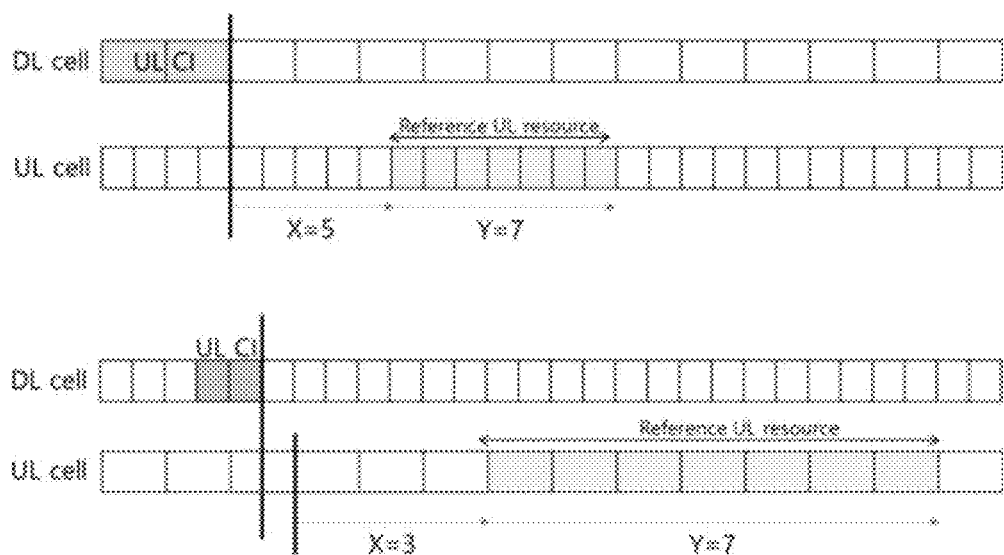
FIG. 29 illustrates an example of a method for determining a resource indicated by a preemption according to an embodiment of the present disclosure.
Figure 30:
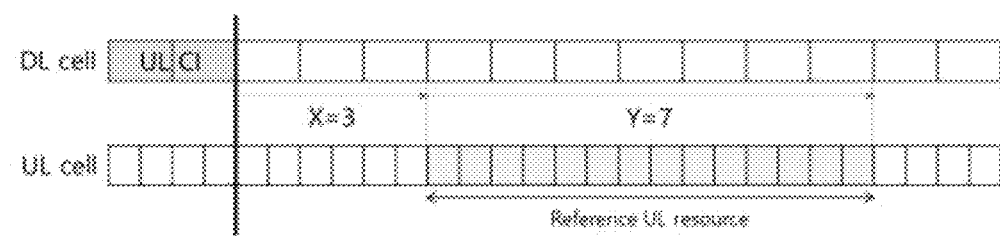
FIG. 30 illustrates another example of a method for determining a resource indicated by a preemption according to an embodiment of the present disclosure.
Figure 31:
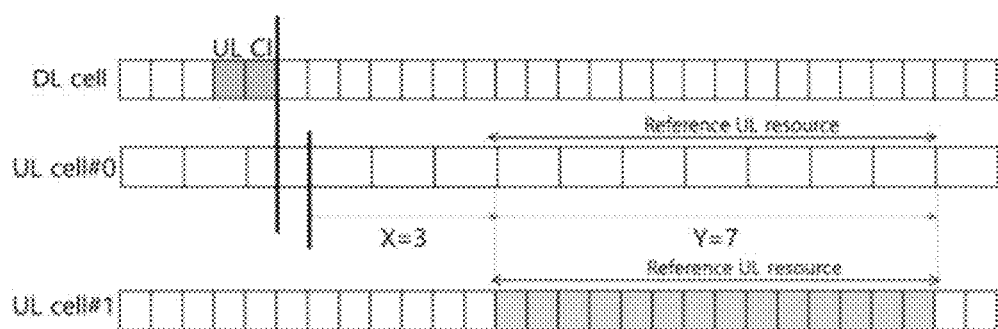
FIG. 31 illustrates another example of a method for determining a resource indicated by a preemption according to an embodiment of the present disclosure.

FIGS. 29 to 31 show an example of a method for determining the resource indicated by a preemption according to an embodiment of the present disclosure.

FIG. 29 shows an example of a method for determining the resource indicated by a preemption according to an embodiment of the present disclosure. Referring to FIG. 29, the UE may receive a configuration of the value 'X', the value 'Y', and the numerology for 'X' symbols and 'Y' symbols for each cell from the base station. In this case, as shown in FIG. 29, the UE may recognize that the starting symbol of a reference resource region is positioned after the configured 'X' symbols from the last symbol overlapping the symbol that receives a PDCCH, among the symbols of the cell to which the UL preemption indication is applied, and that 'Y' symbols from the starting symbol constitute the reference resource region. At this time, the configured values may be applied to the subcarrier spacing and the CP type for the 'X' symbols and the 'Y' symbols.

FIG. 30 shows another example of a method for determining the resource indicated by a preemption according to an embodiment of the present disclosure. Referring to FIG. 30, the UE may receive a configuration of the value 'X' and the value 'Y' for a cell from the base station. In this case, the UE may determine that the starting symbol of a reference resource region is positioned after 'X' symbols from the last symbol that receives a UL preemption indication through the detection of a PDCCH in a DL cell, and that 'Y' symbols from the starting symbol are included in the reference resource region.

Here, the subcarrier spacing and the CP type configured in the DL cell may be applied to the 'X' symbols and the 'Y' symbols. In addition, the reference resource region in the UL cell may include symbols overlapping the reference resource region determined in the DL cell. In this case, as described above, the symbols overlapping only in part thereof, among the symbols of the reference resource regions, may or may not be included in the reference resource region.

FIG. 31 illustrates another example of a method for determining the resource indicated by a preemption according to an embodiment of the present disclosure. Referring to FIG. 31, the UE may receive, from the base station, a configuration of the value 'X', the value 'Y', and the subcarrier spacing and CP type for 'X' symbols and 'Y' symbols for a cell. Referring to FIG. 31, UL cell #0 represents the cell to which the configured subcarrier spacing and CP type are applied. The UE may determine the last symbol among the uplink symbols overlapping the last symbol receiving a UL preemption indication. In addition, the UE may determine that the first symbol constituting a reference resource region is positioned after 'X' symbols from the determined last symbol, and 'Y' symbols from the first symbol are included in the reference resource region. At this time, the subcarrier spacing and the CP type for 'X' symbols and 'Y' symbols are the subcarrier spacing and the CP type configured together with UL cell #0.

The UE, having determined the reference resource region in UL cell #0 according to the value 'X' and the value 'Y', may determine the reference resource region of UL cell #1 in which cancellation of UL transmission is actually performed by a UL preemption indication on the basis of UL cell #0. Specifically, the UE may determine the region of UL cell #1 overlapping the reference resource region of UL cell #0 to be the reference resource region in which UL transmission is actually cancelled.

Although it has been described in the previous embodiment that both the value 'X' and the value 'Y' may be configured by RRC or DCI, one of the two values may be determined on the basis of the subcarrier spacing of the UE, instead of being configured by RRC or DCI.

For example, the value 'X' may be determined on the basis of the processing time according to the subcarrier spacing. At this time, the subcarrier spacing may be the subcarrier spacing of the UL cell, or may be the subcarrier spacing configured by RRC.

Alternatively, the value 'X' may be determined according to the processing time as described above, and the processing time may be determined on the basis of the smallest value of the offset value configured by a higher layer, the smallest value among the subcarrier spacings of the UL cell and the DL cell, and the smallest value among the subcarrier spacings of the UL cell.

At this time, the offset value configured by a higher layer may be used to determine the first symbol of the reference resource region from the last symbol for a PDCCH of DCI in the case where a specific format of DCI is applied to cancellation of UL transmission.

Since the number of bits of the UL preemption indication of DCI is limited to the size of DCI, the region in which UL transmission is cancelled in the reference resource region must be indicated within the limited number of bits.

Accordingly, the reference resource region may be divided into a plurality of regions (or groups) on the time axis and the frequency axis. Specifically, the reference resource region may be divided into T regions including $G_{CI}$ symbols on the time axis and into K regions including at least one PRB on the frequency axis.

At this time, T*K, which is the total number of divided regions, may be the same as the number of bits of the UL preemption indication. For example, if the reference resource region is divided into T regions on the time axis, the number of bits of the UL preemption indication may be considered for dividing the same on the frequency axis. That is, if the number of bits of the UL preemption indication is 8, and if the reference resource region is divided into 4 regions on the time axis, the reference resource region may be divided into 2 regions on the frequency axis. At this time, each divided region may include at least one symbol on the time axis and at least one PRB on the frequency axis, and the number of regions divided on the time axis may be provided to the UE by RRC configuration information or the like. Each of the resource regions divided from the reference resource region may be indicated as to whether or not to cancel UL transmission by each bit (1 bit) of the UL preemption indication.

If the reference resource region is divided into a plurality of regions, the reference resource regions indicated by UL preemption indications transmitted by different PDCCHs may overlap each other, in part or entirety thereof, as shown in FIG. 28. In this case, if a symbol set is configured by grouping two or more $G_{CI}$ symbols, the symbol sets may not be grouped to be the same between different reference resource regions.

In this case, the UE may receive a plurality of UL preemption indications for the overlapping regions, and must determine the symbol in which the UL transmission is to be cancelled.

Figure 32:
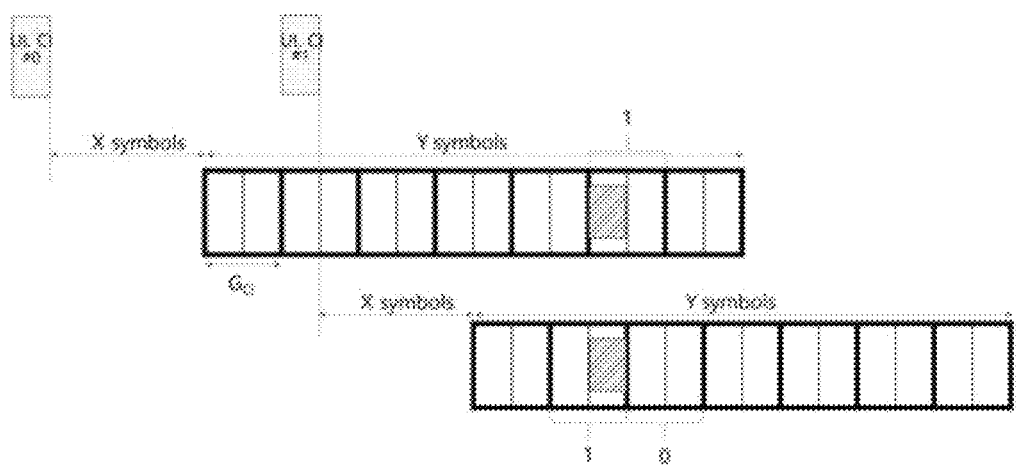
FIG. 32 illustrates an example of the case of receiving a plurality of preemptions according to an embodiment of the present disclosure.

FIG. 32 illustrates an example of the case of receiving a plurality of preemptions according to an embodiment of the present disclosure.

Referring to FIG. 32, in the case where a reference resource region includes 14 symbols and is divided by grouping the same by two symbols on the time axis as shown in the drawing, the UL preemption indication may indicate whether or not to cancel UL transmission for the resource region corresponding to 1 bit. In this case, if the 1-bit value is 1, UL transmission of the resource region corresponding thereto may be cancelled.

In UL CI #0 that is a first UL preemption indication in FIG. 32, since another UL signal overlaps the first symbol of the $6^{th}$ symbol set, the bit value for the symbol set may be 1. In UL CI #1 that is a second preemption indication, another UL signal overlapping in UL CI #0 is positioned in the second symbol of the second symbol set. Accordingly, the bit value corresponding to the second symbol set may be configured as 1. However, since there is no UL transmission corresponding to the third symbol set, the bit value corresponding thereto may be configured as 0.

In this case, the UE may need to interpret the symbols for the resource region of which the bit value is configured as 1 and the resource region of which the bit value is configured as 0.

As a first embodiment, the UE may always operate on the basis of the UL preemption indication of a recently received PDCCH. That is, in the case shown in FIG. 32, if the UE receives both UL CI #0 and UL CI #1, the UE may operate according to UL CI #1, which is received later. Accordingly, since the bit value corresponding to the third symbol set is configured as 0 in UL CI #1, the UE may not cancel UL transmission in the corresponding resource region. If the UE fails to receive UL CI #1 and receives only UL CI #0, since the bit value corresponding to the $6^{th}$ symbol set is configured as 1, the UE may cancel UL transmission in the corresponding resource region, and may not transmit an uplink signal.

As a second embodiment, the UE may cancel UL transmission overlapping the symbols in which cancellation is indicated in one UL CI. For example, in FIG. 32, if the bit value corresponding to the $6^{th}$ symbol set is configured as 1 in UL CI #0, and if the bit value corresponding to the second symbol set is indicated as 1 in UL CI #1, the UE must cancel UL transmission in the resource region that overlaps, in at least one symbol, the corresponding resource region.

As described above, the reference resource region may be grouped by $G_{CI}$ symbols to then be divided into T resource regions on the time axis, and each divided resource region may be indicated as to whether or not to cancel UL transmission by 1 bit of UL preemption indication. In this case, if the reference resource regions indicated by different UL preemption indications overlap each other, a method for dividing the reference resource regions is required. For example, a first UL preemption indication may group 4 symbols 1, 2, 3, and 4 into {1, 2} and {3, 4}, and a second UL preemption indication may group 4 symbols 2, 3, 4, and 5 into {2, 3} and {4, 5}.

In this case, in order to cancel UL transmission scheduled in the second symbol, UL transmission of {1, 2} must be cancelled by the first UL preemption indication, and UL transmission of {2, 3} must be cancelled by the second UL preemption indication. However, in this case, all UL transmissions of the first, second, and third symbols may be cancelled. Therefore, if different reference resource regions are divided on the time axis, the reference resource regions must be divided on the time axis on the basis of one reference symbol (e.g., the first symbol in a slot). That is, 4 symbols of the first UL preemption indication are required to be grouped into {1, 2} and {3, 4} on the basis of the first symbol, and 4 symbols of the second UL preemption indication are required to be grouped into {2}, {3, 4}, and {5} on the basis of the first symbol.

Alternatively, if reference resource regions indicated by different UL preemption indications overlap each other, when two or more $G_{CI}$ symbols are grouped into symbol sets, the symbol sets may be configured to be grouped differently between different reference resource regions. In this case, in order for the UE to group the symbol sets to be the same between different reference resource regions, the UE may configure a symbol set by grouping $G_{CI}$ symbols regardless of the reference resource regions. In addition, the UE may determine the reference resource region using the value 'X' and the value "Y". The determined reference resource region may include only some of the symbol sets, and even when some of the symbol sets are included, it may be determined that all of the symbol sets are included in the reference resource region.

Figure 33:
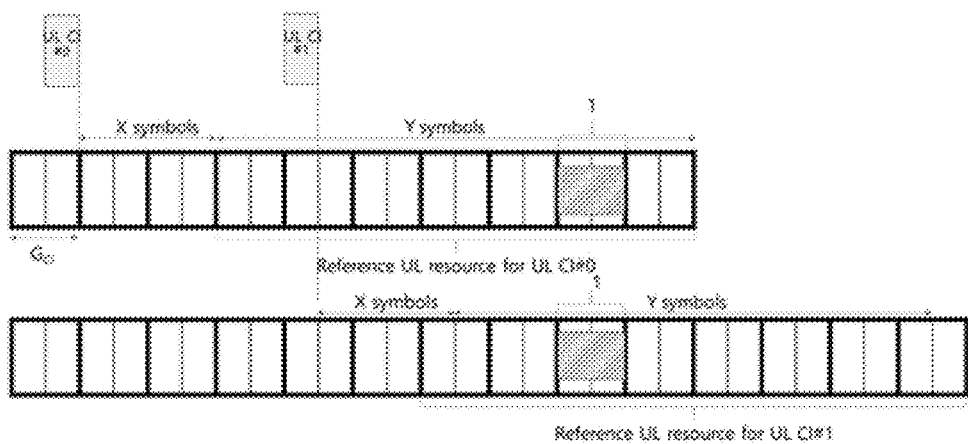
FIG. 33 illustrates another example of the case of receiving a plurality of preemptions according to an embodiment of the present disclosure.

FIG. 33 illustrates another example of the case of receiving a plurality of preemptions according to an embodiment of the present disclosure. Referring to FIG. 33, as described above, when the value $G_{CI}$ is 2, two symbols may be grouped to form symbol sets. In the case of UL CI #1, the first symbol and the last symbol of 'Y' symbols include only some of the configured symbol sets. In this case, the configured symbol sets may be included in the reference resource region.

Figure 34:
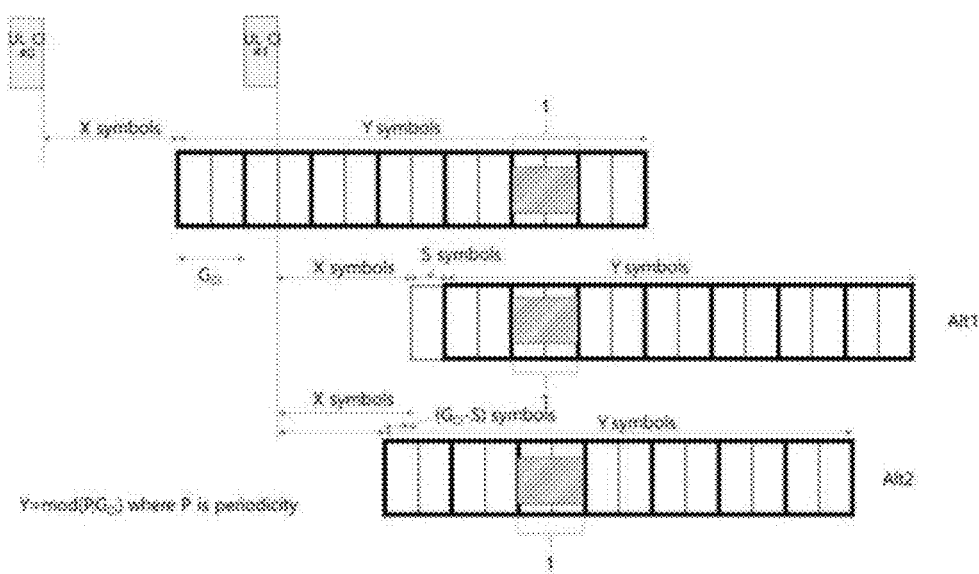
FIG. 34 illustrates another example of the case of receiving a plurality of preemptions according to an embodiment of the present disclosure.

FIG. 34 illustrates another example of the case of receiving a plurality of preemptions according to an embodiment of the present disclosure.

Referring to FIG. 34, the reference resource regions may be grouped by $G_{CI}$ symbols to then be divided into T resource regions on the time axis as described above, and each divided resource region may be indicated as to whether or not UL transmission is cancelled by 1 bit of UL preemption indication. In this case, reference resource regions indicated by different UL preemption indications may overlap. If different reference resource regions overlap, when two or more $G_{CI}$ symbols are grouped to form symbol sets, the symbol sets may not be grouped to be same between the different reference resource regions. When grouping $G_{CI}$ symbols to produce symbol sets, the UE may group the symbol sets to be the same between the different reference resource regions. To this end, the starting symbol of the reference resource region may be delayed (Alt 1 in FIG. 34), or may be advanced (Alt 2 in FIG. 34). For example, when the start position of the reference resource region in UL CI #1 is determined as shown in Alt 1 in FIG. 34, the position of the starting symbol of the reference resource region is delayed by S symbols. Here, S=mod(P,$G_{CI}$)=1 symbol. P is the number of symbols of the monitoring periodicity for the PDCCH of DCI including the UL preemption indication. If the reference resource region is delayed by one symbol, it can be seen that the boundary by which the symbol sets of the reference resource regions are separated between UL CI #0 and UL CI #1 is aligned. For example, as shown in Alt 2 in FIG. 34, the position of the starting symbol of the reference resource region is advanced by ($G_{CI}$–S) symbols in UL CI #1. Likewise, S=mod(P,$G_{CI}$)=1 symbol. P is the number of symbols of the monitoring periodicity for the PDCCH of DCI including the UL preemption indication.

Another problem to be solved by the present disclosure relates to a method of excluding a downlink symbol when a downlink symbol is positioned in a reference resource region. The UE may receive, from the base station, a configuration indicating whether each symbol is a downlink symbol, an uplink symbol, or a flexible symbol. In the downlink symbol, the UE expects to receive a downlink signal and does not expect to transmit an uplink signal. In the uplink symbol, the UE expects to transmit an uplink signal and does not expect to receive a downlink signal. The UE may receive an indication about whether the flexible symbol is a downlink symbol or an uplink symbol by scheduling of another signal or DCI format 20 including dynamic SFI.

The UL preemption indication may be used to indicate symbols in which UL transmission is to be cancelled among uplink signals and channels. Therefore, in the case of the downlink symbol, there is no need to cancel transmission and reception by the UL preemption indication.

First, as described above, the UE may receive a configuration of "Y", which is the number of symbols included in the reference resource region, through RRC configuration information or DCI from the base station, and configure the reference resource region on the basis of the configured value "Y".

In a first embodiment, the UE may select "Y" symbols positioned after 'X' symbols from the last symbol of a PDCCH including a UL preemption indication, regardless of the downlink/uplink symbol configuration. Thereafter, the symbols configured as downlink symbols may be excluded from the selected 'Y' symbols. The remaining L symbols (where, L is less than or equal to Y), excluding the downlink symbols from the 'Y' symbols, may be included in the reference resource region. Additionally, symbols for receiving SS/PBCH blocks may be excluded from the L symbols.

In a second embodiment, the UE may select 'Y' symbols positioned after 'X' symbols from the last symbol of a PDCCH including a UL preemption indication. At this time, the selected "Y" symbols may be UL or flexible symbols, excluding downlink symbols. In addition, additionally, 'Y' symbols may be the symbols obtained by excluding the symbols for receiving SS/PBCH blocks. That is, in the second embodiment, the UE may select 'Y' symbols positioned after 'X' symbols from the last symbol of a PDCCH including a UL preemption indication, and the selected 'Y' symbols may be configured by the base station, or may be the symbols obtained by excluding the symbols for receiving SS/PBCH blocks and/or downlink symbols from a plurality of symbols constituting the monitoring periodicity of the PDCCH.

The symbols for receiving SS/PBCH blocks and/or the downlink symbols, which are excluded in the first and second embodiments, may be limited to cell-commonly configured symbols.

In the first embodiment, since the value L, which is the number of symbols included in the reference resource region, is smaller than 'Y', more subdivided and detailed indication is possible, and it is possible to indicate the cancellation of UL transmission using a smaller number of bits. In the second embodiment, since the reference resource region always includes 'Y' symbols, it is possible to indicate the cancellation of UL transmission using the same granularity and the number of bits. However, in the first embodiment and the second embodiment, the number of included symbols may differ depending on the configuration of the downlink symbol, and thus the boundaries of the symbol sets between different reference resource regions may not match after grouping the symbol sets.

Accordingly, in a third embodiment, the UE may select 'Y' symbols positioned after 'X' symbols from the last symbol of a PDCCH including a UL preemption indication, regardless of the downlink/uplink symbol configuration. Thereafter, the 'Y' symbols may be grouped into symbol sets according to configured granularity $G_{CI}$. Thereafter, if all symbols included in one symbol set are configured as downlink symbols, the corresponding symbol set may be excluded from the reference resource region. As a result, a bit of the UL preemption indication corresponding to the symbol set in which all symbols are configured as downlink symbols may always be set to a value of "0", which does not cancel UL transmission.

Figure 35:
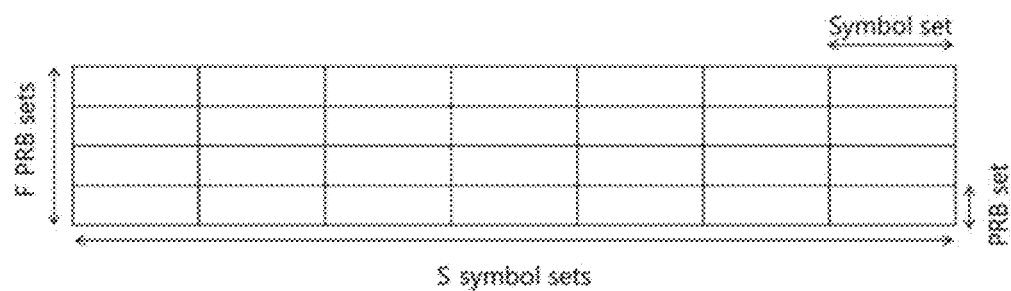
FIG. 35 illustrates an example of a method of dividing a time-frequency region of a resource indicated by a preemption according to an embodiment of the present disclosure.
Figure 36:
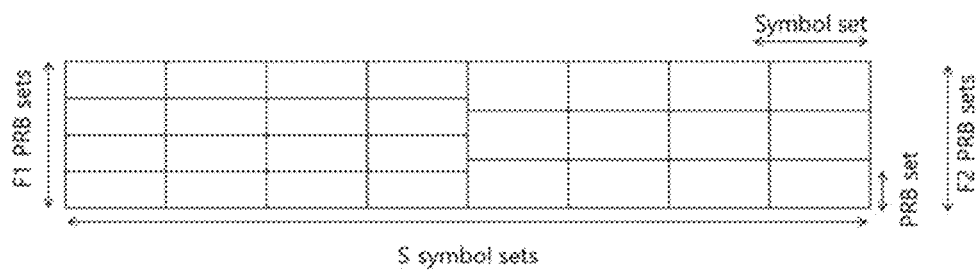
FIG. 36 illustrates another example of a method of dividing a time-frequency region of a resource indicated by a preemption according to an embodiment of the present disclosure.

FIGS. 35 and 36 illustrate an example of a method for dividing a reference resource region, capable of being indicated by a UL preemption indication for cancelling UL transmission, into a plurality of regions.

Since the UL preemption indication is included in the DCI and is transmitted, the maximum number of bits thereof may be limited. Accordingly, the number of bits of the UL preemption indication may be insufficient to indicate cancellation of UL transmission by mapping the respective symbols and PRBs of the reference resource region to the respective bits of the UL preemption indication.

Accordingly, in order to indicate all regions of the reference resource region using the respective bits of the UL preemption indication, the reference resource region may be divided into a plurality of regions including at least one symbol and at least one PRB.

Hereinafter, a method for dividing a reference resource region into a plurality of regions will be described.

FIG. 35 illustrates an example of a method of dividing a time-frequency region of the resource indicated by a preemption according to an embodiment of the present disclosure.

If the above UE selects 'Y' symbols constituting a reference resource region, the reference resource region may differ in the number of symbols included therein and/or the number of symbol sets depending on the first to third embodiments. For example, the number of bits included in the UL preemption indication may be B bits, and the number of symbol sets of the reference resource region may be S. In this case, if divided as B/S=F, PRBs in the frequency region may be grouped to configure F PRB sets as shown in FIG. 35. In FIG. 35, the value S is 7 and the value B is 28. Thus, the value F may be 4.

The UE may receive K PRBs included in the reference resource region from the base station. At this time, the configuration method is as follows.

First embodiment: Configuration may be made by an RIV (resource indication value) scheme in which the index of a starting RB from a common reference PRB in a UL cell and the number of consecutive RBs from the starting RB are encoded together. That is, the UE may receive RRC configuration information including an RIV value from the base station, and may recognize the starting RB index of the reference resource region and the number of consecutive RBs from the starting RB on the basis of the common reference PRB using the RIV value. At this time, the starting RB index may be obtained on the basis of the starting RB of the common reference PRB and an offset value thereof.

When the UE obtains the starting PRB index on the frequency axis of the reference resource region and the number of consecutive RBs through the received RIV value, the size of the BWP may be assumed to be 275 RBs, which is the maximum, and the subcarrier spacing may be configured by the base station.

Second embodiment: PRBs included in the reference resource region may be configured for the UE through an RIV scheme in which the index of the starting RB from the lowest PRB of the UL BWP and the number of consecutive RBs are encoded together. That is, in order to configure the PRBs on the frequency axis of the reference resource region for the UE, the base station may transmit an RIV, obtained by encoding the starting RB index based on the lowest PRB of the UL BWP and the number of consecutive RBs together, to the UE through RRC configuration information.

The UE may recognize the PRB configuration of the reference resource region on the basis of the received RIV. At this time, the size of the BWP of the RIV may be assumed to be the number of RBs included in the UL BWP, and the subcarrier spacing may be configured as the subcarrier spacing of the UL BWP by the base station. The UL BWP may be a UL BWP having the lowest BWP ID in the cell.

Third embodiment: PRBs included in the reference resource region may be indicated on the basis of bitmaps. That is, RBs of the UL BWP may be grouped into RB groups (RBGs), and PRBs included in the reference resource region may be indicated to the UE through respective bits corresponding to the respective RBGs.

In other words, the base station may group RBs on the frequency axis of the reference resource region into a plurality of RB groups including one or more RBs, and may inform the UE of each RB group through a bitmap scheme. Bits representing the RB groups constituting the reference resource region using a 1-bit value may be received from the base station, and the RBs constituting the reference resource region may be recognized on the basis of the values of the received bits.

In the case where there are K PRBs in the frequency region, a method of configuring F PRB sets may be as follows. First, (K−F*floor(K/F)) PRB sets may include ceil(K/F) PRBs. The remaining (F−(K−F*floor(K/F))) PRB sets may include floor(K/F) PRBs. In other words, F PRB sets may include (F−(K−F*floor(K/F))) PRB sets including floor(K/F) PRBs and the remaining (F−(K−F*floor(K/F))) PRB sets including ceil(K/F) PRBs.

Alternatively, in the case where there are K PRBs in the frequency region, in another method of configuring F PRB sets, the K PRBs may be grouped into Q RB groups. At this time, grouping the RBGs may be performed in a similar manner as grouping in resource assignment type 0. That is, up to J RBs are grouped in consideration of PRB grids. Here, J is the number of PRBs included in the RBG configured in the UL BWP. Q RBGs are grouped into F PRB sets. Specifically, first, (Q−F*floor(Q/F)) PRB sets may include ceil(Q/F) RBGs, and the remaining (F−(Q−F*floor(Q/F))) PRB sets may include floor(Q/F) RBGs.

FIG. 36 illustrates another example of a method of dividing a time-frequency region of the resource indicated by a preemption according to an embodiment of the present disclosure.

Referring to FIG. 36, in the case where the number of bits B of the UL preemption indication is not an integer multiple of the number of symbols S of the reference resource region, PRBs on the frequency axis of the reference resource region may be grouped differently depending on the symbol sets.

Specifically, in the case where the number of bits B of the UL preemption indication is not an integer multiple of the number of symbols S of the reference resource region, that is, when B is not divided by S, the PRBs of the reference resource region may be configured as PRB sets through the following method.

First embodiment: All symbol sets may be divided into F PRB sets. Here, F may be floor(B/S). For example, when B is "28" and S is "8", the value F may be 3. That is, each symbol set may be divided into three PRB sets on the frequency axis. In this case, only S*F=3*8=24 bits are valid, and the remaining 4 bits may not be used for cancellation of UL transmission because there is no corresponding symbol-PRB set. That is, the remaining 4 bits may not be used.

Second embodiment: (B−S*floor(B/S)) symbol sets among the S symbol sets, may be divided into F1=ceil(B/S) PRB sets on the frequency axis, and the remaining (S−(B−S*floor(B/S))) symbol sets may be divided into F2=floor(B/S) PRB sets. For example, as shown in FIG. 36, B−S*floor(B/S)=28−8*floor(28/8)=4 symbol sets may be divided into ceil(B/S)=ceil(28/8)=4 PRB sets, and the remaining S−(B−S*floor(B/S))=4 symbol sets may be divided into floor(B/S)=floor(28/8)=3 PRB sets.

That is, in FIG. 36, the front four symbol sets are divided into F1 PRB sets on the frequency axis, and the rear four symbol sets are divided into F2 PRB sets on the frequency axis. On the other hand, the front four symbol sets may be divided into F2 PRB sets on the frequency axis, and the rear four symbol sets may be divided into F1 PRB sets on the frequency axis.

In addition, the symbol sets may be alternately divided into F1 PRB sets and F2 PRB sets on the frequency axis. In addition, although the boundary of dividing the symbol sets into F1 PRB sets and the boundary of dividing the symbol sets into F2 PRB sets on the frequency axis are illustrated to be different in 336 these may also be aligned. That is, if F1−F2=1, when dividing the symbol sets into F2 PRB sets, the symbol sets may be divided into F1 PRB sets first, and then two of the F1 PRB sets may be grouped into one set. On the other hand, when dividing the symbol sets into F1 PRB sets on the frequency axis, the symbol sets may be divided into F2 PRB sets first, and then one of the F2 PRB sets may be divided into two sets.

In the Case of Different Numerologies

The problem to be solved in the present disclosure relates to the case in which the numerology of a PDCCH transmitting a UL preemption indication (UL CI) and the numerology of the PUSCH or SRS transmission indicated to be cancelled (or interrupted) by the UL CI are different.

That is, an indication indicating cancellation of UL transmission may be transmitted through downlink transmission. In this case, the subcarrier spacing of an uplink cell and the subcarrier spacing of a downlink cell may be different.

Specifically, the numerology may include a subcarrier spacing or a cyclic prefix. The carrier spacing may be 15*2 kHz, µ is a subcarrier spacing configuration value, which may have a value such as 0, 1, 2, and 3, and the CP type may be classified into a normal CP and an extended CP.

In the case of the normal CP, 14 OFDM symbols may be included in one slot of 1*2$^{-µ}$ ms, and in the case of the extended CP, 12 OFDM symbols may be included in one slot of 1*2$^{-µ}$ ms. The extended CP may be configured in the case of a subcarrier spacing of 60 kHz (µ=2). This numerology may be configured in the BWP of an uplink carrier and the BWP of a downlink carrier.

Hereinafter, the subcarrier spacing of the PUSCH or SRS transmitted in the uplink BWP will be referred to as "µ$^{UL}$" and the subcarrier spacing of the PDCCH of the UL preemption indication received in the downlink BWP will be referred to as "µ$^{DL}$".

If the numerology of a PDCCH transmitting a UL preemption indication and the numerology of UL transmission (e.g., a PUSCH or an SRS) to be cancelled (or interrupted) by a UL preemption indication are different from each other, the numerology for a reference resource region may be determined according to the method below.

The reference resource region is a set of uplink resources in which UL transmission may be cancelled by the UL preemption indication. Here, the uplink resources may include PRBs and symbols. The PRBs may be some or all of the PRBs included in the BWP of an uplink cell. Specifically, the UE may receive, from the base station, a configuration indicating PRBs included in the reference resource region among the PRBs of the BWP in the uplink cell.

Specifically, the UE may be configured with a subcarrier having the lowest index of the common reference PRB using an ARFCN (absolute radio-frequency channel number). The subcarrier having the lowest index may be referred to as a "reference point" or a "point A". The common reference PRB is a PRB including the subcarrier having the lowest index.

In the case where the UE receives a configuration about RBs included in the reference resource region from the base station, it may be assumed that there are 275 consecutive PRBs including the common reference PRB. Not all of the 275 PRBs may be capable of UL transmission. The UE may receive a configuration indicating which PRBs among the 275 PRBs are included in the reference uplink resource. That is, the UE may be configured with PRBs included in the reference resource region, among the 275 PRBs, by an RIV (resource indication value) scheme in which the starting RB index ($RB_{start}$) of the 275 PRBs and the number of RBs ($L_{RBs}$) are encoded together. Here, the size of the BWP may be assumed to be 275 RBs when interpreting the RIV.

Specifically, the RIV may be expressed as the following equation. In the following equation, $N_{BWP}^{size}$=275.

if $(L_{RBs}-1) \le \lfloor N_{BWP}^{size}/2 \rfloor$ then $$RIV = N_{BWP}^{size}(L_{RBs}-1) + RB_{start}$$

else $$RIV = N_{BWP}^{size}(N_{BWP}^{size}-L_{RBs}+1) + (N_{BWP}^{size}-1-RB_{start})$$

where $L_{RBs} \ge 1$ and shall not exceed $N_{BWP}^{size} - RB_{start}$.

In order to determine the PRBs included in the reference resource region, the subcarrier spacing must be determined. The subcarrier spacing (µ$^{DL}$) of the downlink BWP of a PDCCH in which a UL preemption indication is transmitted may be used as the subcarrier spacing for determining the reference resource region. The subcarrier spacing (µ$^{DL}$) of the downlink BWP may be the same as or different from the subcarrier spacing (µ$^{UL}$) of a PUSCH or an SRS transmitted in the uplink BWP.

If the subcarrier spacing of the downlink BWP (µ$^{DL}$) of a PDCCH in which a UL preemption indication is transmitted and the subcarrier spacing (µ$^{UL}$) of UL transmission (e.g., a PUSCH or an SRS) are different from each other, PRBs included in the reference resource region, which are determined through the RIV scheme, may be determined through the following method.

Figure 37:
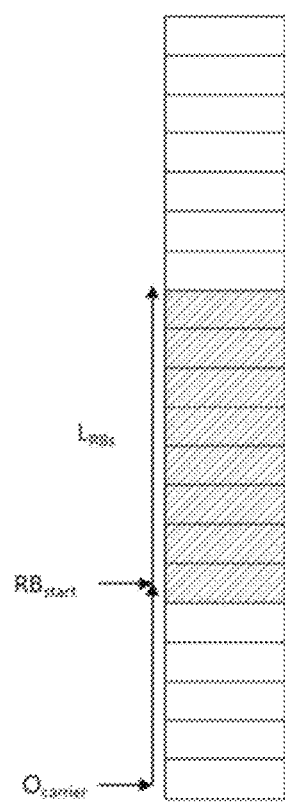
FIG. 37 illustrates an example of PRBs indicated by a preemption according to an embodiment of the present disclosure.
Figure 38:
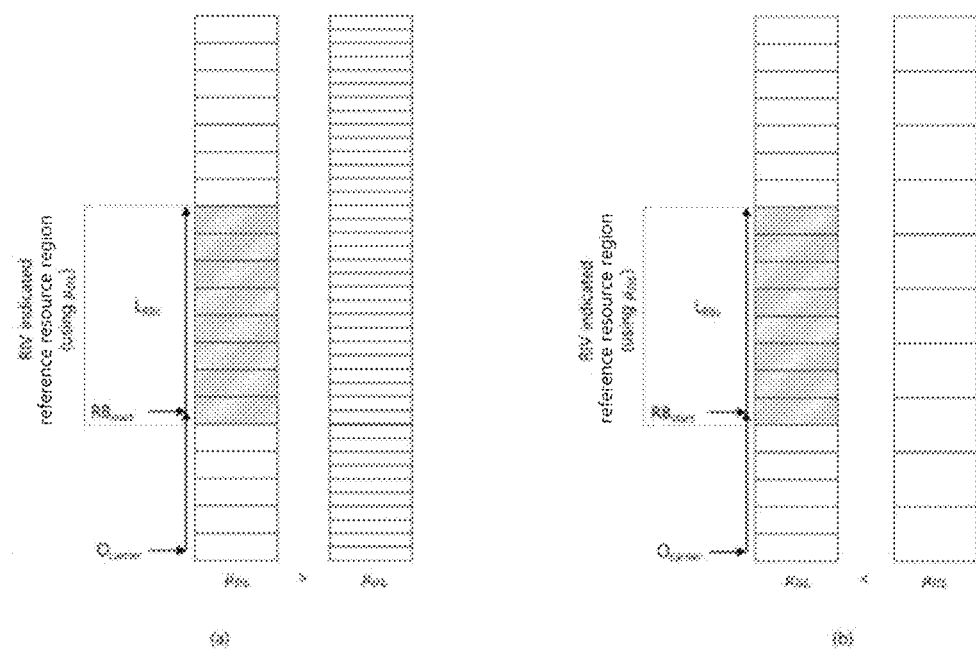
FIG. 38 illustrates an example of a method for determining an uplink subcarrier spacing according to an embodiment of the present disclosure.
Figure 39:
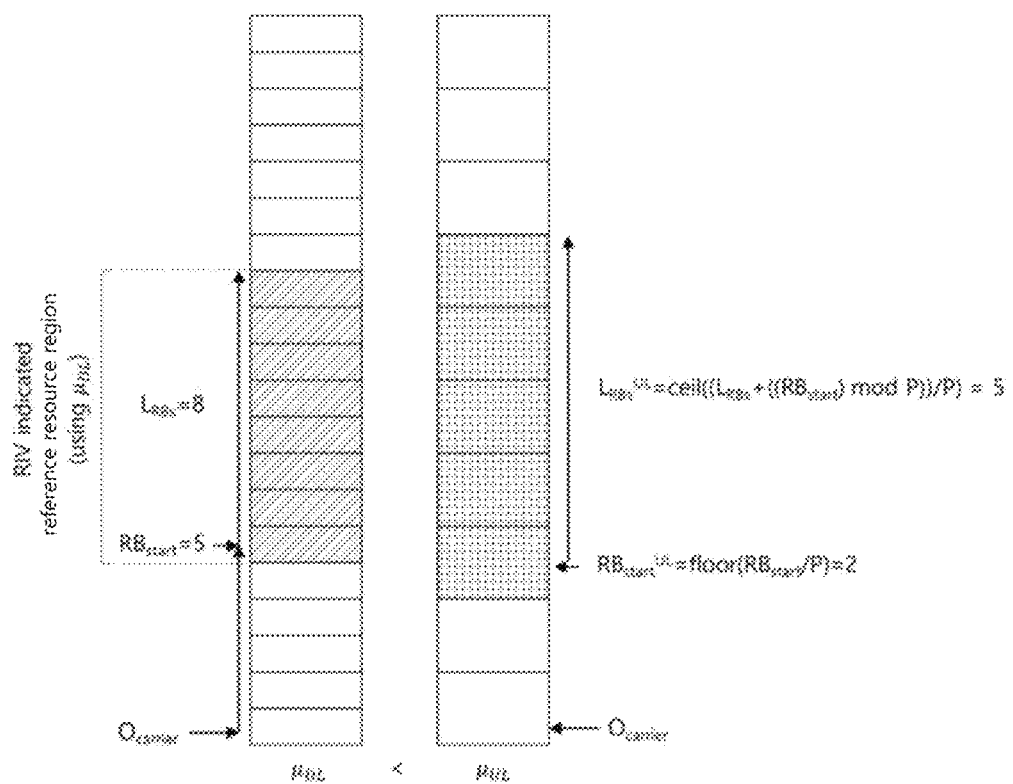
FIG. 39 illustrates another example of a method for determining an uplink subcarrier spacing according to an embodiment of the present disclosure.

FIGS. 37 to 39 illustrate a method for determining PRBs included in a reference resource region in the case where the subcarrier spacing of a PDCCH and the subcarrier spacing of UL transmission are different.

FIG. 37 illustrates an example of PRBs indicated by a preemption according to an embodiment of the present disclosure.

In FIG. 37, $RB_{start}=5$ and $L_{RBs}=8$ in the reference resource region on the frequency axis. At this time, the common reference PRB is a PRB including $O_{carrier}$, and the index of this PRB is 0. As described above, the reference resource region (RIV-indicated reference UL resources) including PRBs indicated by the RIV transmitted through higher-layer signaling of the base station may be determined on the basis of the subcarrier spacing ($\mu^{DL}$) of an activated downlink BWP of a PDCCH in which a UL preemption indication is transmitted. That is, it is irrelevant to the subcarrier spacing (μDL) in which the actual PUSCH or SRS is transmitted. Therefore, the uplink PRBs included in the actual reference resource region must be determined from the reference resource region including the PRBs indicated by the RIV.

FIG. 38 illustrates an example of a method for determining an uplink subcarrier spacing according to an embodiment of the present disclosure.

FIG. 38(a) shows the case in which the subcarrier spacing ($\mu^{DL}$) of a PDCCH in which a UL preemption indication is transmitted is greater than the subcarrier spacing ($\mu^{UL}$) of PUSCH or SRS transmission, which is UL transmission. For example, the subcarrier spacing of a PDCCH transmitting a UL preemption indication is 30 kHz ($\mu^{DL}=1$), and the subcarrier spacing of PUSCH or SRS transmission, which is UL transmission, is 15 kHz ($\mu^{UL}=0$). The band of one PRB determined to be the subcarrier spacing ($\mu^{DL}$) of a PDCCH transmitting a UL preemption indication may include a plurality of PRBs determined to be the subcarrier spacing ($\mu^{UL}$) of PUSCH or SRS transmission, which is UL transmission. More accurately, the band of one PRB determined to be the subcarrier spacing ($\mu^{DL}$) of a PDCCH transmitting a UL preemption indication may include $2^{(\mu DL-\mu UL)}$ PRBs determined to be the subcarrier spacing ($\mu^{UL}$) of PUSCH or SRS transmission, which is UL transmissions.

In an embodiment of the present disclosure, a method of determining an uplink reference resource in the case where the subcarrier spacing ($\mu^{DL}$) of a PDCCH transmitting a UL preemption indication is greater than the subcarrier spacing ($\mu^{UL}$) of PUSCH or SRS transmission is as follows.

First embodiment: The subcarrier spacing ($\mu^{DL}$) of a PDCCH transmitting a UL preemption indication may be used to determine a reference resource region. The uplink PRBs included in the actual reference resource region may be determined to be all PRBs included in the band occupied by the reference resource region indicated by an RIV. For example, $2^{(\mu^{DL}-\mu^{UL})}$ uplink PRBs overlapping the band of one PRB included in the reference resource region indicated by the RIV transmitted from the base station may be included in the actual reference resource region.

Second embodiment: The RIV may be interpreted using the subcarrier spacing ($\mu^{DL}$) of a PDCCH transmitting a UL preemption indication, and the reference resource region indicated by the interpreted RIV may be determined. In addition, the starting RB index ($RB_{start}^{UL}$) of the uplink PRB included in the reference resource region and the number of consecutive PRBs ($L_{RBs}^{UL}$) may be obtained through the following equation on the basis of $RB_{start}$ and $L_{RBs}$ obtained from the RIV.

$$RB_{start}^{UL}=2^{(\mu^{DL}-\mu^{UL})}*RB_{start}$$

$$L_{RBs}^{UL}=2^{(\mu^{DL}-\mu^{UL})}*L_{RBs}$$

The UE may determine that $L_{RBs}^{UL}$ PRBs from the PRB corresponding to the starting RB index ($RB_{start}^{UL}$) on the basis of the common reference RB are included in the uplink reference resource using the subcarrier spacing ($\mu^{UL}$) of PUSCH or SRS transmission.

FIG. 38(b) shows the case where the subcarrier spacing ($\mu^{DL}$) of a PDCCH transmitting a UL preemption indication is less than the subcarrier spacing ($\mu^{UL}$) of PUSCH or SRS transmission, which is UL transmission. For example, the subcarrier spacing of a PDCCH transmitting a UL preemption indication is 15 kHz ($\mu^{DL}=0$) and the subcarrier spacing of PUSCH or SRS transmission, which is UL transmission, is 30 kHz ($\mu^{UL}=1$).

The band of one PRB determined to be the subcarrier spacing ($\mu^{UL}$) of PUSCH or SRS transmission, which is UL transmission, may include a plurality of PRBs determined to be the subcarrier spacing ($\mu^{DL}$) of a PDCCH transmitting a UL preemption indication. More accurately, the band of one PRB determined to be the subcarrier spacing ($\mu^{UL}$) of PUSCH or SRS transmission, which is UL transmission, may include $2^{(\mu UL-\mu DL)}$ PRBs determined to be the subcarrier spacing ($\mu^{DL}$) of a PDCCH transmitting a UL preemption indication.

In an embodiment of the present disclosure, a method of determining an uplink reference resource in the case where the subcarrier spacing ($\mu^{DL}$) of a PDCCH transmitting a UL preemption indication is less than the subcarrier spacing ($\mu^{UL}$) of PUSCH or SRS transmission, which is UL transmit, is as follows.

First, the reference resource region on the frequency axis indicated by an RIV may be determined by interpreting the RIV using the subcarrier spacing ($\mu^{DL}$) of a PDCCH transmitting a UL preemption indication. The uplink PRB included in the actual reference resource region may be determined to be all PRBs that are entirely or partially included in the band occupied by the reference resource region determined on the basis of the RIV.

Second, the RIV may be interpreted using the subcarrier spacing ($\mu^{DL}$) of a PDCCH transmitting a UL preemption indication, and the reference resource region on the frequency axis indicated by the RIV may be determined. The uplink PRB included in the actual reference resource region may be determined to be all PRBs that are entirely included in the band occupied by the reference resource region indicated by the RIV.

Third, the reference resource region on the frequency axis indicated by the RIV may be determined by interpreting the RIV using the subcarrier spacing ($\mu^{DL}$) of a PDCCH transmitting a UL preemption indication. In addition, the starting RB index ($RB_{start}^{UL}$) of the uplink PRB included in the reference resource region and the number of consecutive PRBs ($L_{RBs}^{UL}$) may be obtained through the following equations on the basis of $RB_{start}$ and $L_{RBs}$ obtained from the RIV.

$$RB_{start}^{UL}=\text{floor}(RB_{start}/P)$$

$$L_{RBs}^{UL}=\text{ceil}((L_{RBs}+(RB_{start}\bmod P))/P)$$

Here, P is $2^{(\mu^{UL}-\mu^{DL})}$. The UE may determine that $L_{RBs}^{UL}$ PRBs from the PRB corresponding to the starting RB index ($RB_{start}^{UL}$) on the basis of the common reference RB are included in the uplink reference resource using the subcarrier spacing ($\mu^{UL}$) of PUSCH or SRS transmission.

FIG. 39 illustrates another example of a method for determining the uplink subcarrier spacing according to an embodiment of the present disclosure.

FIG. 39 is a diagram illustrating a method of determining uplink reference resources according to a third embodiment. Here, $RB_{start}=5$, $L^{RBs}=8$, and $P=2$ according to an RIV.

According to a third embodiment, $RB_{start}^{UL}$=floor($RB_{start}$/P)=floor(5/2)=2. $L_{RBs}^{UL}$=ceil(($L_{RBs}$+($RB_{start}$ mod P))/P)=ceil((8+5 mod 2))/2)=5.

Accordingly, the starting RB index from the common reference RB is 2, and 5 PRBs may be included in the reference resource region using the subcarrier spacing of PUSCH or SRS transmission, which is UL transmission.

In the first and second embodiments, the UE may expect that $RB_{start}$ and $L_{RBs}$ indicated by the RIV will have the values capable of being divided by at least $2^{(\mu^{UL}-\mu^{DL})}$. That is, the UE may expect that $RB_{start}$ and $L_{RBs}$ indicated by the RIV will not have the values that are not divided by $2^{(\mu^{UL}-\mu^{DL})}$. This limitation makes it possible to prevent the situation in which the uplink PRB partially overlaps the PRBs included in the reference resource region on the frequency axis indicated by the RIV.

In a first embodiment, the reference resource region indicated by the RIV may be determined by interpreting the RIV using the subcarrier spacing ($\mu^{DL}$) of a PDCCH transmitting a UL preemption indication. The uplink PRBs included in the actual reference resource region may be determined to be all PRBs that are entirely or partially included in the band occupied by the reference resource region indicated by the RIV.

Hereinafter, a method for determining the value $O_{carrier}$, which is an offset value, will be described with reference to FIGS. 37 to 39.

$O_{carrier}$ is an offset value indicating the number of RBs from the common reference PRB to the starting RB for each subcarrier spacing. The UE recognizes $O_{carrier}$ RBs from the common reference PRB as unused RBs. The value $O_{carrier}$ is configured cell-commonly in each cell. In addition, the value $O_{carrier}$ is configured for each value of the subcarrier spacing in the cell.

Specifically, $O_{carrier}$ may be configured by a higher layer as follows. An SIB (system information block) may include FrequencyInforDL-SIB including information on a downlink carrier and reception. FrequencyInforDL-SIB (or FrequencyInforDL) may include the following information.

frequencyBandList: a list of one or more frequency bands to which a downlink carrier belongs offsetToPointA: the position of pointA scs-SpecificCarrierList: This includes the value $O_{carrier}$ (offsetToCarrier) and the like for each subcarrier spacing. A network must configure scs-SpecificCarrierList for all subcarrier spacings used in the downlink BWP of a corresponding cell.

In addition, the SIB may include FrequencyInforUL-SIB including information on a basic uplink carrier and transmission. FrequencyInforUL-SIB (or FrequencyInforUL) may include the following information.

frequencyBandList: a list of one or more frequency bands to which a downlink carrier belongs offsetToPointA: the position of pointA scs-SpecificCarrierList: This includes the value $O_{carrier}$ (offsetToCarrier) and the like for each subcarrier spacing. A network must configure scs-SpecificCarrierList for all subcarrier spacings used in the uplink BWP of a corresponding cell.

The UE may be aware of the following from the configuration of the higher layer.

1) The position of pointA of each carrier (pointA is the same point regardless of the subcarrier spacing)

2) The subcarrier spacing capable of being used by each carrier (the remaining subcarrier spacings are unable to be used in the corresponding carrier)

3) The value $O_{carrier}$ (offsetToCarrier) according to the subcarrier spacing of each carrier A DL BWP for monitoring a UL preemption indication is configured for the UE. Specifically, there is a DL BWP including a search space for monitoring a UL preemption indication, and the UE may use the subcarrier spacing of the DL BWP in order to determine the reference resource region of the UL preemption indication. This subcarrier spacing may be referred to as "reference subcarrier spacing".

In some cases, the reference subcarrier spacing may not be included in FrequencyInforUL-SIB (or FrequencyInforUL) of the uplink cell. As described above, FrequencyInforUL-SIB (or FrequencyInforUL) includes values $O_{carrier}$ (offsetToCarrier) of subcarrier spacings supported by the uplink cell.

If the reference subcarrier spacing is not the subcarrier spacing supported by the uplink cell, the value $O_{carrier}$ may be determined as follows.

The subcarrier spacing of an active BWP of the UE may be $SCS_{activeUL}$, and the value $O_{carrier}$ of $SCS_{activeUL}$ may be $O_{carrier,activeUL}$. $O_{carrier,activeUL}$ is a value (offsetToCarrier) configured according to $SCS_{activeUL}$ in scs-SpecificCarrierList of FrequencyInforUL-SIB (or FrequencyInforUL). The subcarrier spacing of the DL BWP monitoring a UL preemption indication may be $SCS_{ref}$, and the value $O_{carrier}$ of the reference resource region indicated by the UL preemption indication may be $O_{carrier,DL}$.

FIG. 40 illustrates an example of a method for determining an offset value according to a subcarrier spacing supported by an uplink according to an embodiment of the present disclosure.

Referring to FIG. 40, $O_{carrier,DL}$ may be obtained through the following method.

First embodiment: The UE may scale the value (offsetToCarrier) configured according to the subcarrier spacing of the active UL BWP in scs-SpecificCarrierList of FrequencyInforUL-SIB (or FrequencyInforUL) according to the reference subcarrier, thereby obtaining a value $O_{carrier}$ ($O_{carrier,DL}$), which is an offset value of the reference resource region indicated by a UL preemption indication.

Specifically, $O_{carrier,DL}$ may be obtained by floor ($O_{carrier,activeUL}$*S). Here, it may be given as $S=SCS_{activeUL}/SCS_{ref}$. Floor may be replaced by ceil or round.

Second embodiment: The UE may scale the value (offsetToCarrier) configured according to the maximum subcarrier spacing value (hereinafter, $SCS_{max}$), among the subcarrier spacings in scs-SpecificCarrierList of FrequencyInforUL-SIB (or FrequencyInforUL), according to the reference subcarrier spacing, thereby obtaining a value $O_{carrier}$ ($O_{carrier,DL}$) of the reference resource region indicated by a UL preemption indication.

Specifically, $O_{carrier,DL}$ may be obtained by floor($O_{max}$*S). Here, S may be given as $SCS_{max}/SCS_{ref}$. Here, $SCS_{max}$ is the maximum value of the subcarrier spacings supported by the uplink cell and is the maximum subcarrier spacing value among the subcarrier spacings indicated in scsSpecificCarrierList of FrequencyInforUL-SIB (or FrequencyInforUL). Floor may be replaced by ceil or round. $O_{max}$ is a value (offsetToCarrier) configured according to the maximum subcarrier spacing value among the subcarrier spacings in scsSpecificCarrierList of FrequencyInforUL-SIB (or FrequencyInforUL).

For example, if the uplink cell is able to use subcarrier spacings of 15 kHz and 30 kHz, offsetToCarrier corresponding to 30 kHz, which is the larger value of 15 kHz and 30 kHz, is $O_{max}$. In the second embodiment, even if the UEs in the uplink cell use UL BWPs having different subcarrier spacings, $O_{carrier,DL}$ of the same value may be obtained. Accordingly, it is possible to obtain the same frequency band of the reference resource region.

Third embodiment: The UE may scale the value (offsetToCarrier) configured according to the minimum subcarrier spacing value (hereinafter, $SCS_{min}$), among the subcarrier spacings indicated in scs-SpecificCarrierList of FrequencyInforUL-SIB (or FrequencyInforUL), according to the reference subcarrier spacing, thereby obtaining a value $O_{carrier}$ ($O_{carrier,DL}$) of the reference resource region indicated by a UL preemption indication. Specifically, the value $O_{carrier,DL}$ may be obtained by floor($O_{min}$*S). S may be given as $SCS_{min}/SCS_{ref}$. Here, $SCS_{min}$ is the minimum value of the subcarrier spacings supported by the uplink cell, and is the minimum subcarrier spacing value among the subcarrier spacings included in scsSpecificCarrierList of FrequencyInforUL-SIB (or FrequencyInforUL). Floor may be replaced by ceil or round. $O_{min}$ is the value (offsetToCarrier) configured according to the minimum subcarrier spacing value among the subcarrier spacings included in scsSpecificCarrierList of FrequencyInforUL-SIB (or FrequencyInforUL).

For example, if the uplink cell is able to use subcarrier spacings of 15 kHz and 30 kHz, offsetToCarrier corresponding to 15 kHz, which is the smaller value of 15 kHz and 30 kHz, is $O_{min}$. In the third embodiment, even if the UEs in the uplink cell use UL BWPs having different subcarriers, $O_{carrier,DL}$ of the same value may be configured. Accordingly, it is possible to configure the same frequency band of the reference resource region for each UE.

Fourth embodiment: The UE may obtain a value $O_{carrier}$ ($O_{carrier,DL}$) of the reference resource region indicated by a UL preemption indication according to the minimum value among the values (offsetToCarrier) configured according to the subcarrier spacings indicated in scs-SpecificCarrierList of FrequencyInforULSIB (or FrequencyInforUL). Specifically, the value $O_{carrier,DL}$ may be obtained by floor (min_$O_{carrier}$*S). The value S may be given as min_SCS/$SCS_{ref}$. Here, min_SCS is a subcarrier spacing corresponding to min_Ocarrier. That is, it is a subcarrier spacing value corresponding to the minimum value among the values (offsetToCarrier) configured according to the subcarrier spacing values included in scs-SpecificCarrierList of FrequencyInforULSIB (or FrequencyInforUL). Floor may be replaced by ceil or round. As another method, $O_{carrier,DL}$ may be obtained by min_$O_{carrier}$. min_$O_{carrier}$ is the minimum value among the values (offsetToCarrier) configured according to the subcarrier spacings included in scs-SpecificCarrierList of FrequencyInforUL-SIB (or FrequencyInforUL).

Fifth embodiment: The UE may obtain a value $O_{carrier}$ ($O_{carrier,DL}$) of the reference resource region indicated by a UL preemption indication according to the maximum value among the values (offsetToCarrier) configured according to the subcarrier spacings indicated in scs-SpecificCarrierList of FrequencyInforULSIB (or FrequencyInforUL). Specifically, the value $O_{carrier,DL}$ may be obtained by floor (max_$O_{carrier}$*S). The value S may be given as max_SCS/$SCS_{ref}$. Here, max_SCS is a subcarrier spacing corresponding to max_$O_{carrier}$. That is, it is a subcarrier spacing value corresponding to the maximum value among the values (offsetToCarrier) configured according to subcarrier spacing values included in scs-SpecificCarrierList of FrequencyInforULSIB (or FrequencyInforUL). Floor may be replaced by ceil or round. As another method, $O_{carrier,DL}$ may be obtained by max_$O_{carrier}$. max_$O_{carrier}$ is the maximum value among the values (offsetToCarrier) configured according to the subcarrier spacings included in scs-SpecificCarrierList of FrequencyInforUL-SIB (or FrequencyInforUL).

Sixth embodiment: The UE may obtain a value $O_{carrier}$ ($O_{carrier,DL}$) of the reference resource region indicated by a UL preemption indication according to offsetToCarrier indicating the lowest position among actual frequency positions indicated by the values (offsetToCarrier) configured according to the subcarrier values indicated by scs-SpecificCarrierList of FrequencyInforULSIB (or FrequencyInforUL). Specifically, the value $O_{carrier,DL}$ may be obtained by floor (min2_$O_{carrier}$*S). The value S may be given as min2_SCS/$SCS_{ref}$. Floor may be replaced by ceil or round. As another method, the value $O_{carrier,DL}$ may be obtained by min2_$O_{carrier}$. min2_$O_{carrier}$ may be determined on the basis of offsetToCarrier.

For example, offsetToCarrier values $0_1$, $0_2$, and $0_3$ may be configured according to the subcarrier spacings included in scs-SpecificCarrierList of FrequencyInforUL-SIB (or FrequencyInforUL). Here, $O_1$ is a value (offsetToCarrier) configured according to subcarrier spacing 1, $O_2$ is a value (offsetToCarrier) configured according to subcarrier spacing 2, and $O_3$ is a value (offsetToCarrier) configured according to subcarrier spacing 3. Among $0_1$, $0_2$, and $0_3$, the value indicating the lowest actual frequency position may be the value min2_$O_{carrier}$. At this time, the value indicating the lowest position may be the minimum value among $O_1$*SCS1, $O_2$*SCS2, and $O_3$*SCS3. The subcarrier spacing corresponding to offsetToCarrier of min2_$O_{carrier}$ may be the value min2_SCS.

In the sixth embodiment, since the UE includes offsetToCarrier indicating the lowest position among the actual frequency positions, all PRBs may be included in the reference resource region no matter what UL BWP is configured.

Seventh embodiment: The UE may obtain a value $O_{carrier}$ ($O_{carrier,DL}$) of the reference resource region indicated by a UL preemption indication according to offsetToCarrier indicating the highest position among actual frequency positions indicated by the values (offsetToCarrier) configured according to the subcarrier values indicated by scs-SpecificCarrierList of FrequencyInforULSIB (or FrequencyInforUL). Specifically, the value $O_{carrier,DL}$ may be obtained by floor (max2_$O_{carrier}$*S). The value S may be given as max2_SCS/$SCS_{ref}$. Floor may be replaced by ceil or round. As another method, the value $O_{carrier,DL}$ may be obtained by max2_$O_{carrier}$. max2_$O_{carrier}$ may be determined on the basis of offsetToCarrier.

For example, offsetToCarrier values $0_1$, $0_2$, and $0_3$ may be configured according to the subcarrier spacings included in scs-SpecificCarrierList of FrequencyInforUL-SIB (or FrequencyInforUL). Here, $O_1$ is a value (offsetToCarrier) configured according to subcarrier spacing 1, $O_2$ is a value (offsetToCarrier) configured according to subcarrier spacing 2, and $O_3$ is a value (offsetToCarrier) configured according to subcarrier spacing 3. Among $0_1$, $0_2$, and $0_3$, the value indicating the highest actual frequency position may be the value max2_$O_{carrier}$. At this time, the value indicating the highest position may be the maximum value among $O_1$*SCS1, $O_2$*SCS2, and $O_3$*SCS3. The subcarrier spacing corresponding to offsetToCarrier of max2_$O_{carrier}$ may be the value max2_SCS.

In the case of TDD, the offsetToCarrier value corresponding to the subcarrier of the DL BWP in which the UL preemption indication is received in FrequencyInforDL-SIB (or FrequencyInforDL) may be a value of $O_{carrier,DL}$. The first to seventh embodiments may be used only in other cases, that is, in the case of FDD.

Alternatively, if the offsetToCarrier value for the subcarrier of the DL BWP in which the UL preemption indication is received is included in FrequencyInforUL-SIB (or FrequencyInforUL), the offsetToCarrier value for the subcarrier spacing included in FrequencyInforULSIB (or FrequencyInforUL) may be the value $O_{carrier,DL}$.

That is, if $O_{carrier,DL}$, which is an offset value of the reference resource region, is transmitted through a higher layer, the UE may determine PRBs on the frequency axis of the reference resource region on the basis of the value transmitted through the higher layer. In other cases, if the value offsetToCarrier for the subcarrier spacing of the DL BWP in which a UL preemption indication is received is not included in FrequencyInforUL-SIB (or FrequencyInforUL), the value $O_{carrier,DL}$ may be calculated through the first to seventh embodiments.

Figure 41:
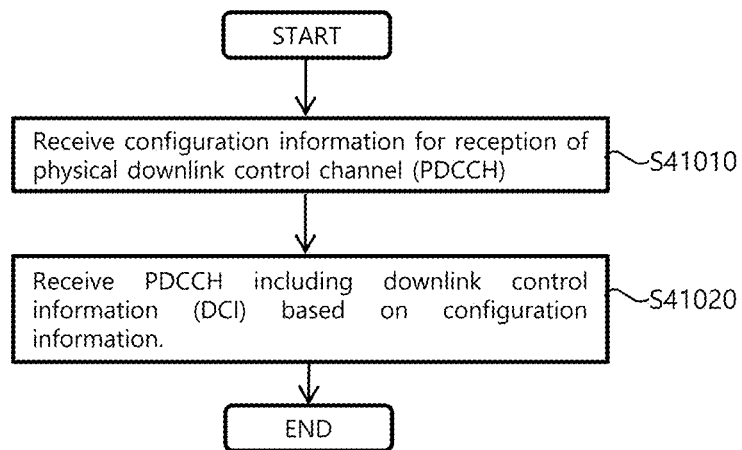
FIG. 41 is a flowchart illustrating an example of the operation of a user equipment according to an embodiment of the present disclosure.

FIG. 41 is a flowchart illustrating an example of the operation of a UE according to an embodiment of the present disclosure.

Referring to FIG. 41, if DCI including an indication indicating cancellation of a resource scheduled for UL transmission is received, the UE may cancel UL transmission for the resource region indicated by the indication.

Specifically, the UE receives configuration information for reception of a physical downlink control channel (PDCCH) (S41010). At this time, the configuration information may include at least one of the value 'X' and the value 'Y' for identifying a reference resource region that may be cancelled, and an offset value for determining the positions of the symbols on the time axis and the positions of the PRBs on the frequency axis, which have been described above.

In addition, the configuration information may inform the UE of the positions of symbols, in which a PDCCH of DCI including an indication indicating some or all of the time-frequency resources for cancellation of UL transmission is transmitted, through a bitmap scheme. For example, the position of a symbol in which a PDCCH is transmitted may be indicated to the UE through the value of each bit.

Thereafter, the UE may receive a PDCCH including downlink control information (DCI) on the basis of the configuration information (S41020).

The DCI may include an indication indicating some or all of the time-frequency resources for cancellation of UL transmission.

The subcarrier spacing of at least one symbol in which cancellation of UL transmission is indicated by the indication included in the DCI may be determined as the subcarrier spacing of a downlink bandwidth part (DL BWP) of a cell in which the DCI is received.

In addition, the time frequency resources for UL transmission may be obtained by excluding specific resources from the reference resource region, and the number of symbols in the reference resource region may be determined on the basis of the monitoring periodicity for monitoring the PDCCH or a predetermined value.

For example, the reference resource region may include 'Y' consecutive symbols from the starting symbol positioned after 'X' symbols from the last symbol in which the PDCCH is detected. The time frequency resources for UL transmission may be obtained by excluding specific resources from the reference resource region, and the number of symbols in the reference resource region may be determined based on the monitoring periodicity for monitoring a PDCCH or a predetermined value.

At this time, the resource for UL transmission to be cancelled is a resource scheduled for UL transmission before the PDCCH of DCI, including an indication indicating some or all of the time-frequency resources for cancellation of UL transmission, is detected.

Figure 42:
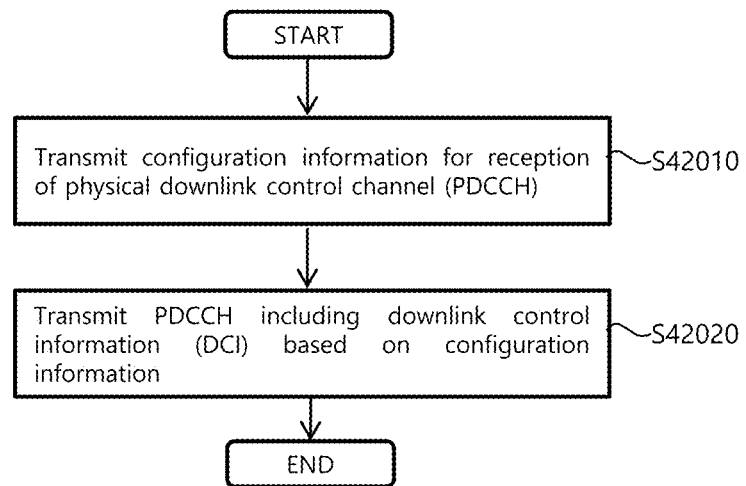
FIG. 42 is a flowchart illustrating an example of the operation of a base station according to an embodiment of the present disclosure.

FIG. 42 is a flowchart illustrating an example of the operation of a base station according to an embodiment of the present disclosure.

Referring to FIG. 42, the base station may transmit DCI including an indication indicating cancellation of UL transmission, and may cancel the configuration of the resource scheduled for UL transmission.

Specifically, the base station transmits configuration information for reception of a physical downlink control channel (PDCCH) (S42010). At this time, the configuration information may include at least one of the value 'X' and the value 'Y' for identifying a reference resource region that may be cancelled, and an offset value for determining the positions of the symbols on the time axis and the positions of the PRBs on the frequency axis, which have been described above.

In addition, the configuration information may inform the UE of the position of a symbol, in which a PDCCH of DCI including an indication indicating some or all of time-frequency resources for cancellation of UL transmission is transmitted, through a bitmap scheme. For example, the position of a symbol in which a PDCCH is transmitted may be indicated to the UE through the value of each bit.

Thereafter, the base station may transmit a PDCCH including downlink control information (DCI) on the basis of the configuration information (S42020).

The DCI may include an indication indicating some or all of the time-frequency resources for cancellation of UL transmission.

The subcarrier spacing of at least one symbol in which cancellation of UL transmission is indicated by the indication included in the DCI may be determined as the subcarrier spacing of a downlink bandwidth part (DL BWP) of the cell in which the DCI is transmitted.

In addition, the time frequency resources for UL transmission may be obtained by excluding specific resources from the reference resource region, and the number of symbols in the reference resource region may be determined on the basis of the monitoring periodicity for monitoring the PDCCH or a predetermined value.

For example, the reference resource region may include 'Y' consecutive symbols from the starting symbol positioned after 'X' symbols from the last symbol in which the PDCCH is detected. The time frequency resources for UL transmission may be obtained by excluding specific resources from the reference resource region, and the number of symbols in the reference resource region may be determined on the basis of the monitoring periodicity for monitoring a PDCCH or a predetermined value.

At this time, the resource for UL transmission to be cancelled is a resource scheduled for UL transmission before the PDCCH of DCI, including an indication indicating some or all of the time-frequency resources for cancellation of UL transmission, is detected.

The above description of the present disclosure has been made by way of example, and those of ordinary skill in the art to which the present disclosure pertains shall understand that the present disclosure may be easily modified into other specific forms without changing the technical spirit or essential features thereof. Therefore, it should be understood that the embodiments described above are illustrative, and are not intended to limit the present disclosure in all respects. For example, each element described in a single form may be implemented in a distributed form, and similarly, elements described in a distributed form may also be implemented in a combined form.

The scope of the present disclosure is indicated by the claims to be described later rather than the detailed description, and all changes or modified forms derived from the meaning and scope of the claims and their equivalent concepts should be interpreted as being included in the scope of the present disclosure.

The invention claimed is:

1. A user equipment in a wireless communication system, the user equipment comprising:
a communication module; and
a processor configured to control the communication module,
wherein the processor is configured to,
receive configuration information for reception of a physical downlink control channel (PDCCH), and
receive the PDCCH comprising downlink control information (DCI) based on the configuration information,
wherein the DCI includes an indicator indicating a time-frequency resource for cancellation of UL transmission, and
wherein a subcarrier spacing related to at least one symbol in which cancellation of UL transmission is indicated by the indicator is determined to be a subcarrier spacing of a downlink bandwidth part (DL BWP) of a cell in which the DCI is received.

2. The user equipment of claim 1,
wherein the time frequency resource for cancellation of UL transmission is a resource excluding a specific resource from a reference resource region, and
wherein a number of symbols in the reference resource region is determined based on a monitoring periodicity for monitoring the PDCCH or a predetermined value.

3. The user equipment of claim 2,
wherein the specific resource comprises at least one of a symbol for a physical broadcast channel (PBCH)/synchronization signal (SS) and/or a downlink symbol.

4. The user equipment of claim 3,
wherein the downlink symbol is a symbol composed of cell common.

5. The user equipment of claim 2,
wherein a starting symbol in the resource is a symbol positioned after "X" symbols from a symbol after a symbol in which the PDCCH is received.

6. The user equipment of claim 5,
wherein the value "X" is determined based on at least one of a first subcarrier spacing and/or a second subcarrier spacing,
wherein the first subcarrier spacing is the smallest value of a subcarrier spacing for the PDCCH and a subcarrier spacing for the UL transmission, and
wherein the second subcarrier spacing is a value determined based on a subcarrier spacing for the UL transmission.

7. The user equipment of claim 1,
wherein the time-frequency resource for the cancellation of UL the transmission comprises a plurality of regions of which the cancellation or non-cancellation is indicated by respective bits of the indicator.

8. The user equipment of claim 2,
wherein the time-frequency resource for the cancellation of UL transmission comprises a plurality of regions divided into N groups comprising at least one symbol on a time domain and at least one physical resource block (PRB) on a frequency domain.

9. The user equipment of claim 8,
wherein a number of the at least one symbol included in at least one group of the N groups is a value obtained by dividing the number of symbols included in the time-frequency resource by N and rounding up the quotient thereof, and
wherein a number of the one or more symbols included in each of the remaining groups, excluding the at least one of the N groups, is a value obtained by dividing the number of symbols included in the time-frequency resource by N and rounding down the quotient thereof.

10. The user equipment of claim 8,
wherein the configuration information includes a RIV (resource indication value) indicating an index of a starting RB and a number of consecutive RBs of the resource,
wherein the index of the starting RB is used to determine a starting PRB index of the resource, and
wherein a size of the BWP for determining the RIV indicating the index of the starting RB and the number of consecutive RBs is 275 RBs.

11. The user equipment of claim 10,
wherein a value of a starting PRB index of the at least one PRB is obtained by adding an offset value to a value of the starting PRB index of the resource.

12. The user equipment of claim 11,
wherein the offset value or a subcarrier spacing of the offset value are transmitted through higher layer signaling.

13. The user equipment of claim 1,
wherein a resource cancelled by the indication is a resource for transmitting a physical uplink shared channel (PUSCH) and/or a sounding reference signal (SRS).

14. The user equipment of claim 1,
wherein scheduling of a resource for the UL transmission is performed,
wherein the resource for the UL transmission is scheduled before the PDCCH is received, and
wherein the UL transmission is cancelled when the time-frequency resource indicated by the indicator overlaps in a some or all of the symbols of the resource for the UL transmission.

15. A method for receiving downlink control information in a wireless communication system, the method comprising:
receiving configuration information for reception of a physical downlink control channel (PDCCH); and
receiving the PDCCH comprising downlink control information (DCI) based on the configuration information,
wherein the DCI includes an indicator indicating a time-frequency resource for cancellation of UL transmission, and
wherein a subcarrier spacing related to at least one symbol in which cancellation of UL transmission is indicated by the indication is determined to be a subcarrier spacing of a downlink bandwidth part (DL BWP) of a cell in which the DCI is received.

16. The user equipment of claim 15,
wherein the time frequency resource for cancellation of UL transmission is a resource excluding a specific resource from a reference resource region, and
wherein a number of symbols in the reference resource region is determined based on a monitoring periodicity for monitoring the PDCCH or a predetermined value.

17. The user equipment of claim 16,
wherein the specific resource comprises at least one of a symbol for a physical broadcast channel (PBCH)/synchronization signal (SS) and/or a downlink symbol.

18. The user equipment of claim 17,
wherein the downlink symbol is a symbol composed of cell common.

19. The user equipment of claim 16,
wherein a starting symbol in the resource is a symbol positioned after "X" symbols from a symbol after a symbol in which the PDCCH is received.

20. The user equipment of claim 19,
wherein the value "X" is determined based on at least one of a first subcarrier spacing and/or a second subcarrier spacing,
wherein the first subcarrier spacing is the smallest value of a subcarrier spacing for the PDCCH and a subcarrier spacing for the UL transmission, and
wherein the second subcarrier spacing is a value determined based on a subcarrier spacing for the UL transmission.

21. The user equipment of claim 15,
wherein the time-frequency resource for the cancellation of the UL transmission comprises a plurality of regions of which the cancellation or non-cancellation is indicated by respective bits of the indicator.

22. The user equipment of claim 16,
wherein the time-frequency resource for the cancellation of UL transmission comprises a plurality of regions divided into N groups comprising at least one symbol on a time domain and at least one physical resource block (PRB) on a frequency domain.

23. The user equipment of claim 22,
wherein a number of the at least one symbol included in at least one group of the N groups is a value obtained by dividing the number of symbols included in the time-frequency resource by N and rounding up the quotient thereof, and
wherein a number of the one or more symbols included in each of the remaining groups, excluding the at least one of the N groups, is a value obtained by dividing the number of symbols included in the time-frequency resource by N and rounding down the quotient thereof.

24. The user equipment of claim 22,
wherein the configuration information includes a RIV (resource indication value) indicating an index of a starting RB and a number of consecutive RBs of the resource,
wherein the index of the starting RB is used to determine a starting PRB index of the resource, and
wherein a size of the BWP for determining the RIV indicating the index of the starting RB and the number of consecutive RBs is 275 RBs.

25. The user equipment of claim 24,
wherein a value of a starting PRB index of the at least one PRB is obtained by adding an offset value to a value of the starting PRB index of the resource.

26. The user equipment of claim 25,
wherein the offset value or a subcarrier spacing of the offset value are transmitted through higher layer signaling.

27. The user equipment of claim 15,
wherein a resource cancelled by the indication is a resource for transmitting a physical uplink shared channel (PUSCH) and/or a sounding reference signal (SRS).

28. The user equipment of claim 15, the method further comprising:
scheduling of a resource for the UL transmission is performed,
wherein the resource for the UL transmission is scheduled before the PDCCH is received, and
wherein the UL transmission is cancelled when the time-frequency resource indicated by the indication overlaps in a some or all of the symbols of the resource for the UL transmission.

\* \* \* \* \*